US012540728B1

(12) United States Patent
Byrne et al.

(10) Patent No.: US 12,540,728 B1
(45) Date of Patent: Feb. 3, 2026

(54) GARAGE FAN WITH ADJUSTABLE LIGHTS

(71) Applicant: HKC-US, LLC, Memphis, TN (US)

(72) Inventors: Brendan Patrick Byrne, Germantown, TN (US); Jeffrey Blaise Newman, Cornelius, NC (US); Matthew Willard, Collierville, TN (US)

(73) Assignee: HKC-US, LLC, Memphis, TN (US)

( * ) Notice: Subject to any disclaimer, the term of this patent is extended or adjusted under 35 U.S.C. 154(b) by 0 days.

(21) Appl. No.: 19/079,160

(22) Filed: Mar. 13, 2025

Related U.S. Application Data

(60) Provisional application No. 63/567,131, filed on Mar. 19, 2024.

(51) Int. Cl.

| | |
|---|---|
| ***F21V 33/00*** | (2006.01) |
| ***F04D 25/08*** | (2006.01) |
| ***F04D 29/64*** | (2006.01) |

(52) U.S. Cl.
CPC ........ *F21V 33/0096* (2013.01); *F04D 25/088* (2013.01); *F04D 29/644* (2013.01)

(58) Field of Classification Search
None
See application file for complete search history.

(56) References Cited

U.S. PATENT DOCUMENTS

| | | | |
|---|---|---|---|
| 2,345,516 A * | 3/1944 | Weber | F04D 29/703 D23/370 |
| 5,215,498 A | 6/1993 | Wong | |
| D562,442 S | 2/2008 | Blateri | |
| D594,545 S | 6/2009 | Blateri | |
| D638,924 S | 5/2011 | Perez | |
| D674,888 S | 1/2013 | Kawase | |
| D686,309 S | 7/2013 | Kokawa | |
| 9,163,845 B1 | 10/2015 | Carlozzi | |

(Continued)

FOREIGN PATENT DOCUMENTS

| | | |
|---|---|---|
| CN | 216922562 | 7/2022 |
| DE | 202021103008 U1 | 6/2021 |

OTHER PUBLICATIONS

Harbor Breeze Cohort Garage Fan Model 42955 (URL: https://www.lowes.com/pd/Harbor-Breeze-Cohort-18-in-Matte-Black-Indoor-Outdoor-Fandelier-Ceiling-Fan-3-Blade/5014273965?user=shopping&feed=yes Accessed: Jun. 16, 2025; Owner's Comments as early as Oct. 2023 (see pp. 8-10 for evidence highlighted)) (Year: 2023).*

(Continued)

*Primary Examiner* — Juan G Flores
(74) *Attorney, Agent, or Firm* — Brian S. Steinberger; Hilary F. Steinberger; Steinberger IP Law

(57) ABSTRACT

Ceiling, and wall mounted garage-fans include left and right paddles, with a plurality of LEDS (light emitting diodes) adjustably mounted to left and right sides of a ring housing with a fan. Left adjustable mount allows the left paddle with LEDS rotate in vertical and horizontal axes. Right adjustable mount allows the right paddle with LEDS rotate in vertical and horizontal axes. The housing can be mounted by a lower C channel to a ceiling. Left and right rotatable-knobs on the C-channel, can be loosened so that a handle can be moved to change orientation of the housing. The housing can be mounted by another C channel to a wall. Knobs on the C-channel, allow the housing be pivoted up or down to change orientation of the fan. The wall mount can include a horizontal pivot so that the fan can be moved across a horizontal plane.

7 Claims, 48 Drawing Sheets

(56) References Cited

U.S. PATENT DOCUMENTS

| | | | |
|---|---|---|---|
| 9,508,251 | B1 | 11/2016 | Byrne |
| 9,589,461 | B1 | 3/2017 | Byrne |
| D799,680 | S | 10/2017 | Wang |
| D835,252 | S | 12/2018 | Hidalgo |
| D835,253 | S | 12/2018 | Hildago |
| D835,256 | S | 12/2018 | Hidalgo |
| D882,127 | S | 4/2020 | Cao |
| D884,952 | S | 5/2020 | Cao |
| D903,849 | S | 12/2020 | Li |
| D908,941 | S | 1/2021 | Cai |
| 11,054,085 | B1 | 7/2021 | Byrne |
| D967,391 | S | 10/2022 | Lin |
| 11,486,404 | B1 | 11/2022 | Mathis |
| D998,133 | S | 9/2023 | Zhang |
| D1,021,179 | S | 4/2024 | Romano |
| D1,027,160 | S | 5/2024 | Zhang |
| D1,030,029 | S | 6/2024 | He |
| D1,033,707 | S | 7/2024 | Mishan |
| D1,034,951 | S | 7/2024 | Li |
| D1,035,083 | S | 7/2024 | Yang |
| D1,045,058 | S | 10/2024 | Lu |
| D1,050,389 | S | 11/2024 | Chen |
| D1,055,257 | S | 12/2024 | Wang |
| D1,055,264 | S | 12/2024 | Chen |
| D1,060,782 | S | 2/2025 | Chen |
| D1,071,287 | S | 4/2025 | Zhang |
| 2019/0003480 | A1 | 1/2019 | Hall |
| 2022/0004707 | A1 | 1/2022 | Pailla |

OTHER PUBLICATIONS

Hunter 9020X Jetstream Garage Fan—User Manual—Apr. 25, 2007 (Year: 2007).*

Mule Products. Obtained from Wayback Machine on Mar. 10, 2025. <https://web.archive.org/web/20240302164424/https://muleproducts.com/> Mar. 2, 2024 (Year: 2024).

Mule Products. Obtained from Wayback Machine on Mar. 10, 2025. <https://web.archive.org/web/20240302164424/https://muleproducts.com/> Mar. 9, 2024 (Year: 2024).

Mule Products. Obtained from Wayback Machine on Mar. 10, 2025. <https://web.archive.org/web/20231202042525/https://muleproducts.com/> Dec. 2, 2023 (Year: 2023).

Mule Garage Fan XL with Remote, Dec. 25, 2024, Amazon.com. < https://www.amazon.com/Mule-Garage-Fan-XL-Remote/dp/BODRH9FGC5 > (Year: 2024).

Mule Garage Fan XL with Work Light, Dec. 25, 2024, Amazon.com. < https://www.amazon.com/Mule-Garage-Fan-Work-Light /dp/BODRH9MXSP > (Year: 2024).

Mule Rugged Outdoor Fan, Oct. 28, 2024, Amazon.com. < https://www.amazon.com/ MU LE-Mounting-Standard-adjustable-direction/dp/BODN 1 QW6HG/ > (Year: 2024).

Mule Garage Wall Fan XL with Remote, Dec. 25, 2024, Amazon.com. < https://www.amazon.com/ Mule-Garage-Wall-Fan-Remote/dp/BODRH8LHNV/ > (Year: 2024).

HKC-US, LLC, PCT Patent Application No. PCT/US2025/019743, filed Mar. 13, 2025, Notification of the Transmittal of the International Search Report and the Written Opinion of the International Searching Authority, or the Declaration, mailed May 21, 2025, 25 pages.

* cited by examiner

GARAGE FAN WITH ADJUSTABLE LIGHTS

CROSS REFERENCE TO RELATED APPLICATIONS

This application claims the benefit of priority to U.S. Provisional Application Ser. No. 63/567,131 filed Mar. 19, 2024, which is incorporated by reference in its' entirety.

FIELD OF INVENTION

This invention relates garage fans and lights, and in particular to systems, devices, and methods for providing garage fans with adjustable lights that are ceiling mounted and wall mounted, and garage fans with no adjustable lights that are ceiling mounted.

BACKGROUND AND PRIOR ART

HKC-US, LLC has previously sold a garage fan as early as December 20023, entitled: the MULE™ 52006-45 18 in. 3 Speed Ceiling Mounted Plug-In Cord Garage Fan with Remote-Black/Yellow, shown and described in attached FIGS. 37-51.

The MULE 52006 garage fan was limited to a ceiling mounted fan without lights.

This previously sold garage fan can only use used with traditional ceiling mounted lights inside of a garage. Generally, traditional ceiling mounted lights in a garage only direct light downward into the garage, and can not be adjusted to direct light in different directions.

Thus, the need exists for solutions to the above problems with the prior art.

SUMMARY OF THE INVENTION

A primary objective of the present invention is to provide systems, devices, and methods for providing a garage fan with adjustable lights that can be ceiling mounted in a garage.

A secondary objective of the present invention is to provide systems, devices, and methods for providing a garage fan with adjustable lights that can be wall mounted in a garage.

A preferred embodiment of the ceiling mounted garage fan with adjustable lights, can include a canopy mount for mounting the garage fan with the adjustable lights to a ceiling surface, a down rod having an upper end attached to the canopy mount, and a lower end, a lower facing C bracket having an apex attached to the lower end of the down rod, a ring shaped housing for a fan having a front side for emitting air therefrom, and a rear side, a left locking member for attaching a lower left end of the C bracket to a left side of the ring shaped fan housing, a right locking member for attaching a lower right end of the C bracket to a right side of the ring shaped fan housing, a handle extending below the ring shaped housing, which allows the ring shaped housing to pivot upward or downward by moving the handle in different directions, wherein the left locking member and the right locking member are loosened to allow the handle to move the ring shaped fan housing to a selected orientation, and the left locking member and the right locking member are tightened after the ring shaped fan housing has been moved to the selected orientation, and adjustable lights on a left side and a right side of the ring shaped fan housing that are each separately adjustable to selected light aiming positions.

The handle can include a U shaped handle extending below the ring shaped housing.

The left locking member can include a left rotatable knob, and the right locking member can include a right locking knob.

The adjustable lights can include a left paddle with a plurality light emitting diodes (LEDs) located on one side of the left paddle member, and a right paddle with another plurality of light emitting diodes (LEDs) on one side of the right paddle member.

The ceiling mounted garage fan with adjustable lights can further include a left horizontal rotatable axis member for rotatably mounting the left paddle along a rotatable horizontal axis to the left side of the ring shaped housing, a left vertical rotatable axis member for rotatably mounting the left paddle along a rotatable vertical axis to the left side of the ring shaped housing, a right horizontal rotatable axis member for rotatably mounting the right paddle along a rotatable horizontal axis to the right side of the ring shaped housing, and a right vertical rotatable axis member for rotatably mounting the right paddle along a rotatable vertical axis to the right side of the ring shaped housing.

Another embodiment of the garage fan with adjustable lights, can include a wall mount for mounting the garage fan with the adjustable lights to a wall surface, a horizontal rotatable axis member attached to the wall mount, a side facing C bracket having an apex attached to the horizontal rotatable axis member, a locking knob that can lock the position of the side facing C bracket to a selected position along horizontal plane, a ring shaped housing for a fan having a front side for emitting air therefrom, and a rear side, a left locking member for attaching a left end of the C bracket to a left side of the ring shaped fan housing, a right locking member for attaching a lower right end of the C bracket to a right side of the ring shaped fan housing, and adjustable lights on a left side and a right side of the ring shaped fan housing that are each separately adjustable to selected light aiming positions.

The left locking member can include a left rotatable knob, and the right locking member includes a right locking knob.

The adjustable lights can include a left paddle with a plurality light emitting diodes (LEDs) located on one side of the left paddle member, and a right paddle with another plurality of light emitting diodes (LEDs) on one side of the right paddle member.

The wall mounted garage fan with adjustable lights, can include a left horizontal rotatable axis member for rotatably mounting the left paddle along a rotatable horizontal axis to the left side of the ring shaped housing, a left vertical rotatable axis member for rotatably mounting the left paddle along a rotatable vertical axis to the left side of the ring shaped housing, a right horizontal rotatable axis member for rotatably mounting the right paddle along a rotatable horizontal axis to the right side of the ring shaped housing, and a right vertical rotatable axis member for rotatably mounting the right paddle along a rotatable vertical axis to the right side of the ring shaped housing.

The handle can include a U shaped handle extending below the ring shaped housing.

Another embodiment of the garage fan with adjustable lights, can include a surface mount for mounting the garage fan to a surface selected from a ceiling surface and a wall surface, a C shaped Bracket attached to the surface mount, a ring shaped housing for a fan having a front side for emitting air therefrom, and a rear side, the ring shaped bracket attached to the surface mount, left locking member for attaching a left end of the C bracket to a left side of the ring shaped fan housing, a right locking member for attaching a lower right end of the C-shaped bracket to a right side of the ring shaped fan housing, and adjustable lights on a left side and a right side of the ring shaped fan housing that are each separately adjustable to selected light aiming positions.

The ceiling surface mount of the garage fan with adjustable lights can include a handle extending away from the ring shaped housing on an opposite side to the wall mount, which allows the ring shaped housing to pivot upward or downward by moving the handle in different directions, wherein the left locking member and the right locking member are loosened to allow the handle to move the ring shaped fan housing to a selected orientation, and the left locking member and the right locking member are tightened after the ring shaped fan housing has been moved to the selected orientation; and The ceiling surface mount of the garage fan with adjustable lights can include a canopy mount for mounting the garage fan with the adjustable lights to the ceiling surface, a down rod having an upper end attached to the canopy mount, and a lower end, the lower end attached to the C-shaped bracket, a handle extending away from the ring shaped housing on an opposite side to the wall mount, which allows the ring shaped housing to pivot upward or downward by moving the handle in different directions, wherein the left locking member and the right locking member are loosened to allow the handle to move the ring shaped fan housing to a selected orientation, and the left locking member and the right locking member are tightened after the ring shaped fan housing has been moved to the selected orientation A wall surface mount of the garage fan with adjustable lights can include a horizontal pivot connection for allowing the garage fan with adjustable lights to pivot toward a left direction and toward a right direction, and a horizontal lock knob for locking position of the left direction or the right direction.

The adjustable lights can include a left paddle with a plurality light emitting diodes (LEDs) located on one side of the left paddle member, a right paddle with another plurality of light emitting diodes (LEDs) on one side of the right paddle member, a left horizontal rotatable axis member for rotatably mounting the left paddle along a rotatable horizontal axis to the left side of the ring shaped housing, a left vertical rotatable axis member for rotatably mounting the left paddle along a rotatable vertical axis to the left side of the ring shaped housing, a right horizontal rotatable axis member for rotatably mounting the right paddle along a rotatable horizontal axis to the right side of the ring shaped housing, and a right vertical rotatable axis member for rotatably mounting the right paddle along a rotatable vertical axis to the right side of the ring shaped housing.

A method or providing a garage fan with adjustable lights, can include the steps of providing a surface mount for mounting the garage fan to a surface selected from a ceiling surface and a wall surface, providing a C shaped bracket attached to the surface mount, providing a ring shaped housing for a fan having a front side for emitting air therefrom, and a rear side, the ring shaped bracket attached within the C shaped bracket, providing a left rotatable knob for attaching a left end of the C bracket to a left side of the ring shaped fan housing, providing a right rotatable knob for attaching a right end of the C-shaped bracket to a right side of the ring shaped fan housing, moving the ring shaped fan housing to a selected orientation, and providing adjustable paddle lights with light emitting diodes (LEDs) to a left side and a right side of the ring shaped fan housing that are adjustable to selected light aiming positions Further objects and advantages of this invention will be apparent from the following detailed description of the presently preferred embodiments which are illustrated schematically in the accompanying drawings.

BRIEF DESCRIPTION OF THE FIGURES

The drawing figures depict one or more implementations in accord with the present concepts, by way of example only, not by way of limitations. In the figures, like reference numerals refer to the same or similar elements.

Ceiling Mount Garage Fan with Adjustable Lights

Figure 10:
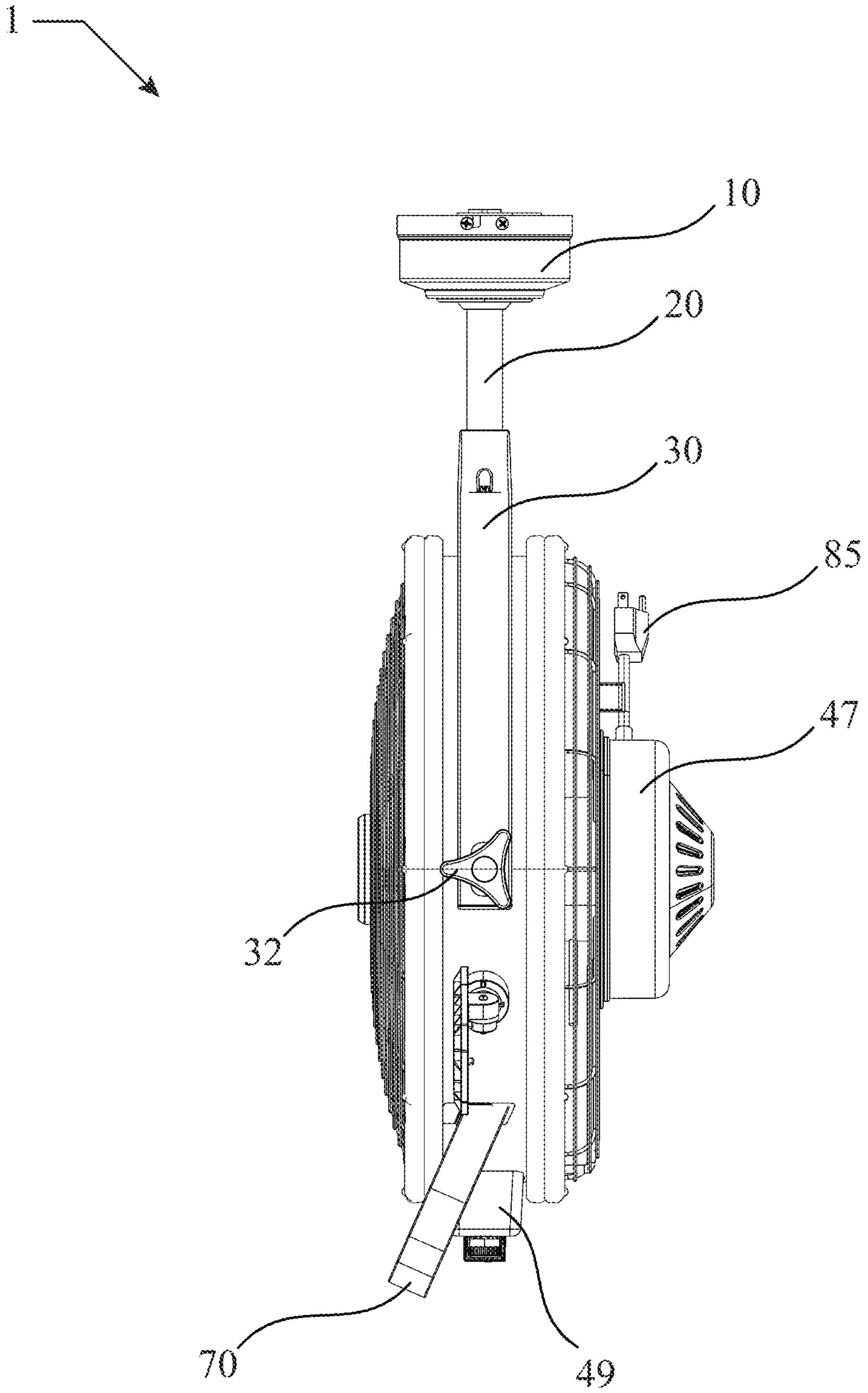
FIG. 10 is a right side perspective view of the garage fan with adjustable lights and ceiling mount of FIG. 1.

of FIG. 10 with the fan rotated approximately 90 degrees.

Figure 1:
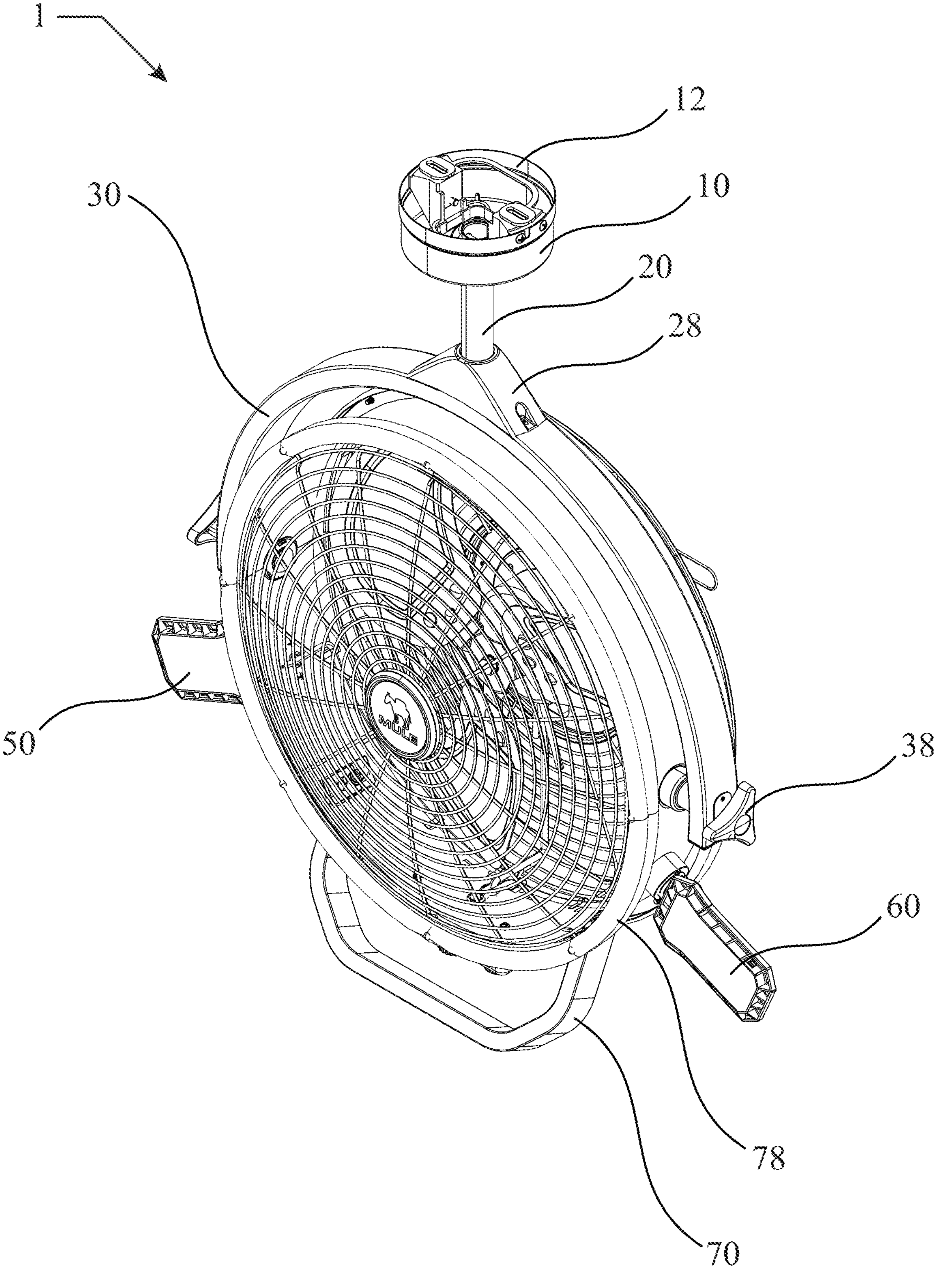
FIG. 1 is an upper front right perspective view of the garage fan with adjustable lights and ceiling mount.
Figure 18A:
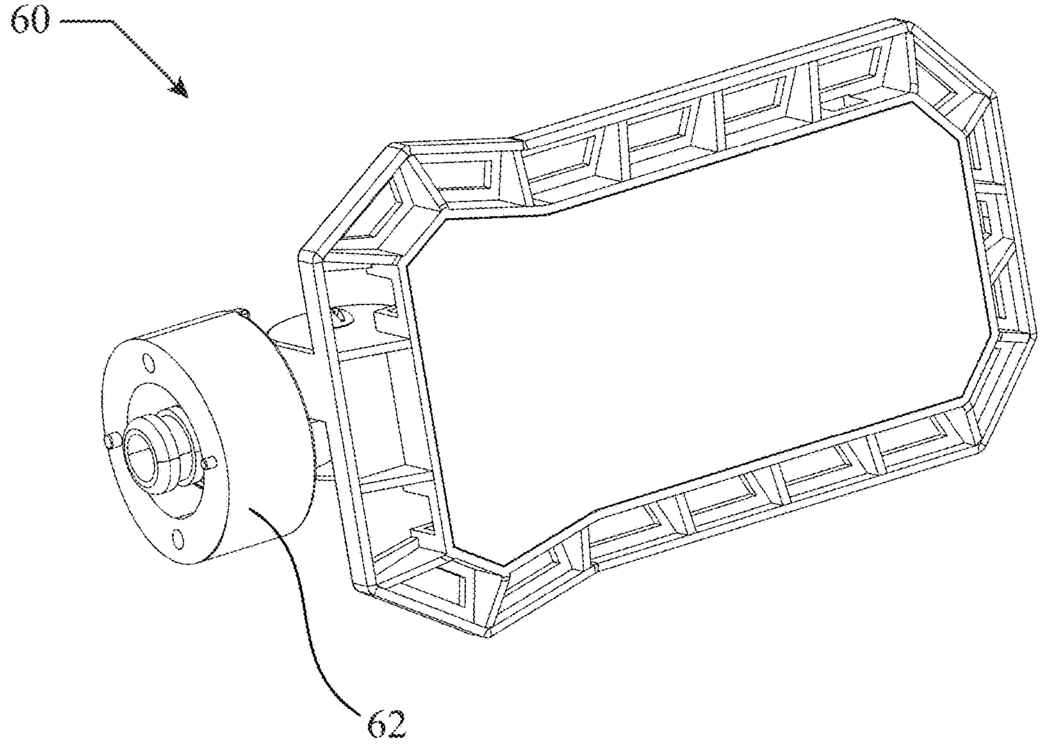

FIG. 18A is a front perspective view of an adjustable light of the garage fan of FIG. 1.

Figure 18B:
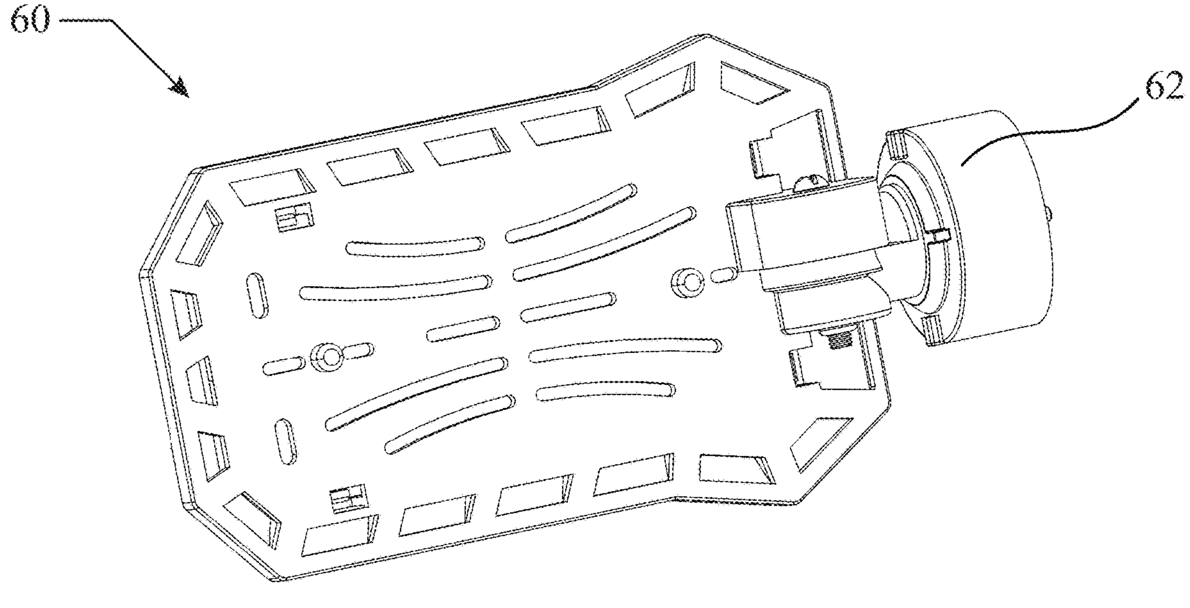

FIG. 18B is a rear perspective view of an adjustable light of the garage fan of FIG. 1.

Figure 19:
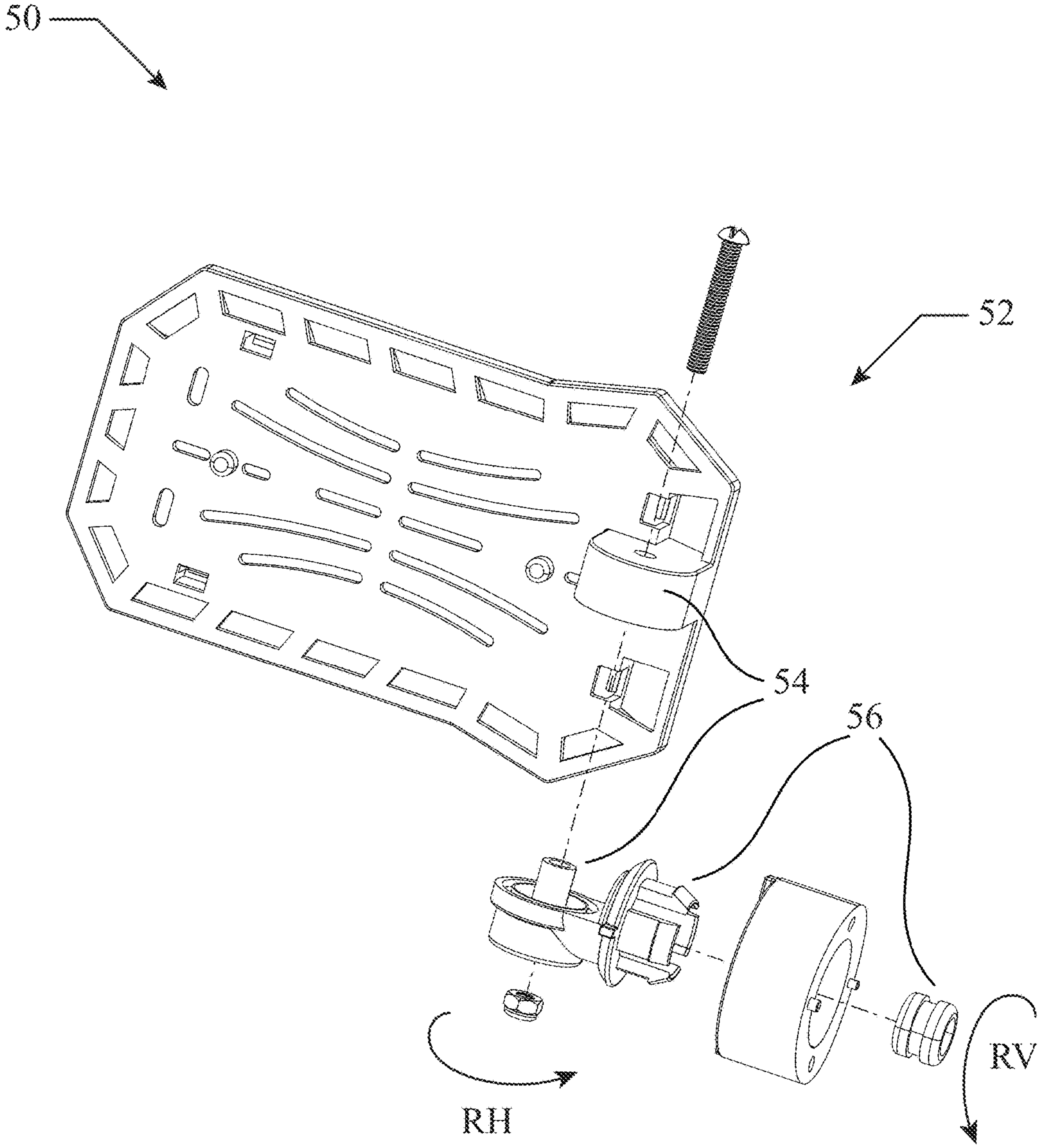

FIG. 19 is an exploded view of the adjustable light of FIGS. 18A-18B.

Figure 20:
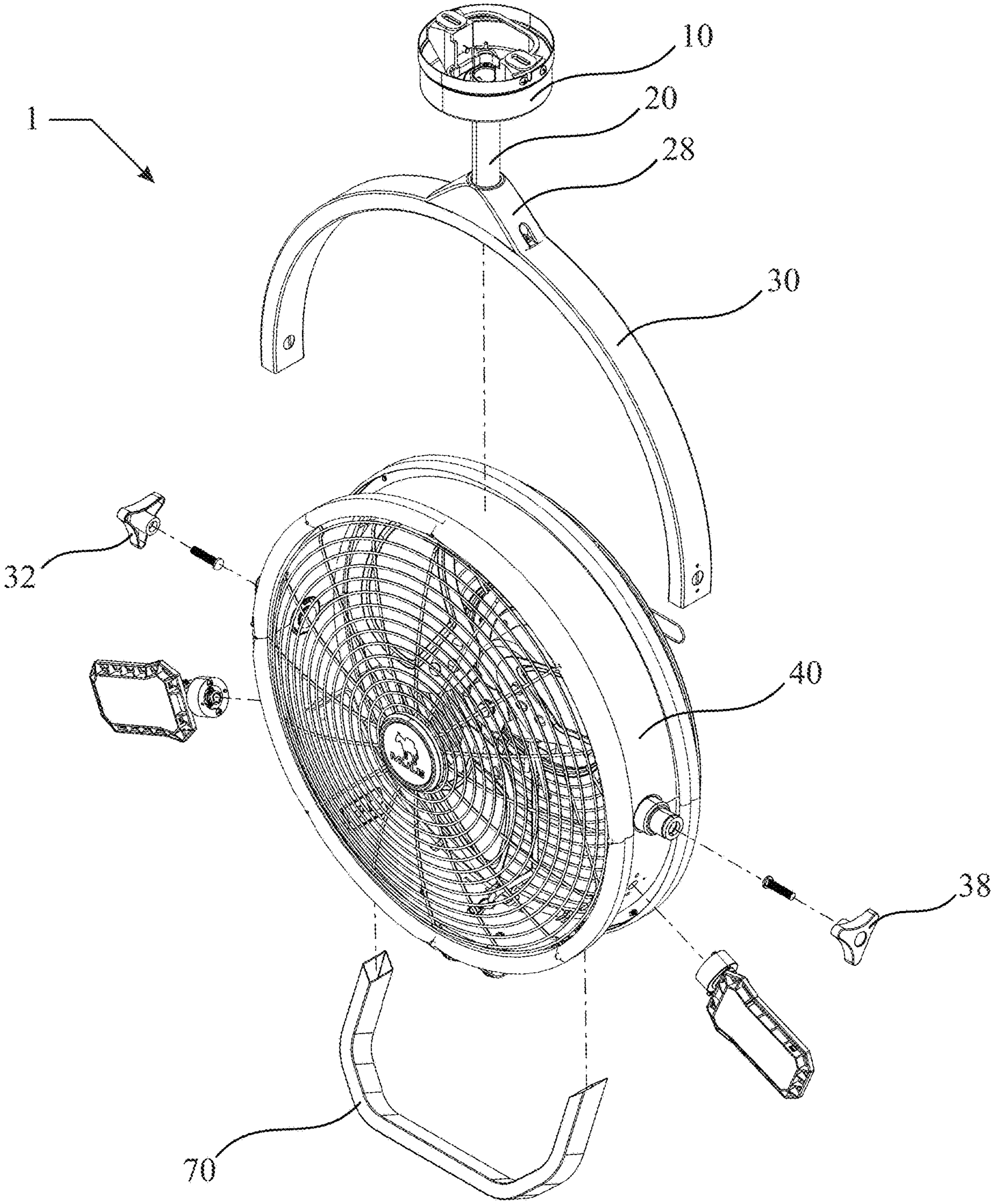

FIG. 20 is an exploded view of all the parts of the garage fan with adjustable lights and ceiling mount of FIG. 1.

Wall Mount Garage Fan with Adjustable Lights

Figure 21:
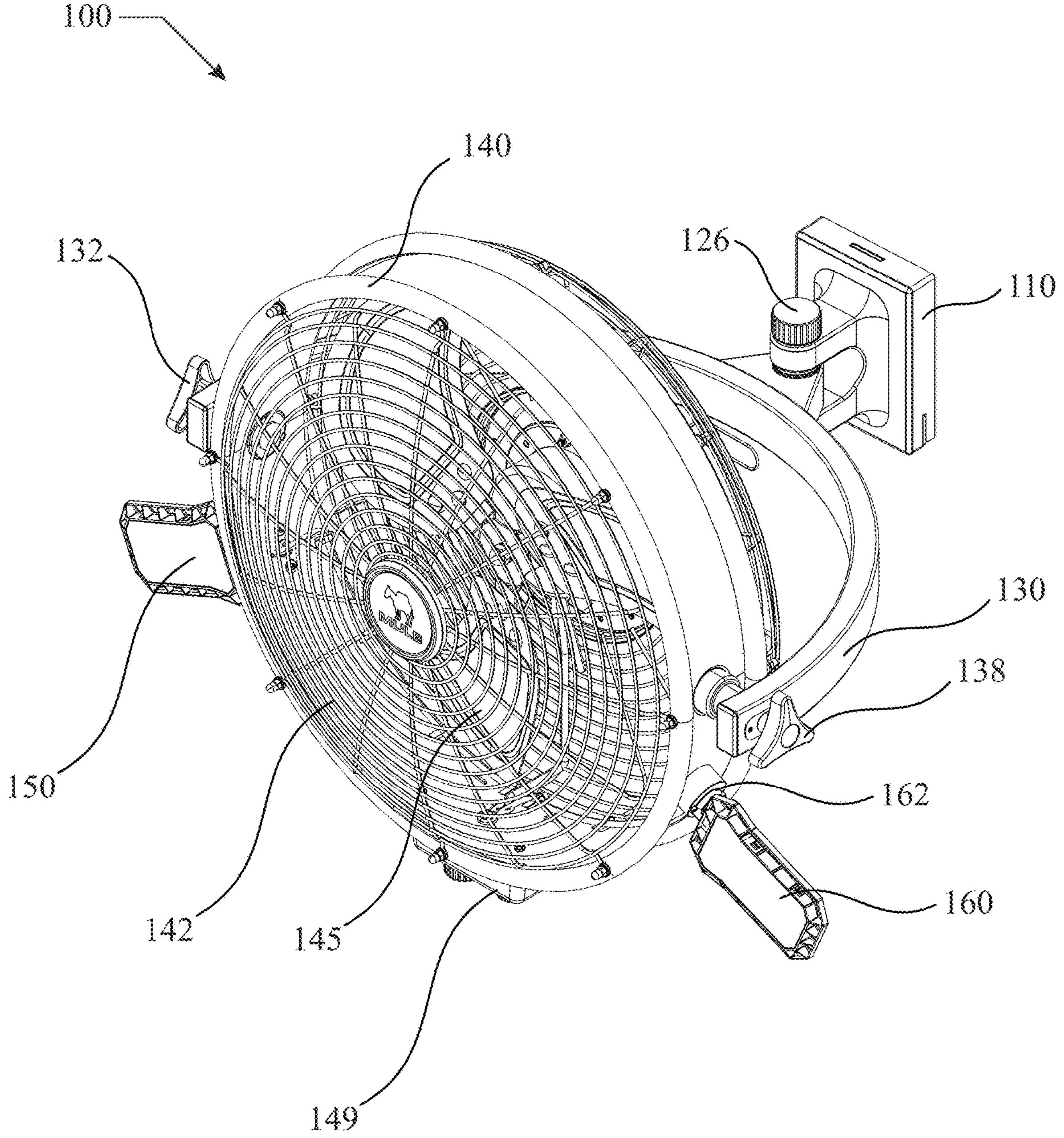

FIG. 21 is an upper front right perspective view of the garage fan with adjustable lights and wall mount.

Figure 22:
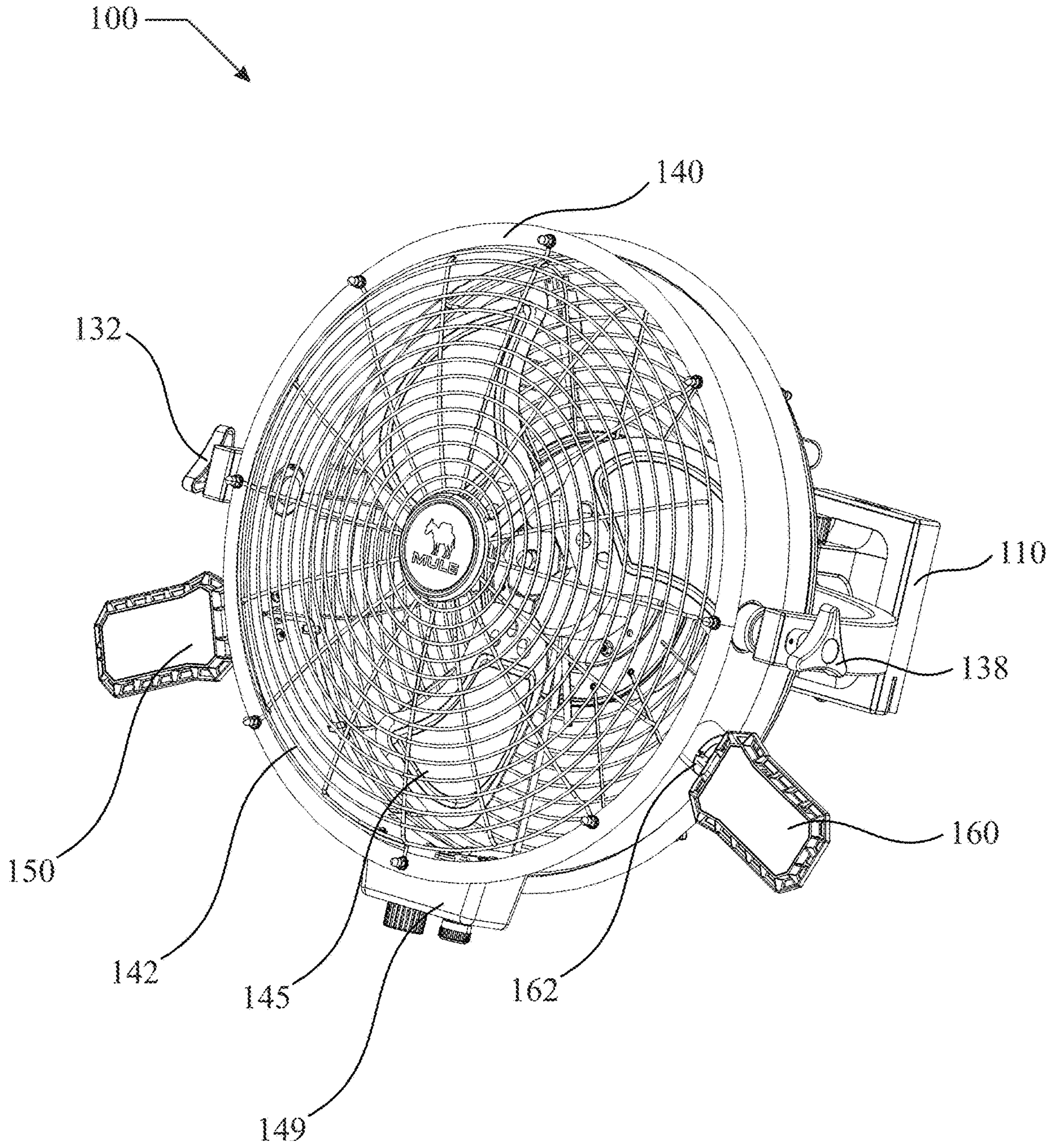

FIG. 22 is a front right perspective view of the garage fan with adjustable lights and wall mount of FIG. 21.

Figure 23:
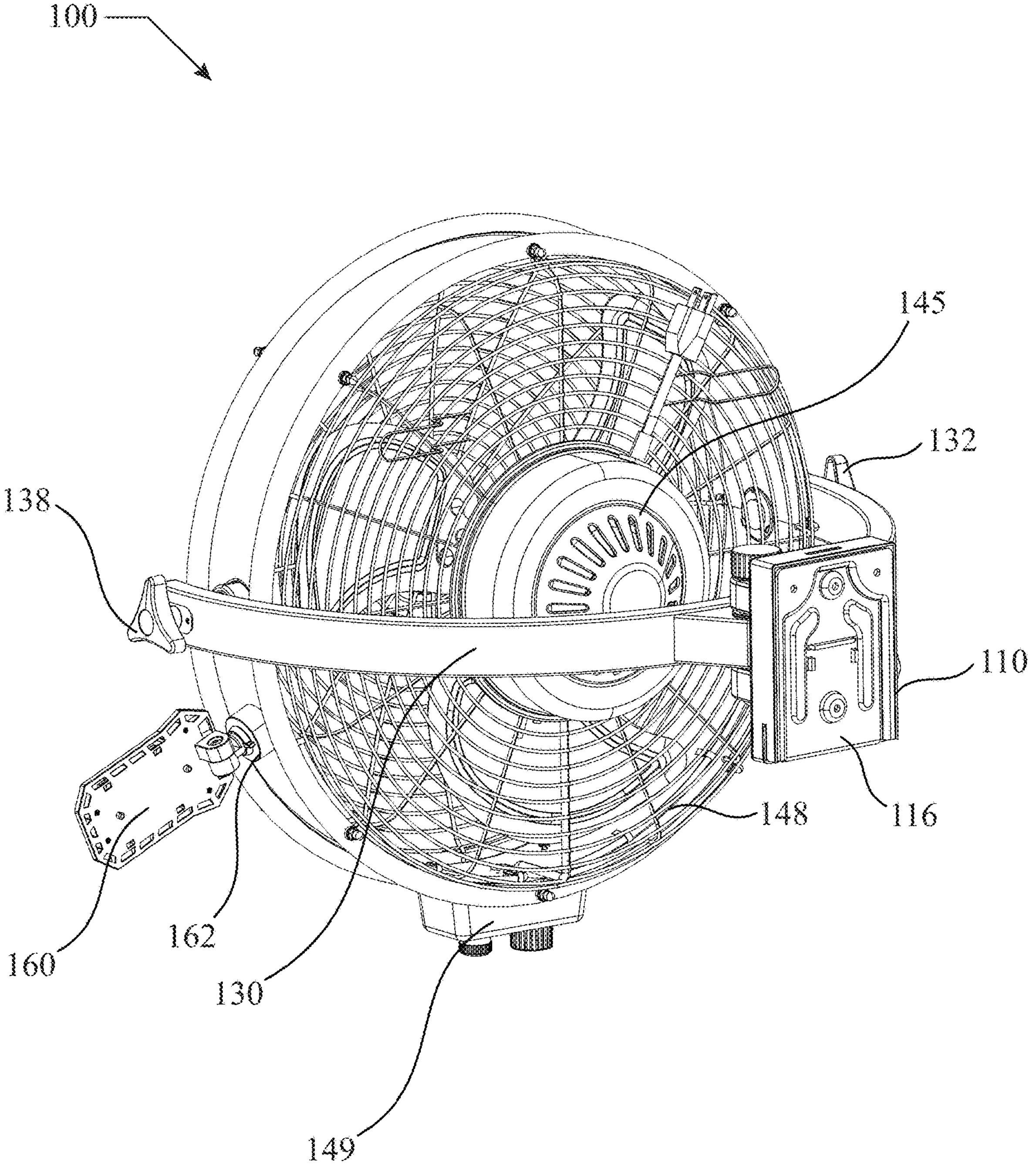

FIG. 23 is an upper rear perspective view of the garage fan with adjustable lights and wall mount of FIG. 22.

Figure 24:
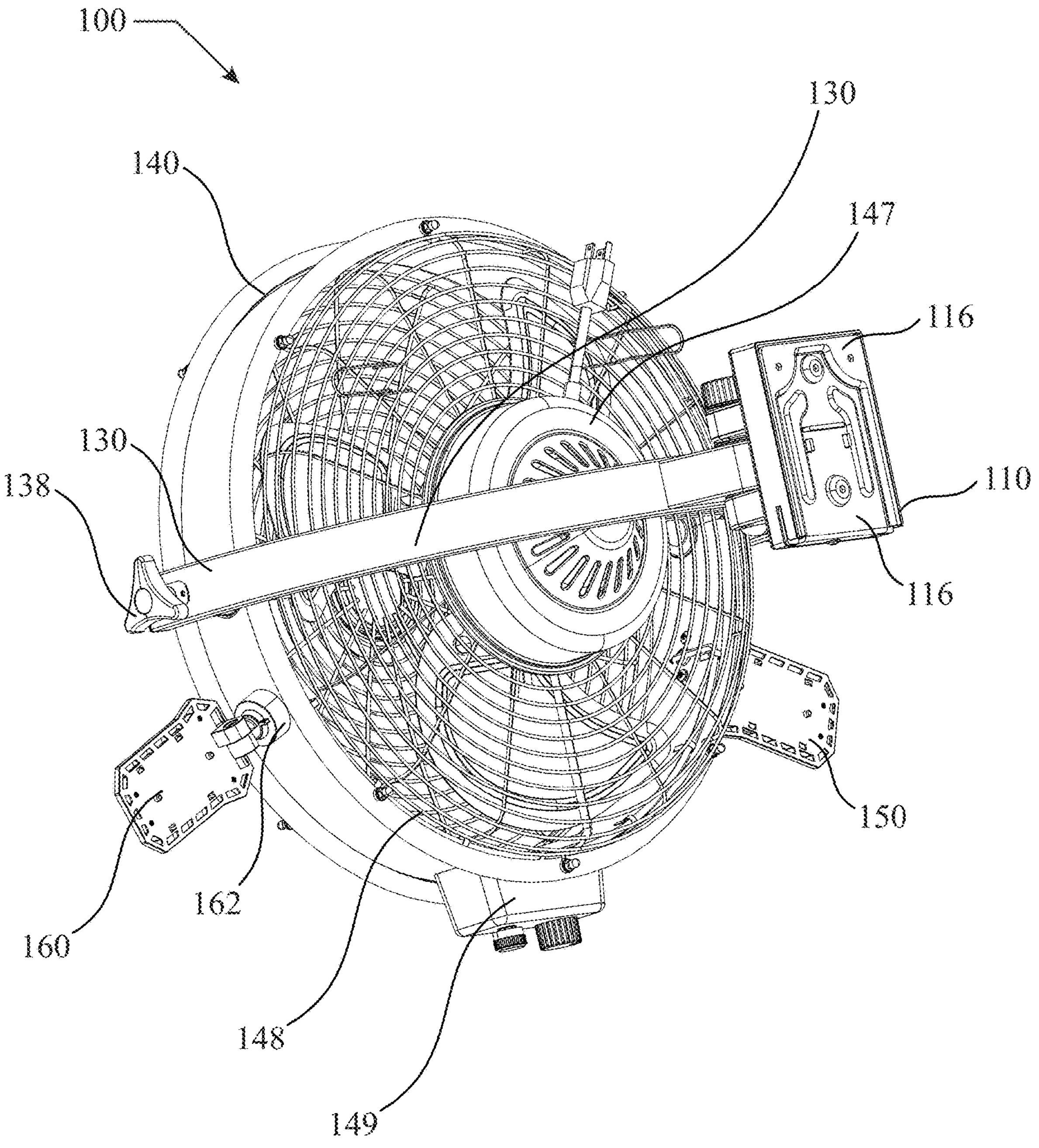

FIG. 24 is a lower rear perspective view of the garage fan with adjustable lights and wall mount of FIG. 22.

Figure 25:
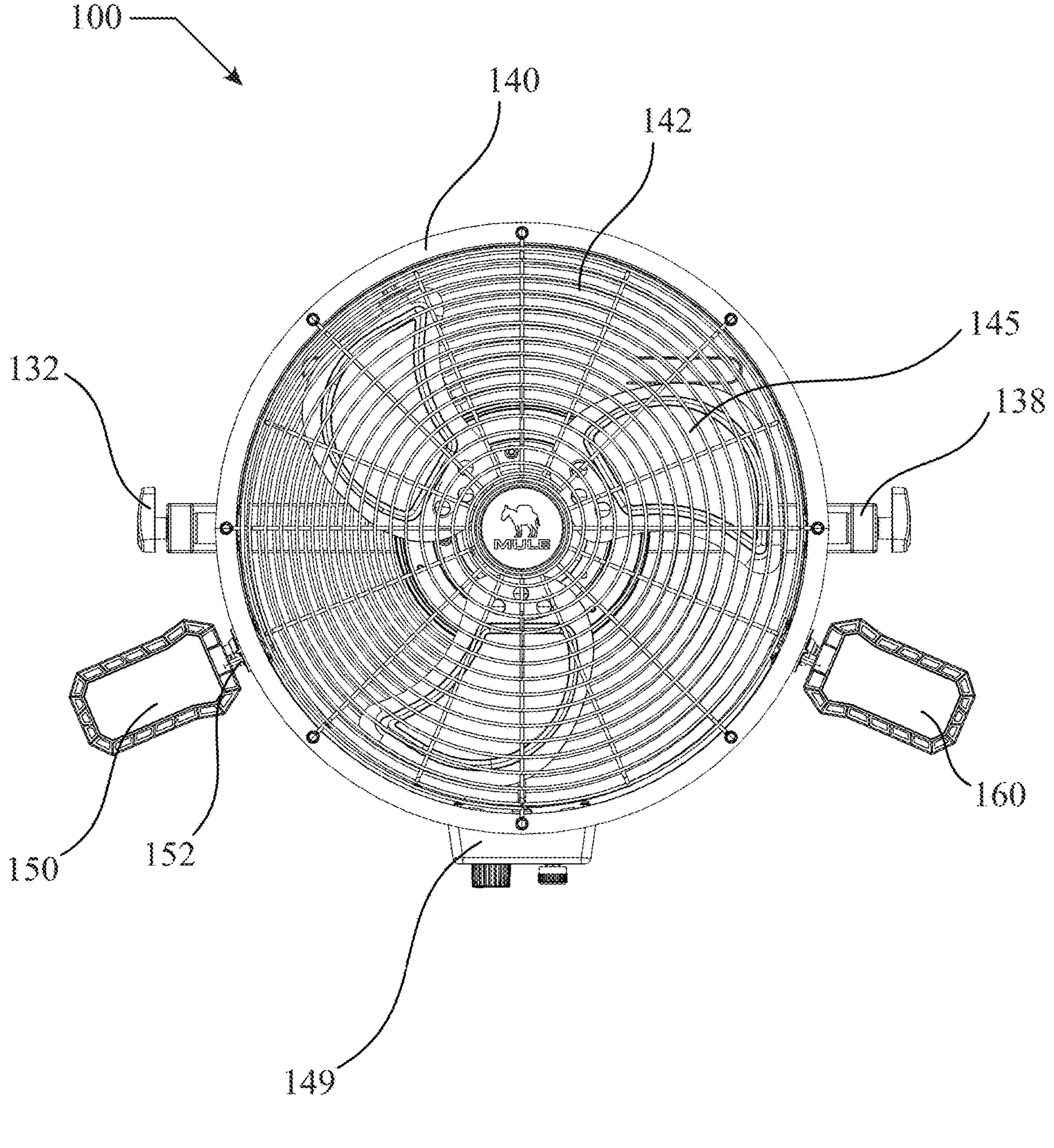

FIG. 25 is a front perspective view of the garage fan with adjustable lights and wall mount of FIG. 21.

Figure 26:
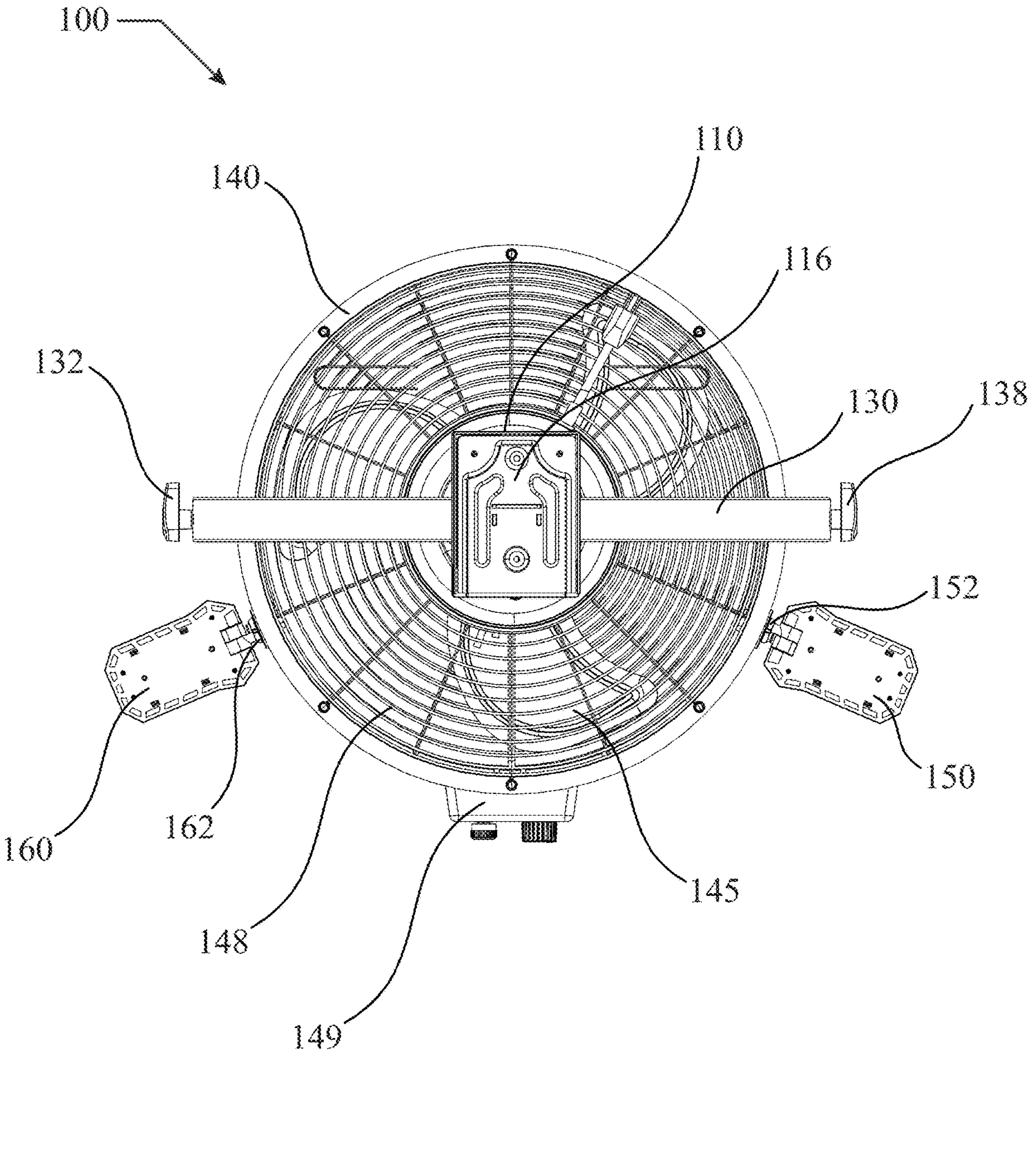

FIG. 26 is a rear perspective view of the garage fan with adjustable lights and wall mount of FIG. 25.

Figure 27:
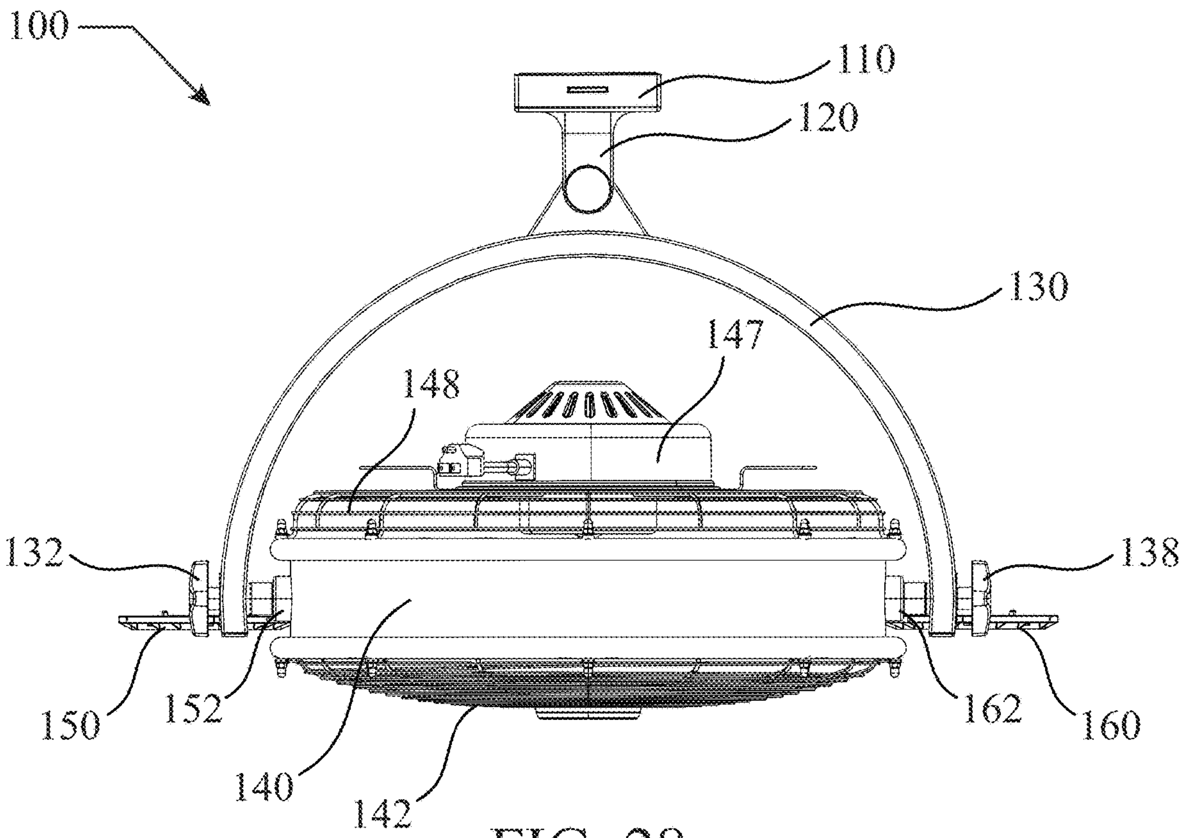

FIG. 27 is a top perspective view of the garage fan with adjustable lights and wall mount of FIG. 21.

Figure 28:
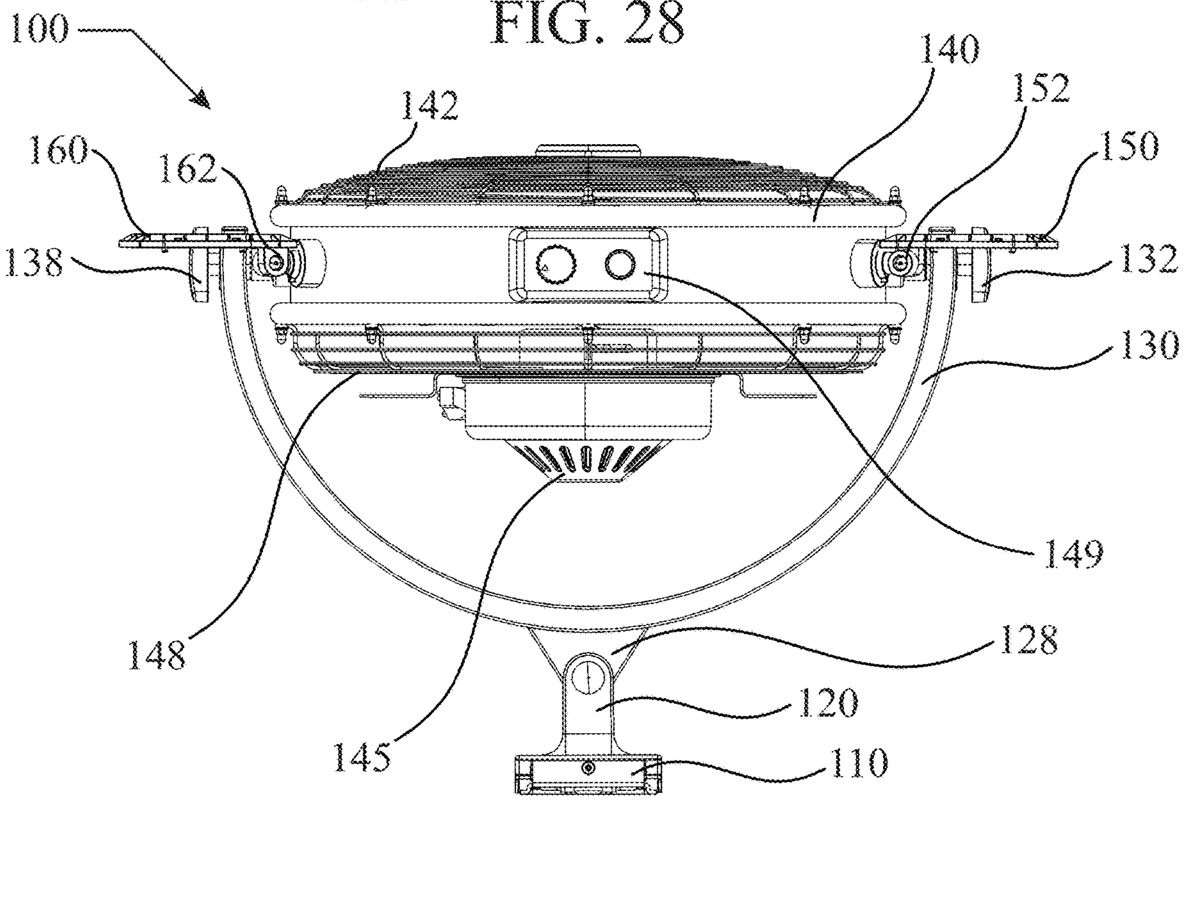

FIG. 28 is a bottom perspective view of the garage fan with adjustable lights and wall mount of FIG. 21.

Figure 29:
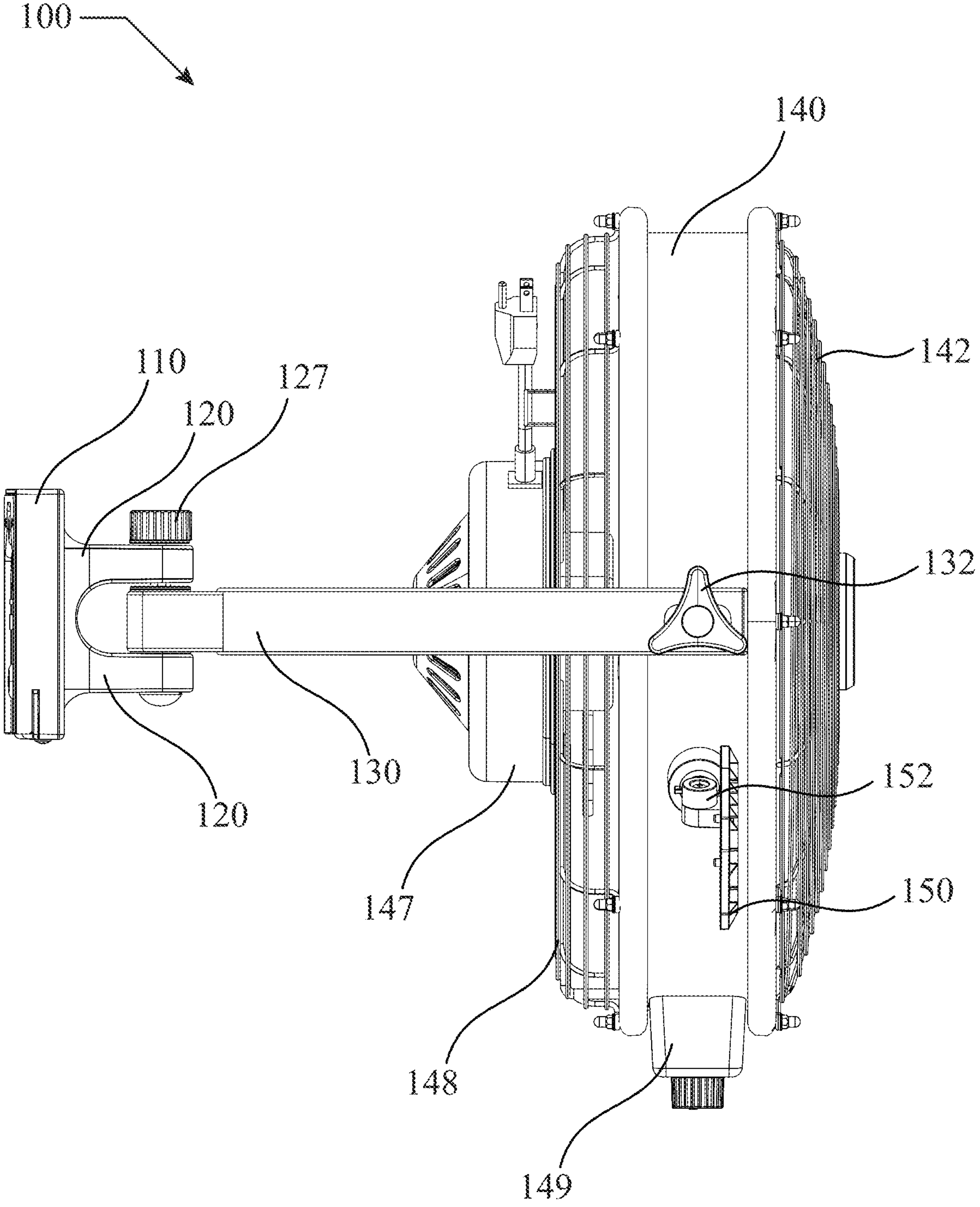

FIG. 29 is a left side perspective view of the garage fan with adjustable lights and wall mount of FIG. 21.

Figure 30:
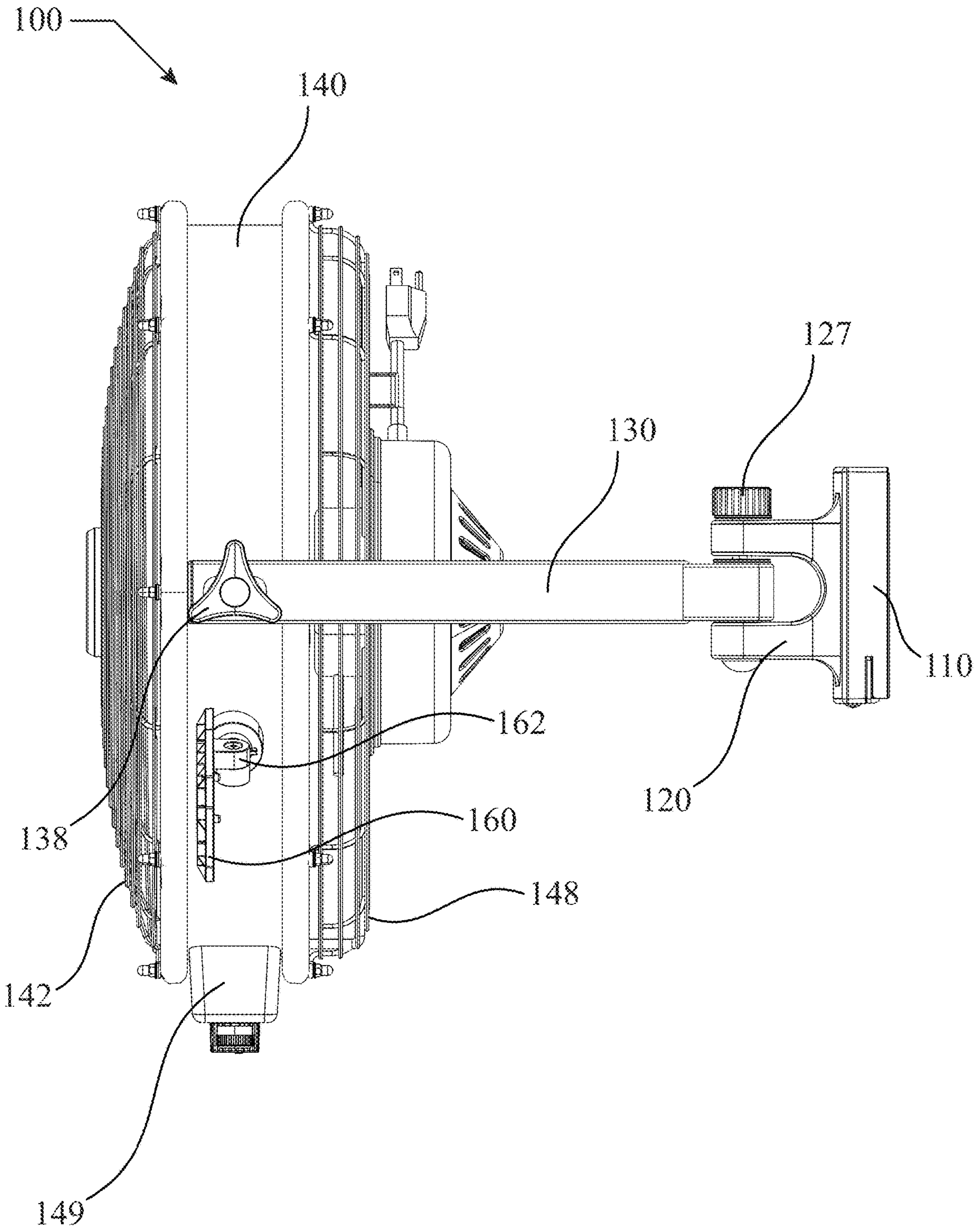

FIG. 30 is a right side perspective view of the garage fan with adjustable lights and wall mount of FIG. 21.

Figure 31:
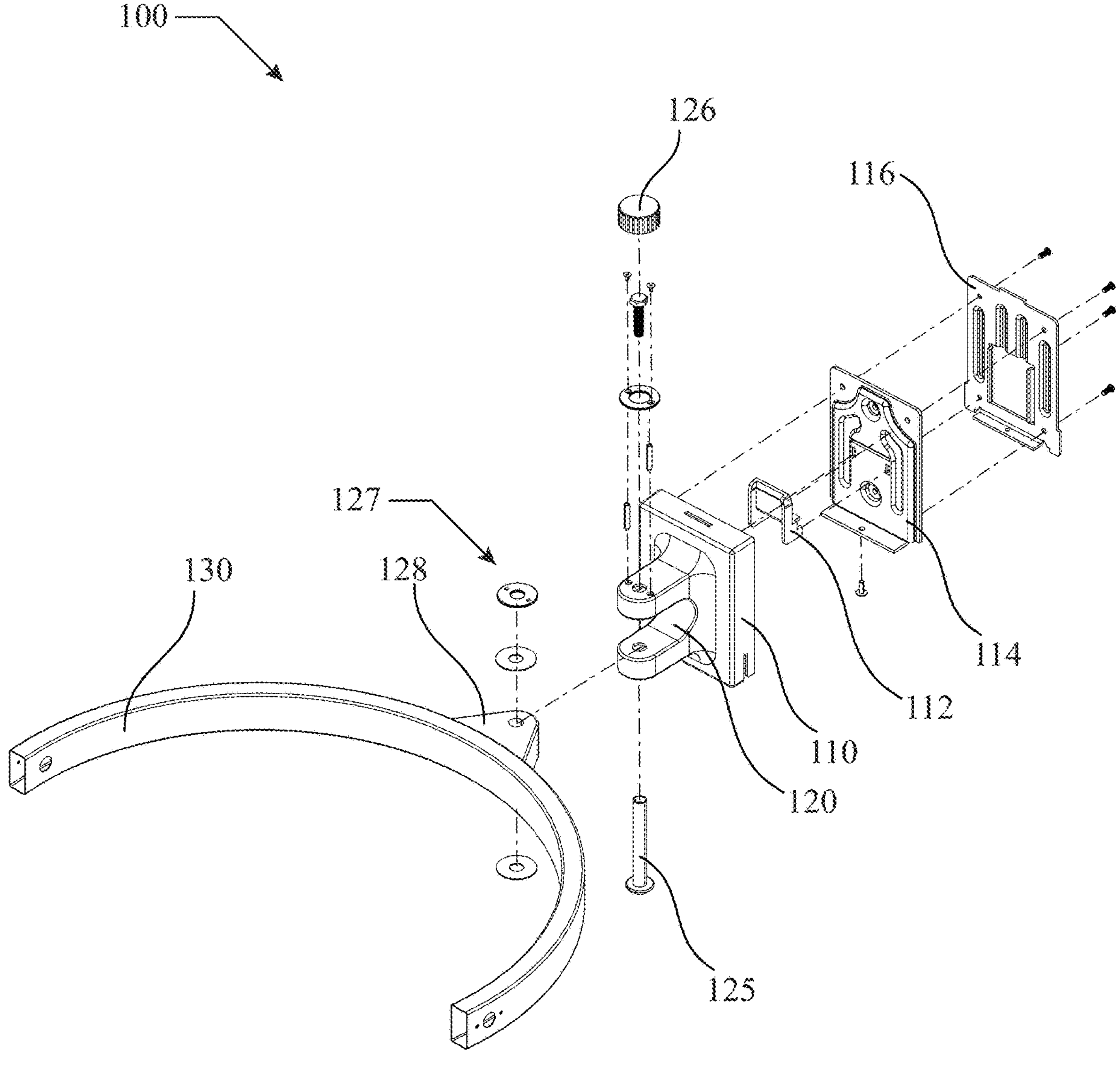

FIG. 31 is an exploded perspective view of the wall mount of the garage fan with adjustable lights and wall mount of FIG. 21.

Figure 32:
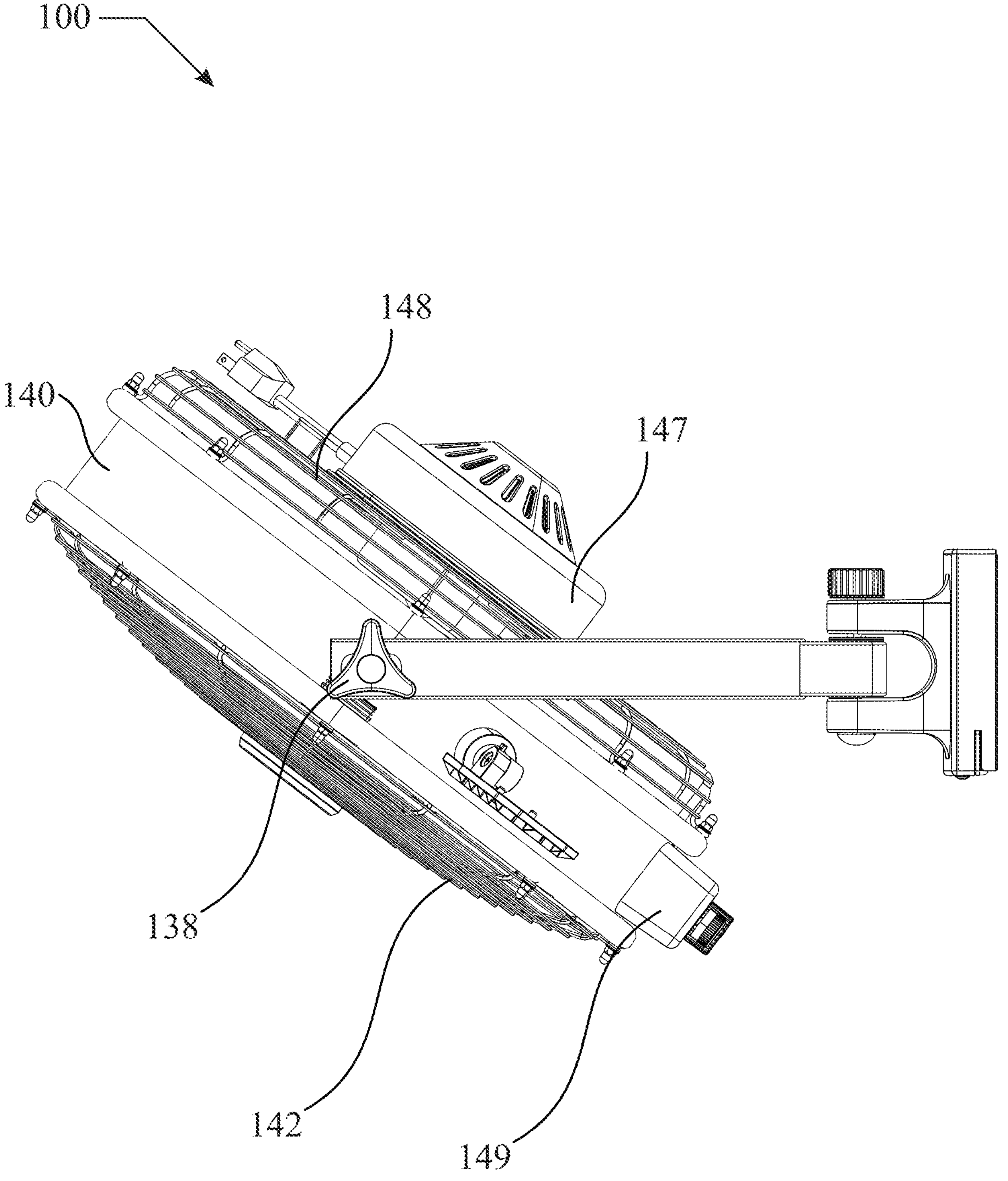

FIG. 32 is another right side perspective view of the garage fan with adjustable lights and wall mount of FIG. 30 with fan pivoted downward.

Figure 33:
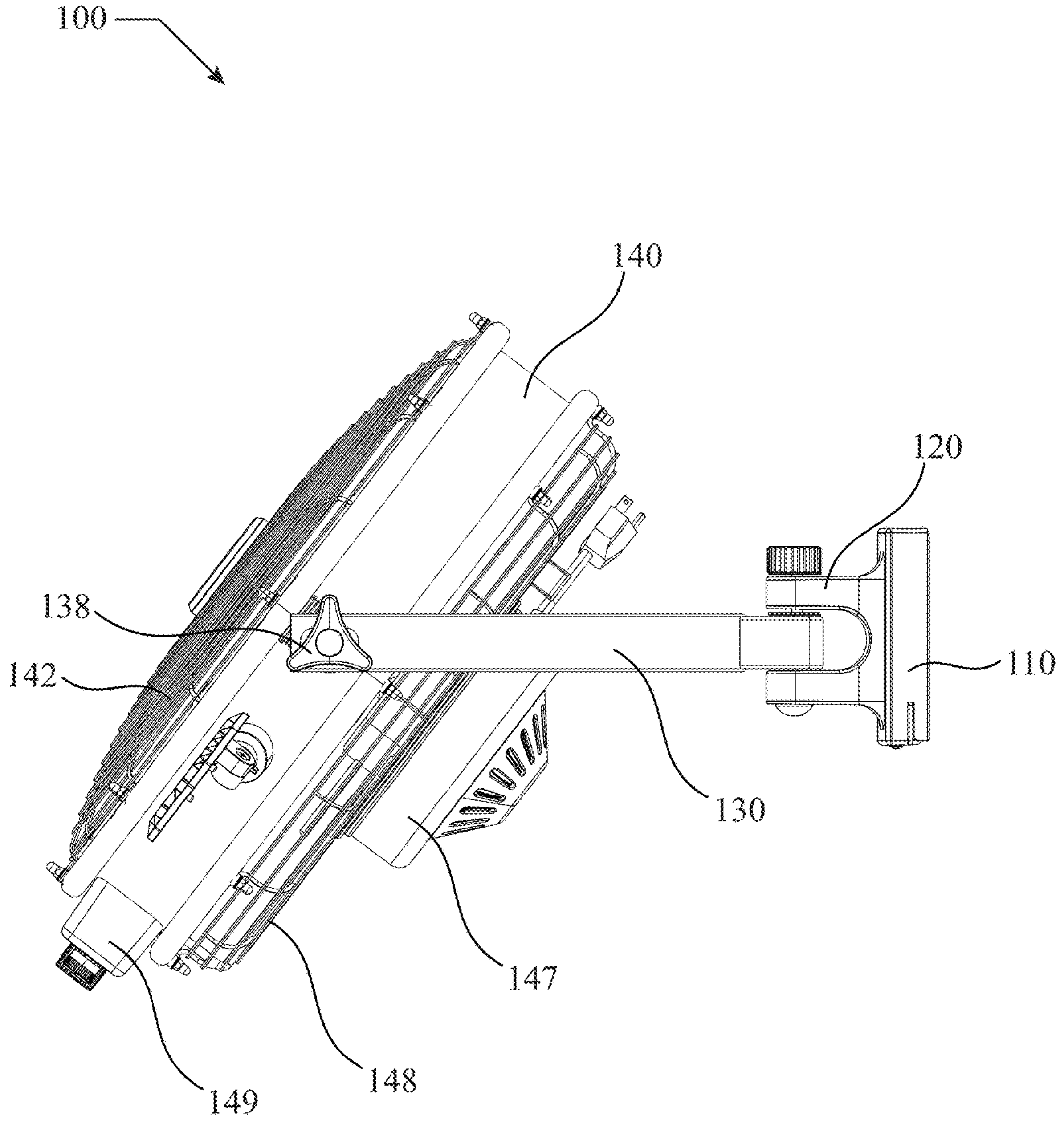

FIG. 33 is another right side perspective view of the garage fan with adjustable lights and wall mount of FIG. 30 with fan pivoted upward.

Figure 34:
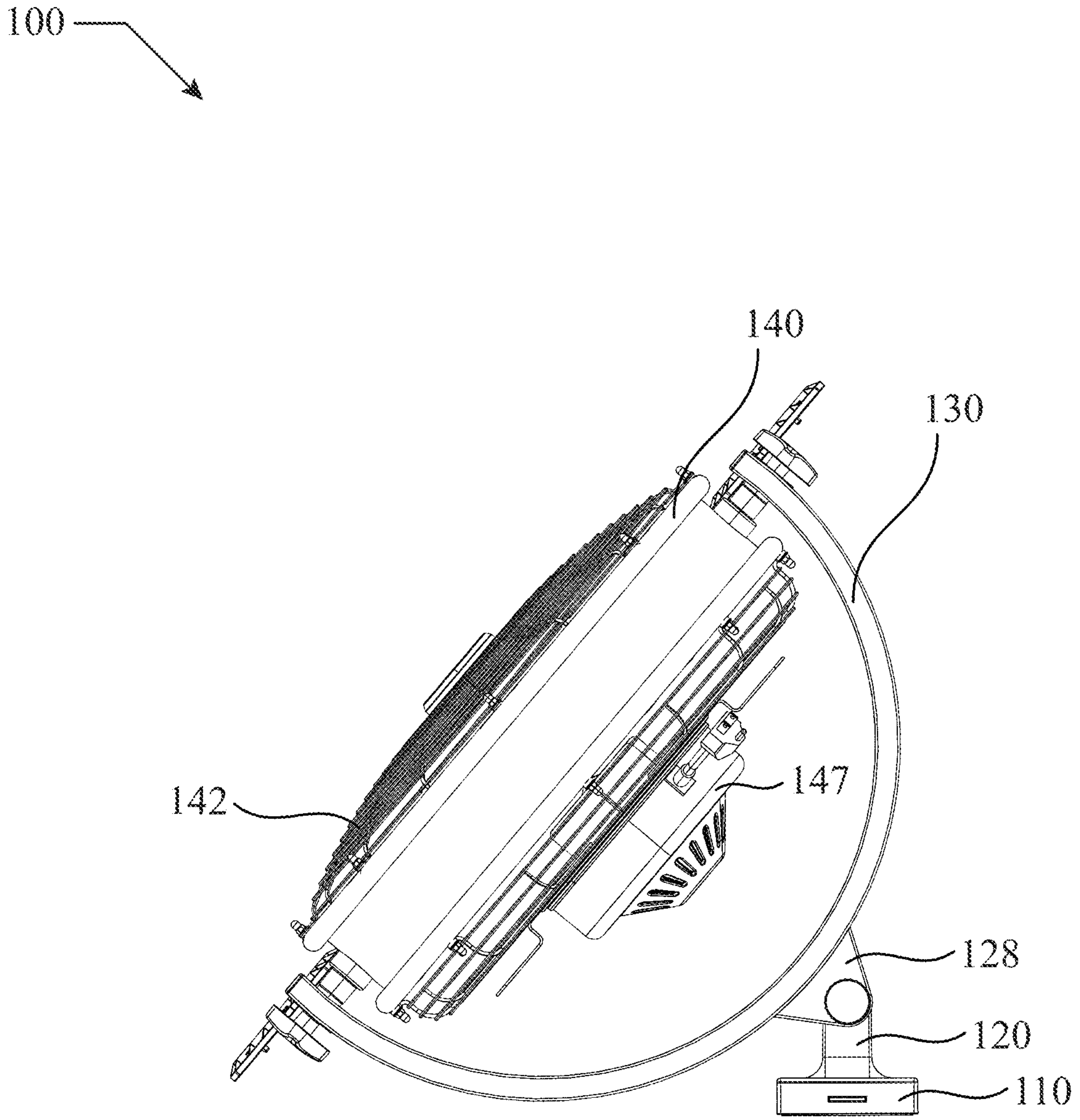
Figure 35:
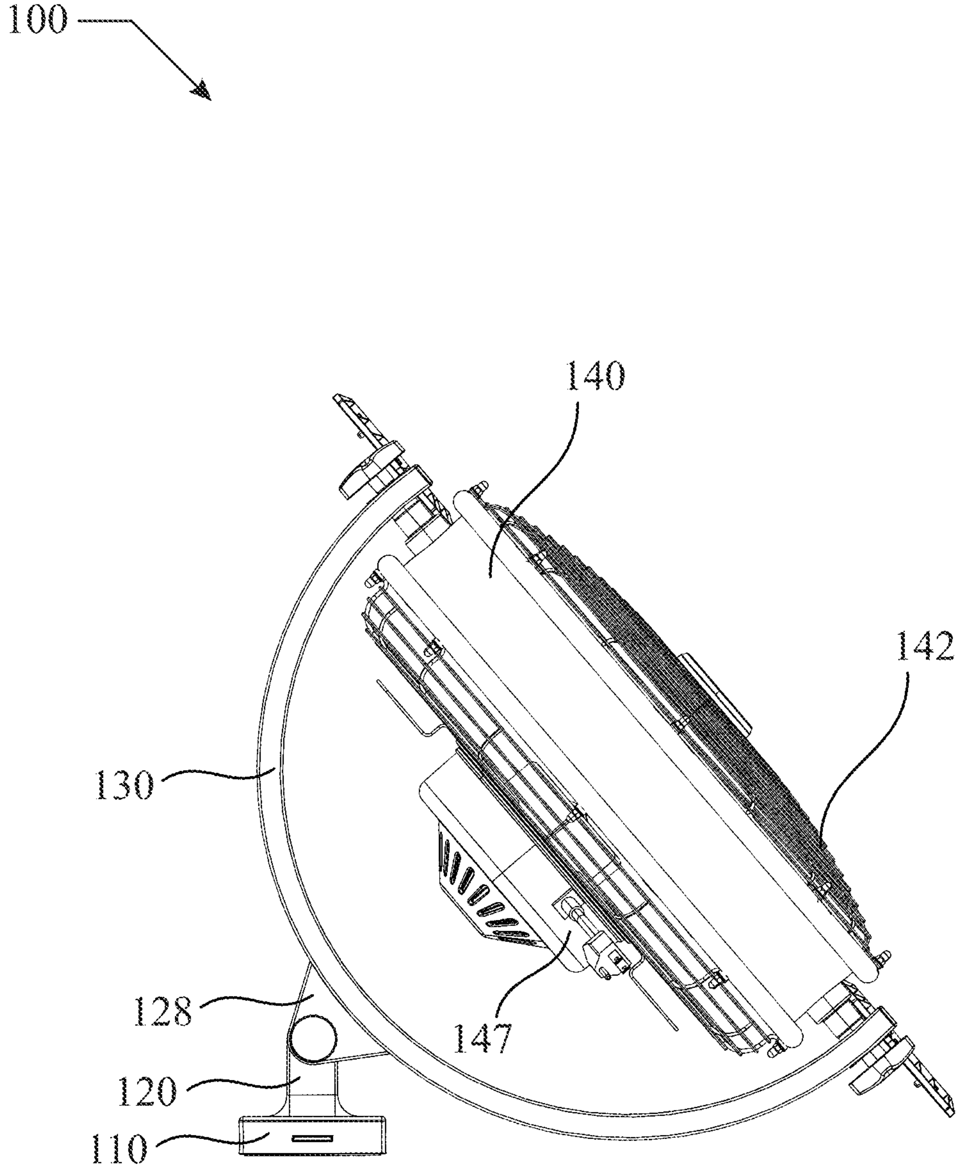

FIG. 34 is another a top perspective view of the garage fan with adjustable lights and wall mount of FIG. 27 with the fan pivoted to the wall mount FIG. 35 is another a top perspective view of the garage fan with adjustable lights and wall mount of FIG. 27 with the ring shaped fan housing pivoted to the right relative to the wall mount.

Figure 36:
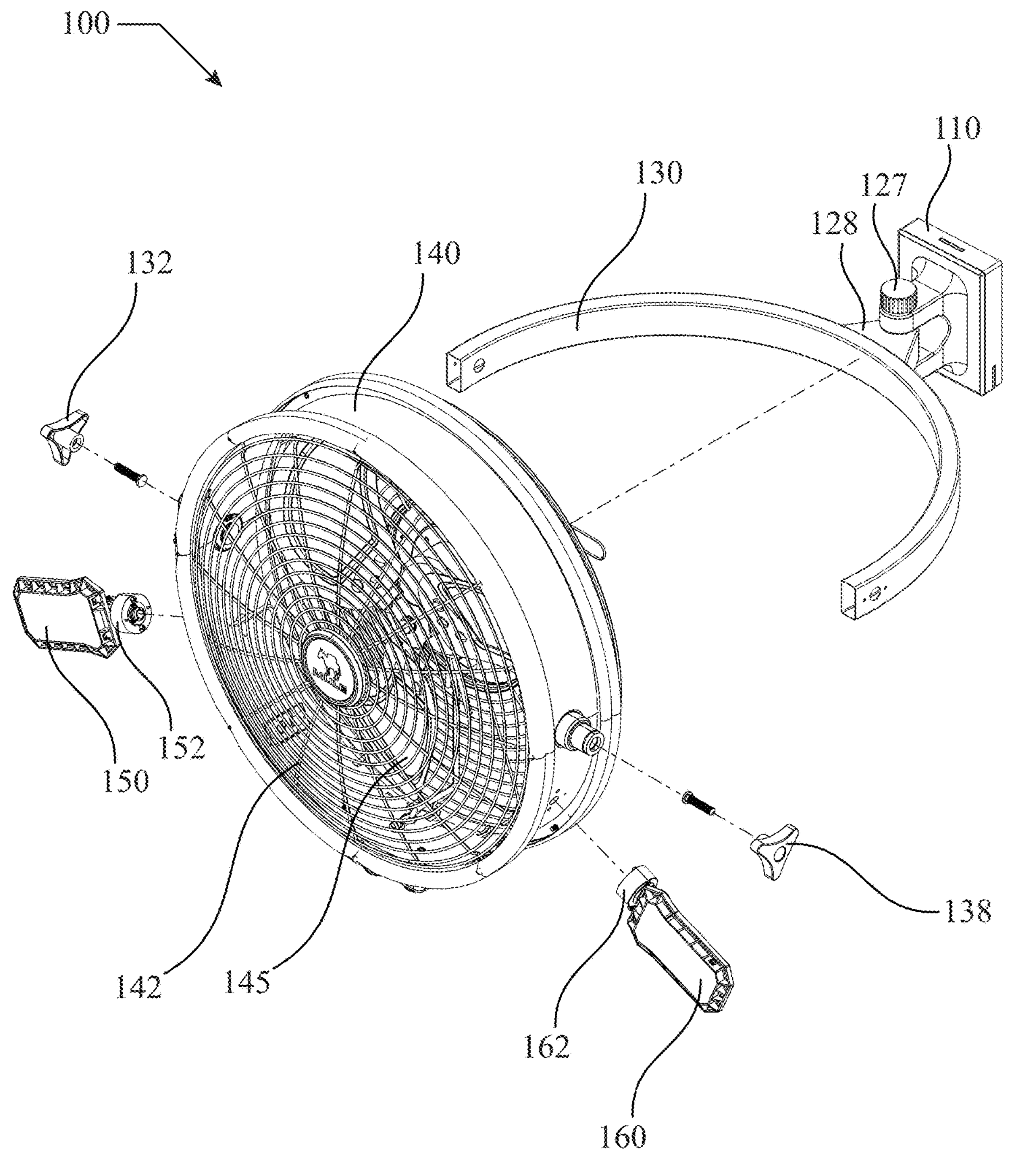

FIG. 36 is an exploded perspective view of the garage fan with adjustable lights and wall mount of FIG. 21.

Ceiling Mount Garage Fan with No Adjustable Lights

Figure 37:
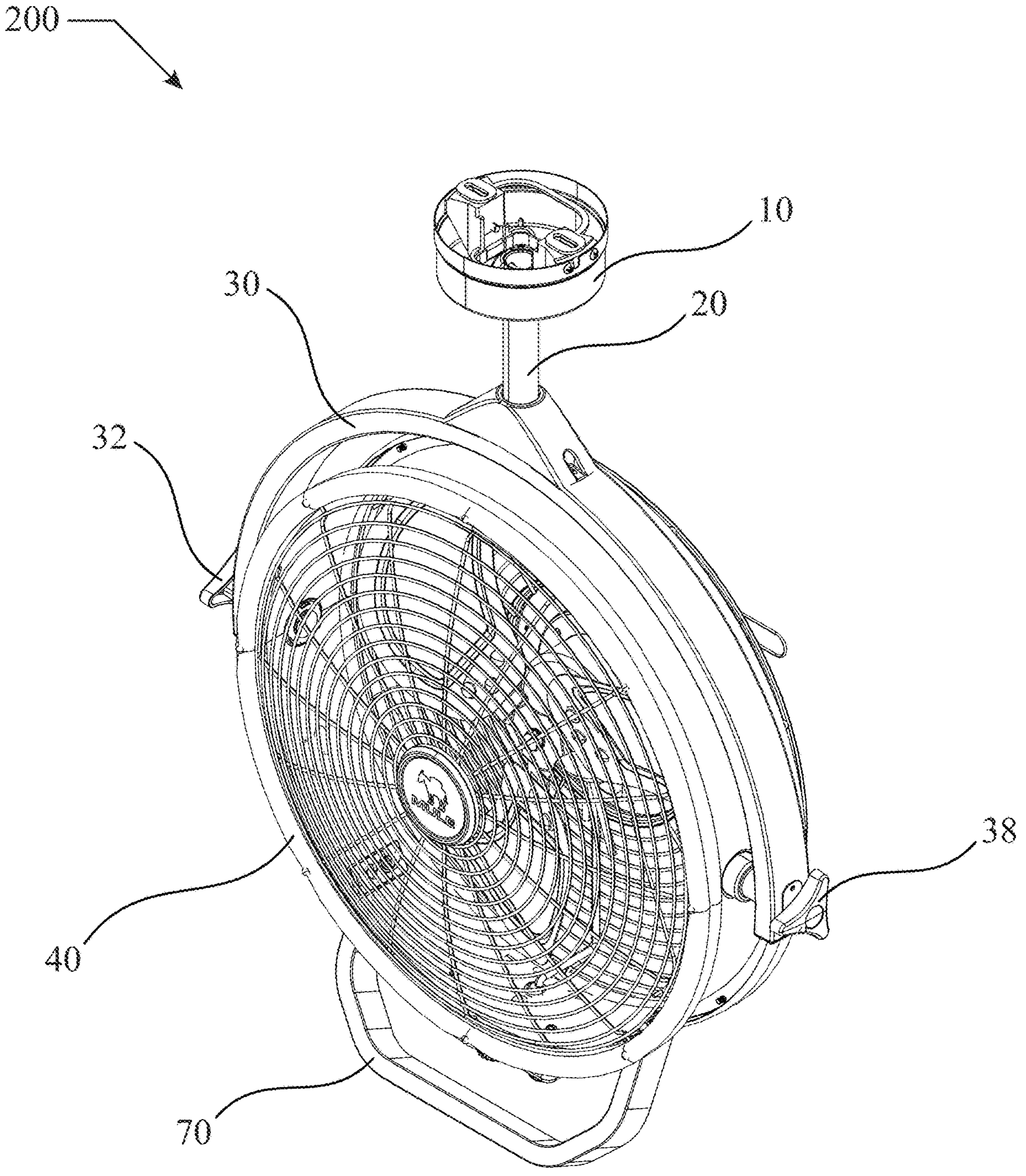

FIG. 37 is a front right perspective view of the garage fan with ceiling mount and no adjustable lights.

Figure 38:
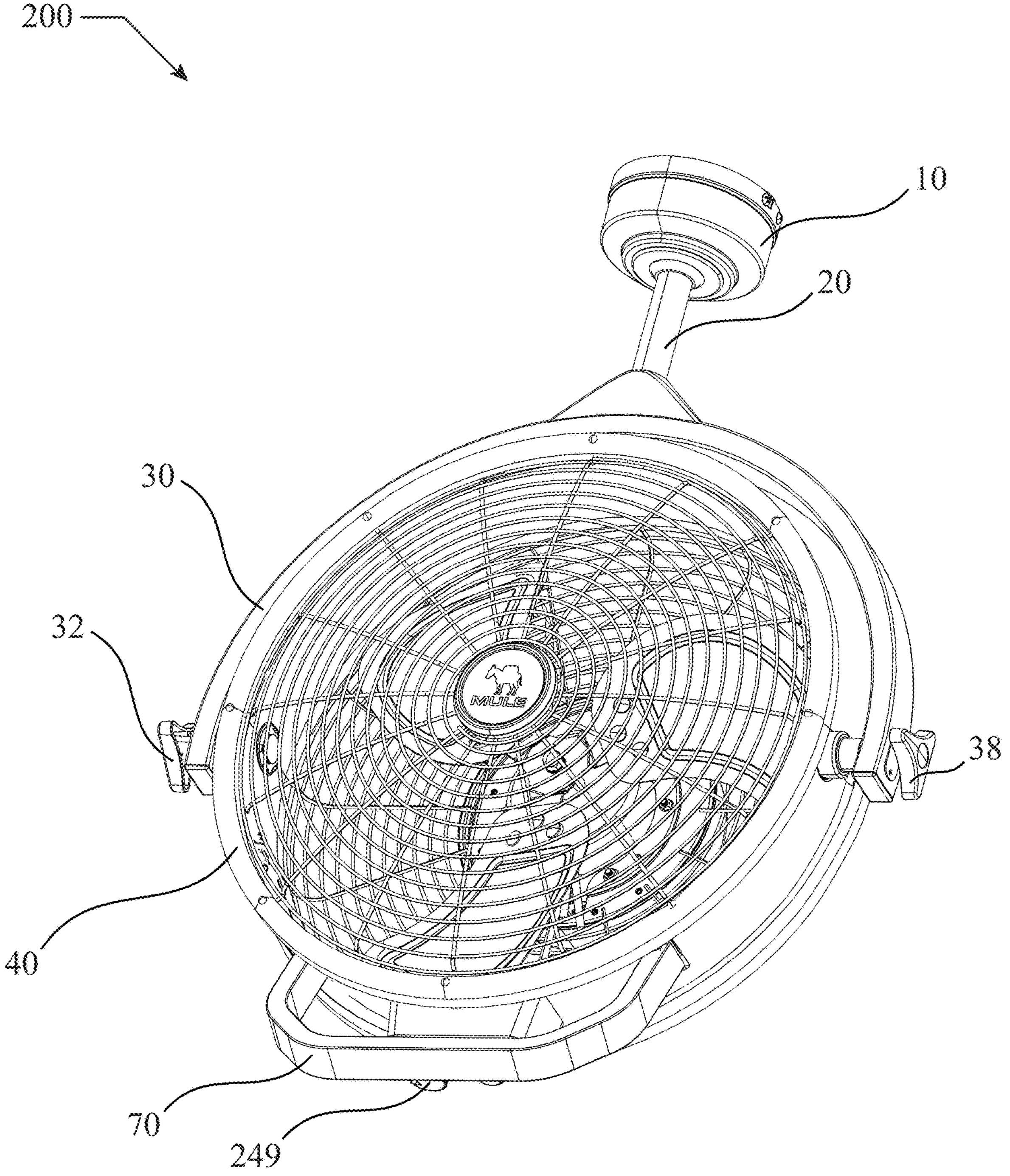

FIG. 38 is a lower front right perspective view of the garage fan with ceiling mount and no adjustable lights of FIG. 37.

Figure 39:
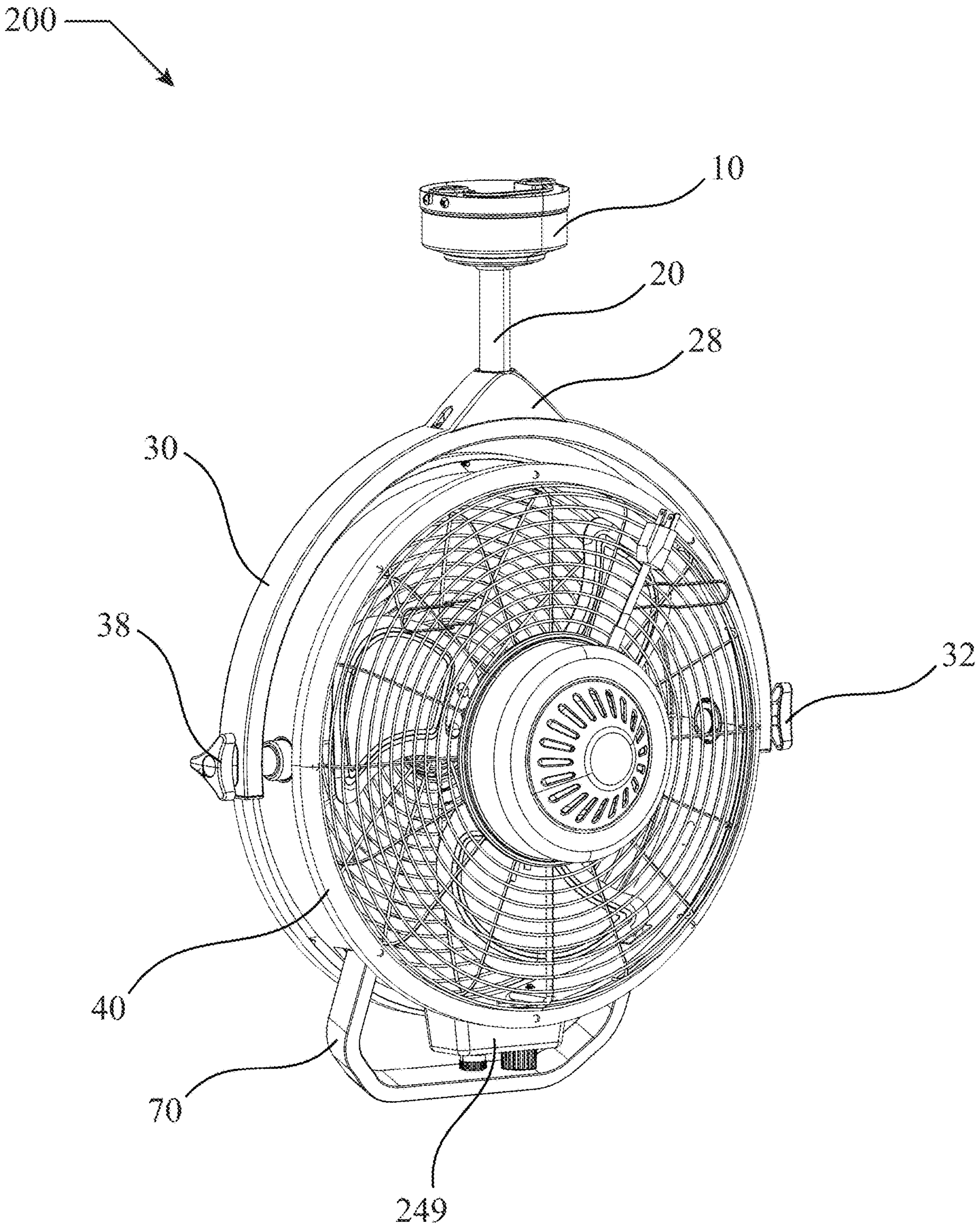

FIG. 39 is a front left perspective view of the garage fan with ceiling mount and no adjustable lights of FIG. 37.

Figure 40:
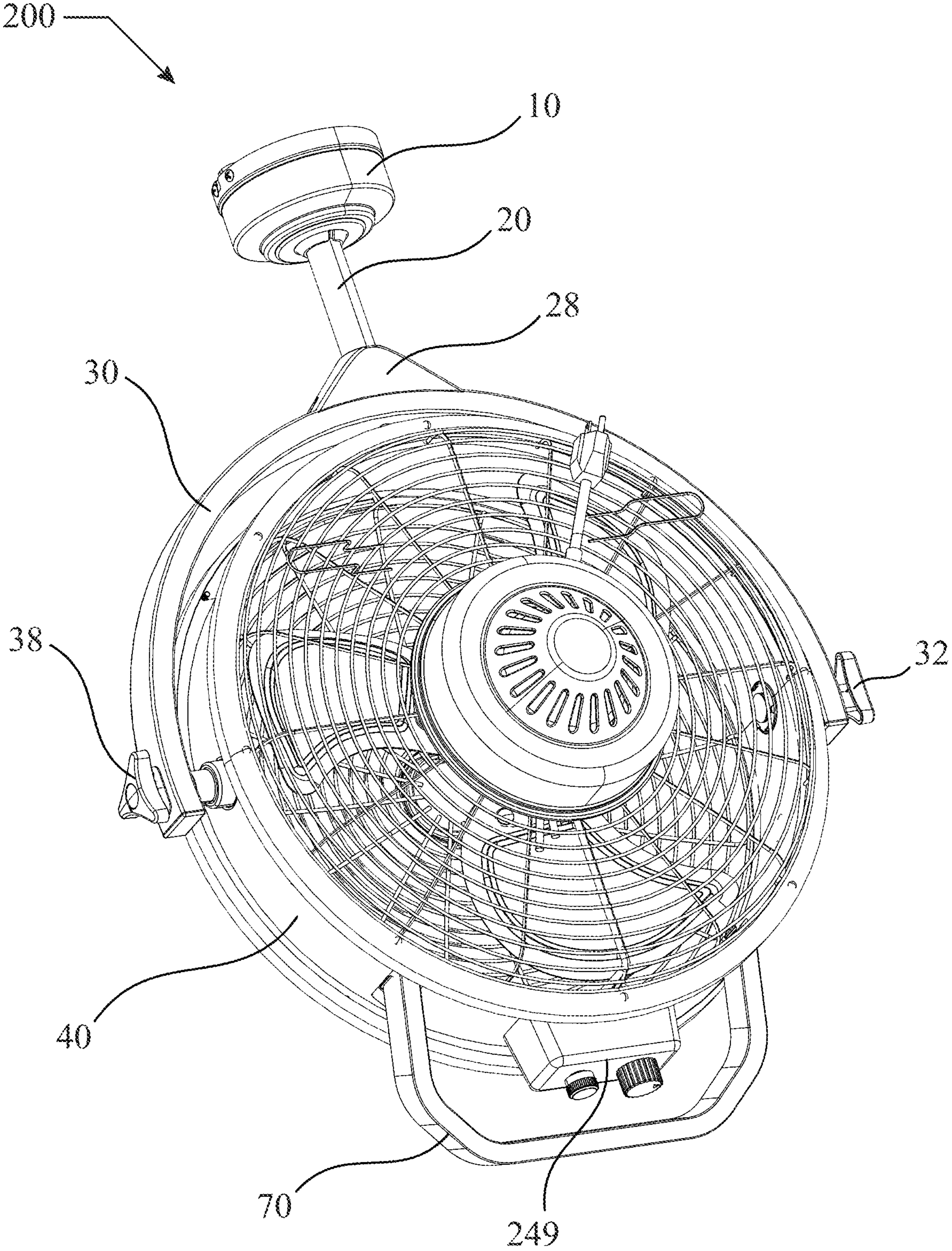

FIG. 40 is a lower front left perspective view of the garage fan with ceiling mount and no adjustable lights of FIG. 37.

Figure 41:
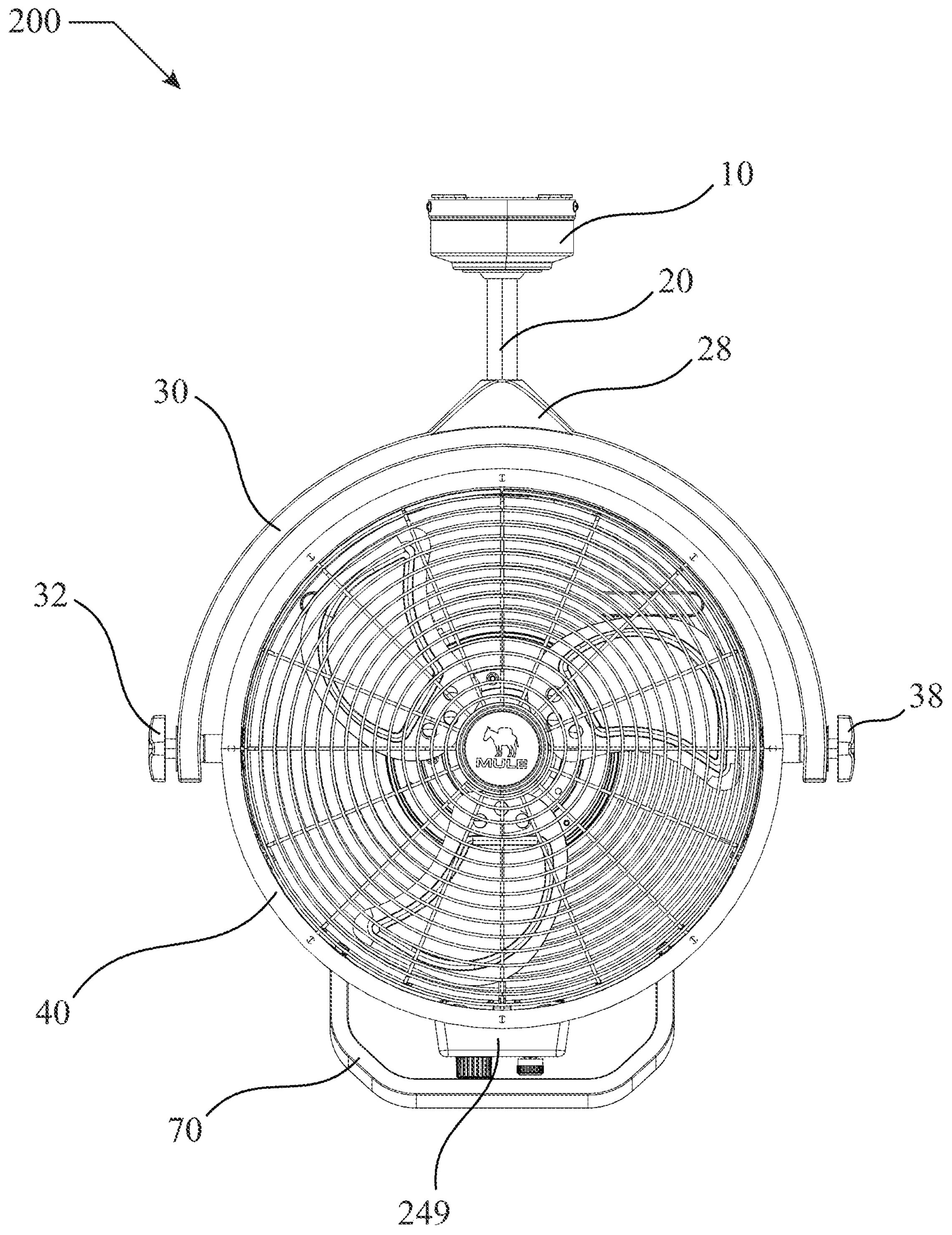

FIG. 41 is a front view of the garage fan with ceiling mount and no adjustable lights of FIG. 37.

Figure 42:
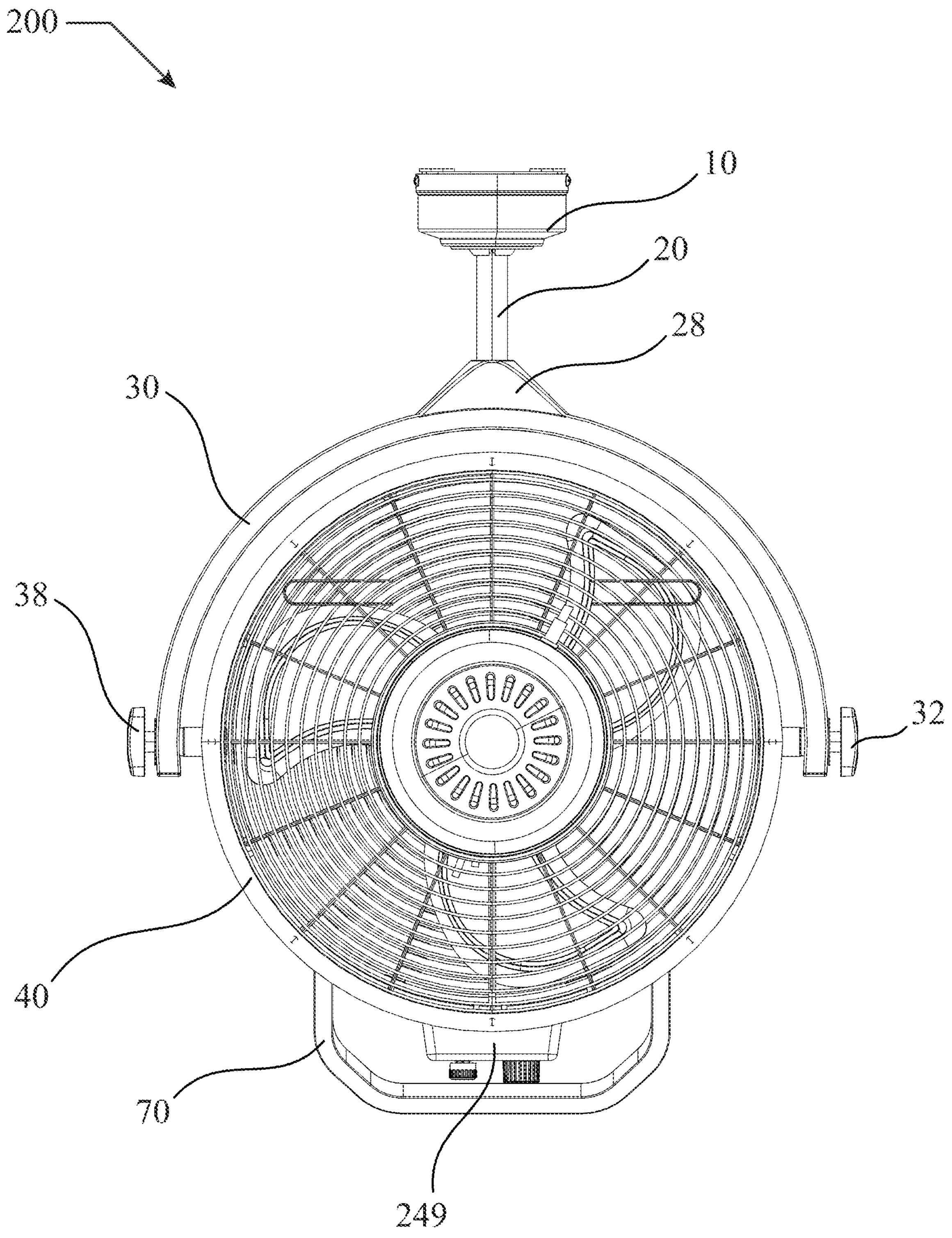

FIG. 42 is a rear view of the garage fan with ceiling mount and no adjustable lights of FIG. 37.

Figure 43:
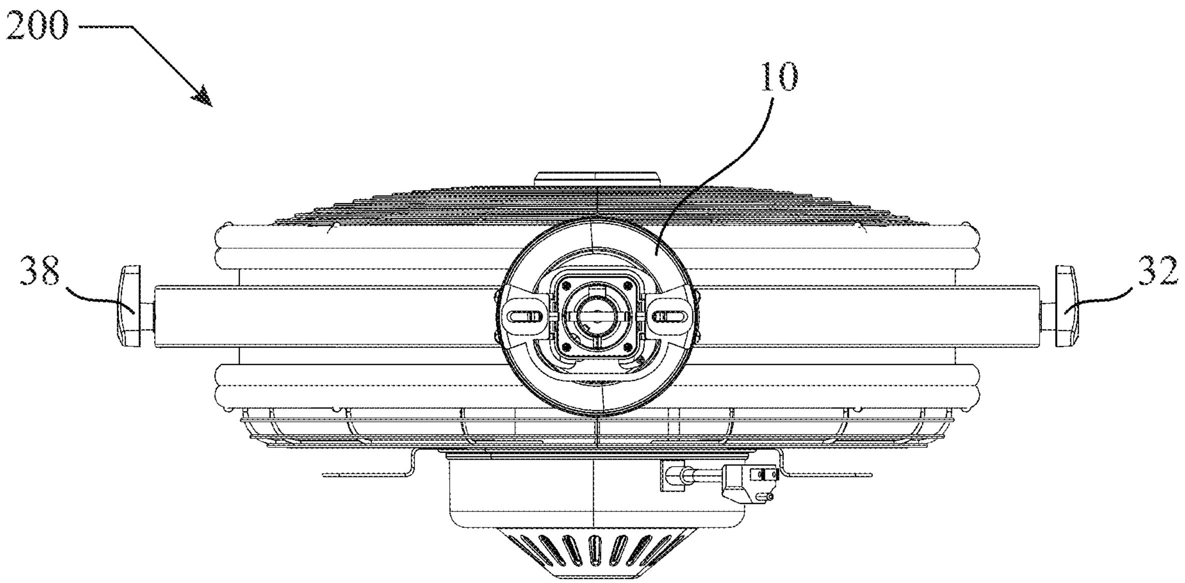

FIG. 43 is a top view of the garage fan with ceiling mount and no adjustable lights of FIG. 37.

Figure 44:
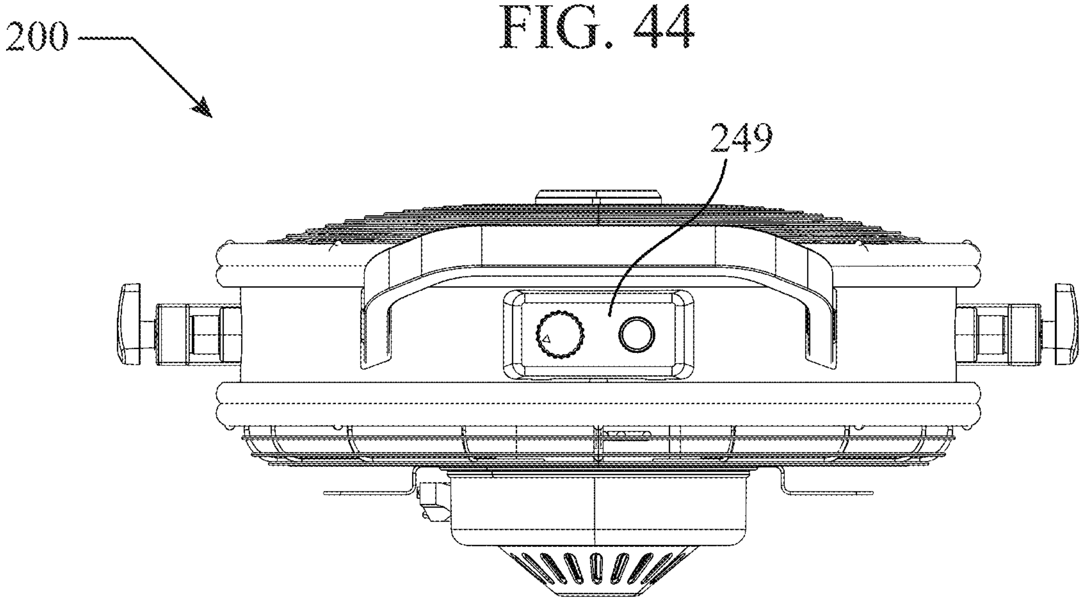

FIG. 44 is a bottom view of the garage fan with ceiling mount and no adjustable lights of FIG. 37.

Figure 45:
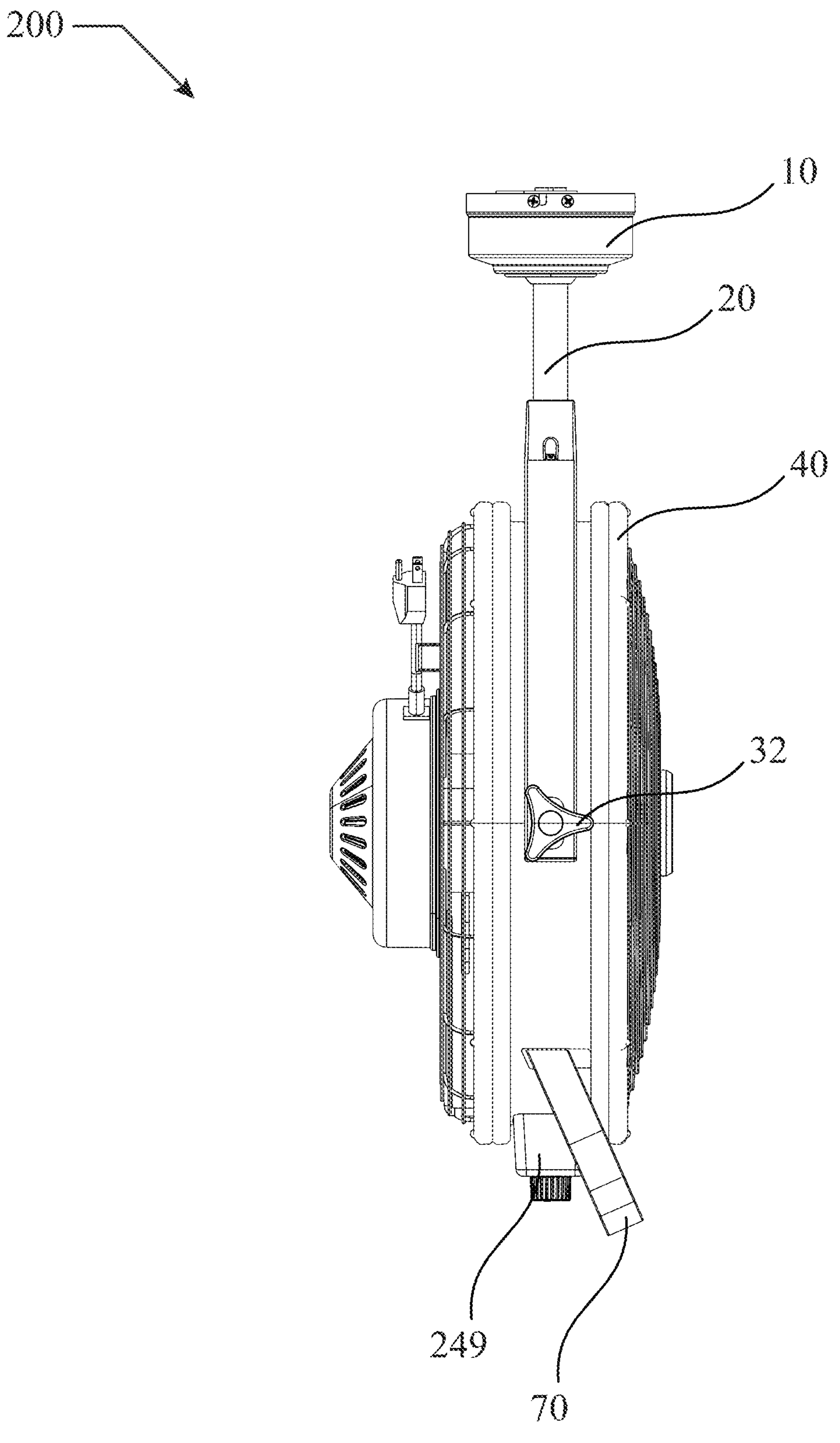

FIG. 45 is a left side view of the garage fan with ceiling mount and no adjustable lights of FIG. 37.

Figure 46:
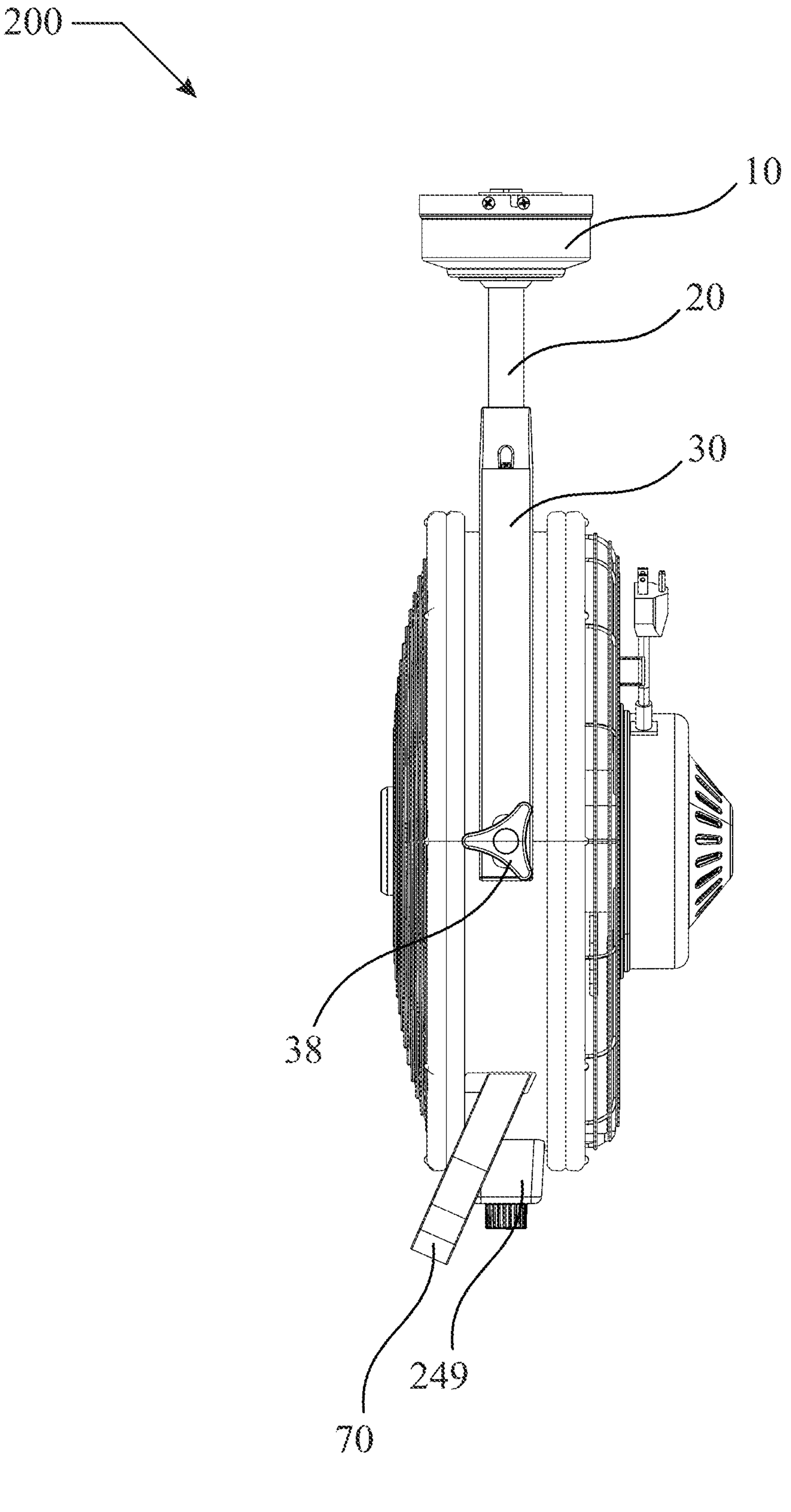

FIG. 46 is a right side view of the garage fan with ceiling mount and no adjustable lights of FIG. 37.

Figure 47:
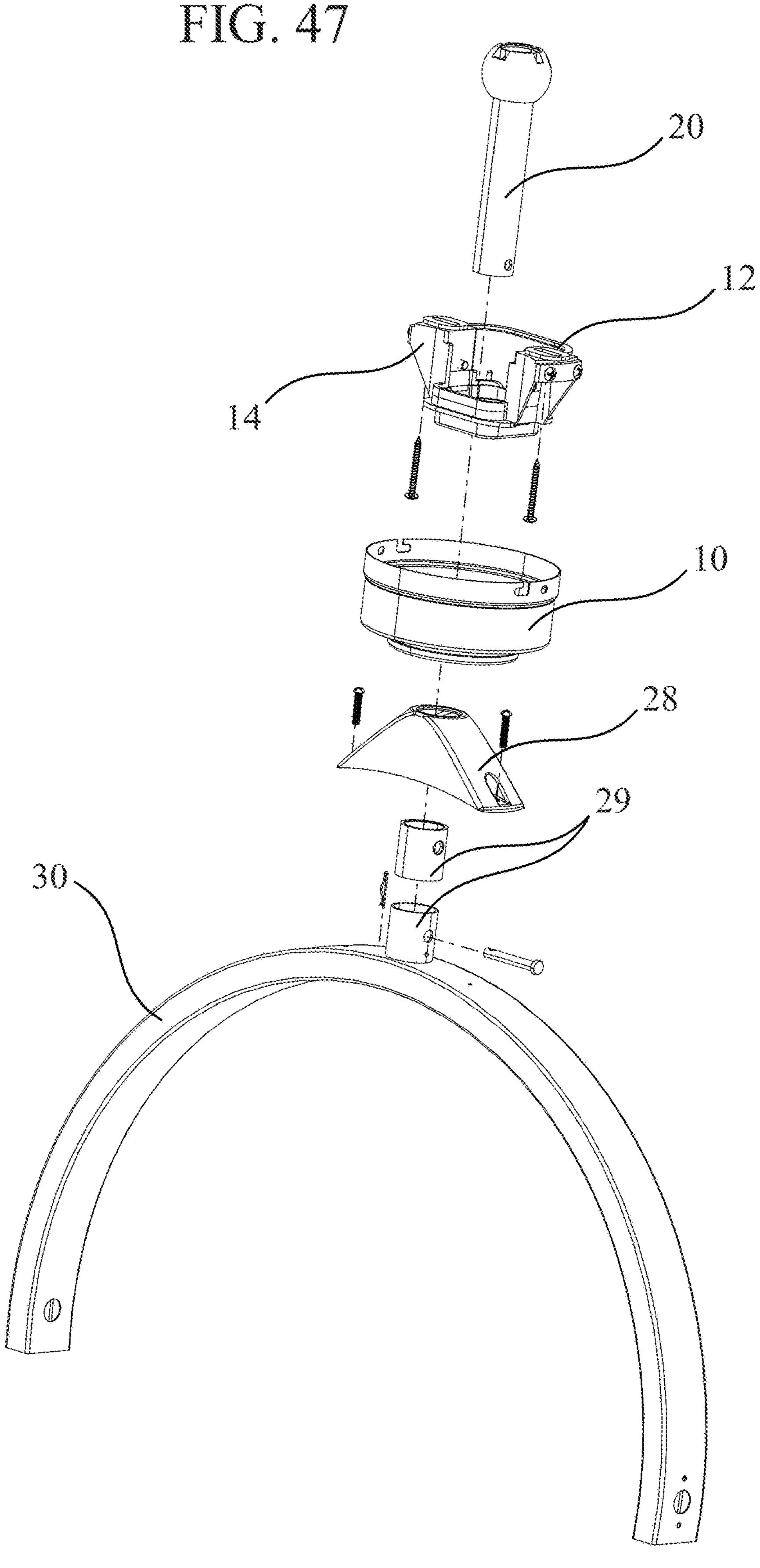

FIG. 47 is an exploded view of the ceiling mount of the garage fan with ceiling mount and no adjustable lights of FIG. 37.

Figure 48:
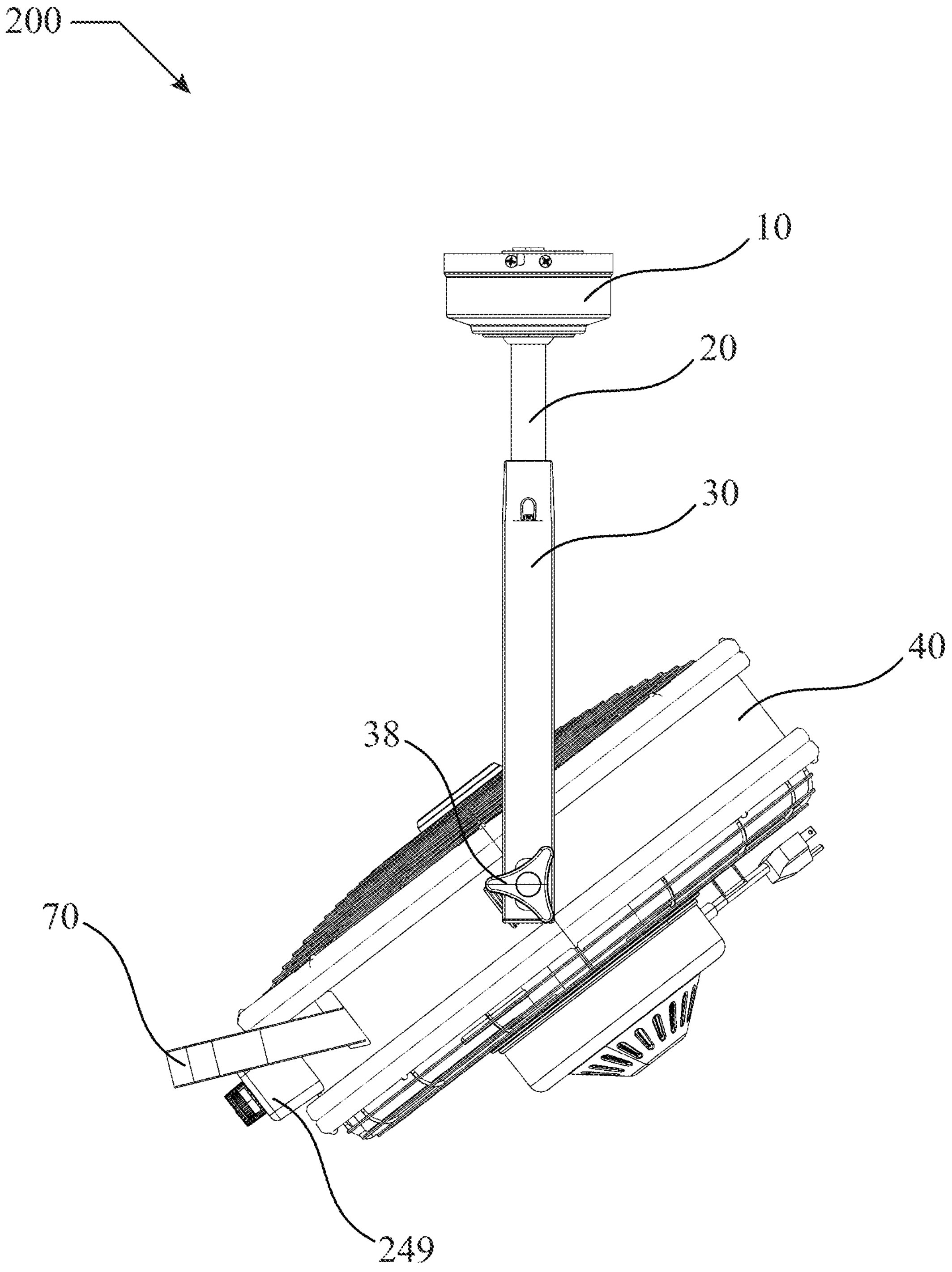

FIG. 48 is another right side view of the garage fan with ceiling mount and no adjustable lights of FIG. 46 with the fan pivoted upward.

Figure 49:
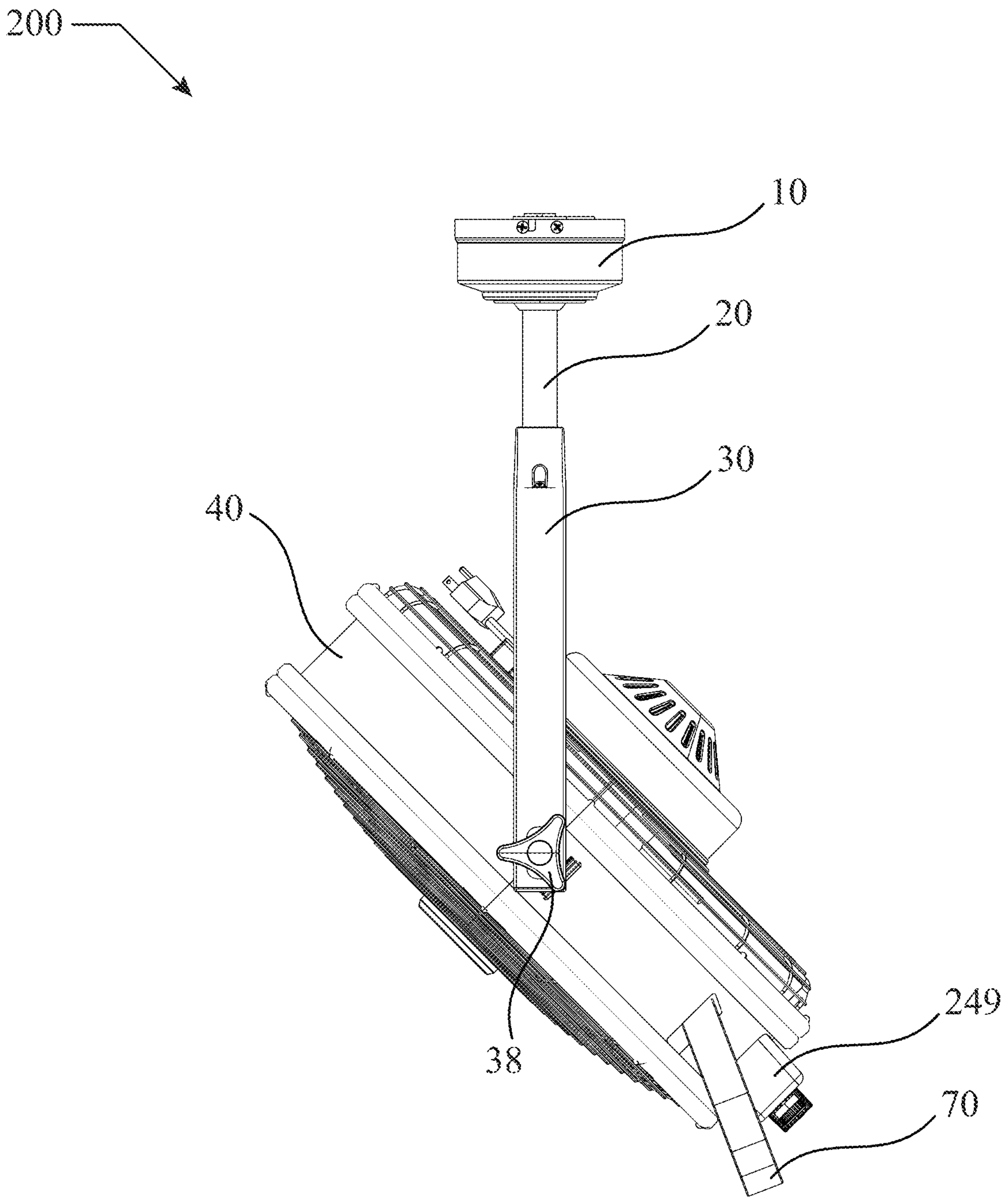

FIG. 49 is another right side view of the garage fan with ceiling mount and no adjustable lights of FIG. 46 with the fan pivoted downward.

Figure 50:
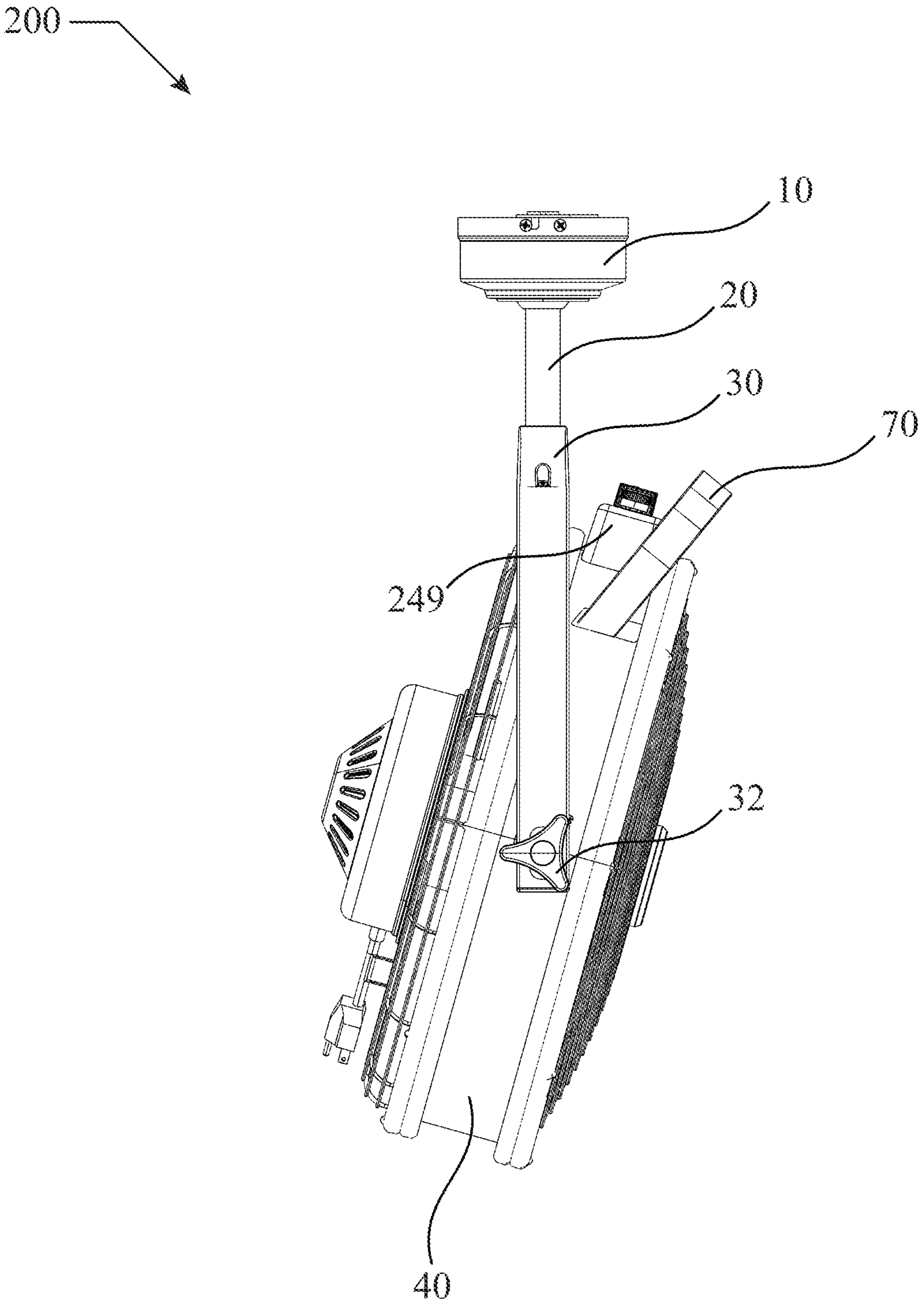

FIG. 50 is another left side view of the garage fan with ceiling mount and no adjustable lights of FIG. 45 with fan pivoted downward.

Figure 51:
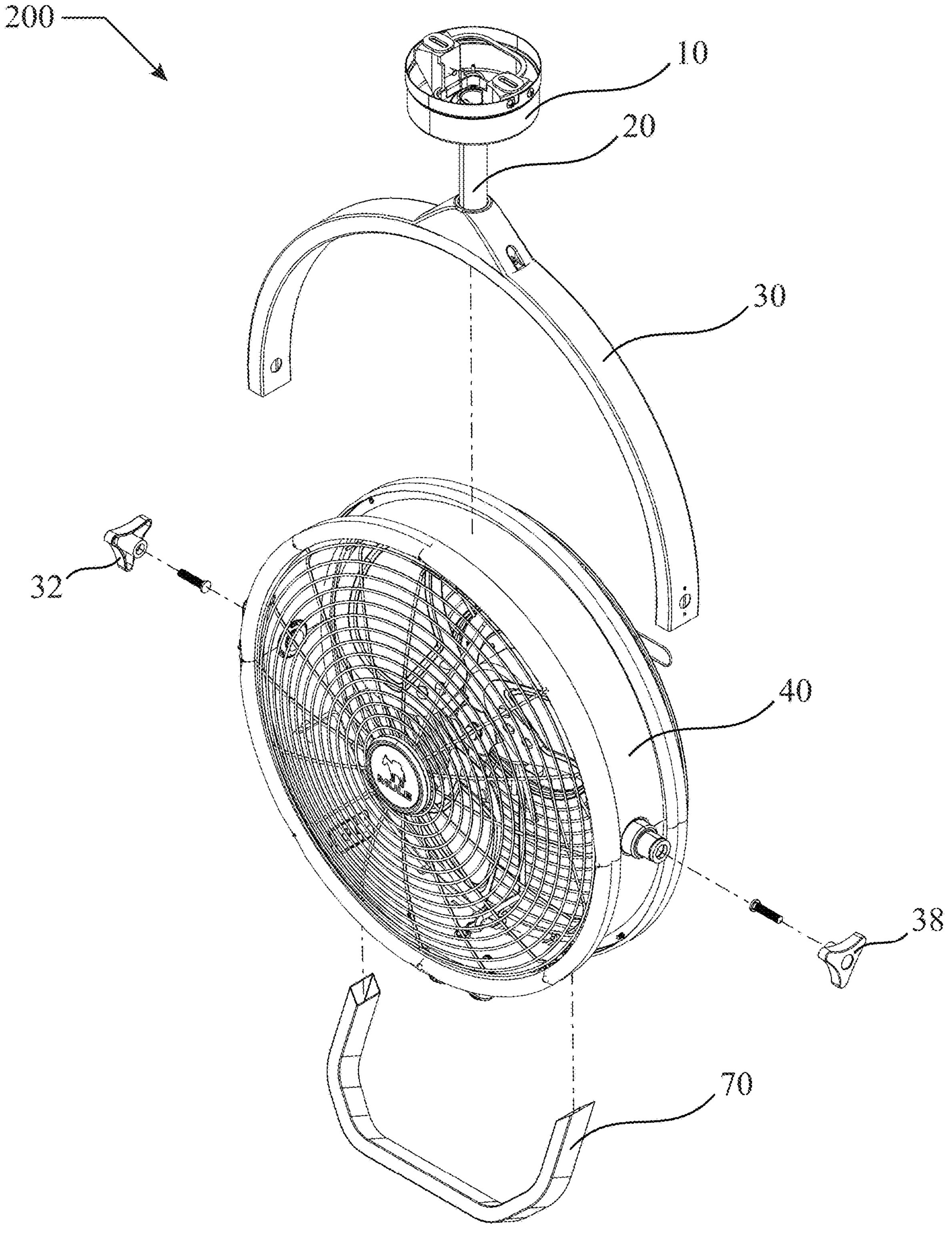

FIG. 51 is an exploded view of the garage fan with ceiling mount and no adjustable lights of FIG. 37.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Other technical advantages may become readily apparent to one of ordinary skill in the art after review of the following figures and description.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise specifically noted, articles depicted in the drawings are not necessarily drawn to scale.

A list of components will now be described.

1. Garage Fan with Adjustable lights ceiling mounted
10 Ceiling Canopy
12 internal mount flanges with openings for fasteners
20 vertical support post
28 lower bracket
30 lower extending C bracket
32 left pivot adjustment knob
38 right pivot adjustment knob
40 fan housing-ring shaped
42 front grill
45 main blades with motor
48 rear grill
49 fan light/speed controls
50 left light paddle with front side lights
52 left paddle rotate and pivot connection
60 right light paddle with front side lights

62 right paddle rotate and pivot connection.
70 U-shaped handle
72 upper left end of U-shaped handle
78 upper right end of U-shaped handle
80 cord tabs
85 plug on power cord
100 garage fan with adjustable lights wall mounted
110 wall mount
112 support bracket
114 middle support plate
116 wall support plate
120 parallel flanges
125 pivot rod with knob
126 locking knob
127 screw/bolt with washers and additional mounting screws
128 protruding end on side facing C bracket
130 side facing C bracket
132 left pivot adjustment knob
138 right pivot adjustment knob
140 fan housing-ring shaped
142 front grill
145 main blades with motor
148 rear grill
150 left light paddle with front side lights
152 left paddle rotate and pivot connection
160 right light paddle with front side lights
162 right paddle rotate and pivot connection.
200 Garage Fan with No Adjustable lights ceiling mounted
249 fan controls 49 can include a pair of rotatable knobs.

Ceiling Mount Garage Fan with Adjustable Lights

Figure 2:
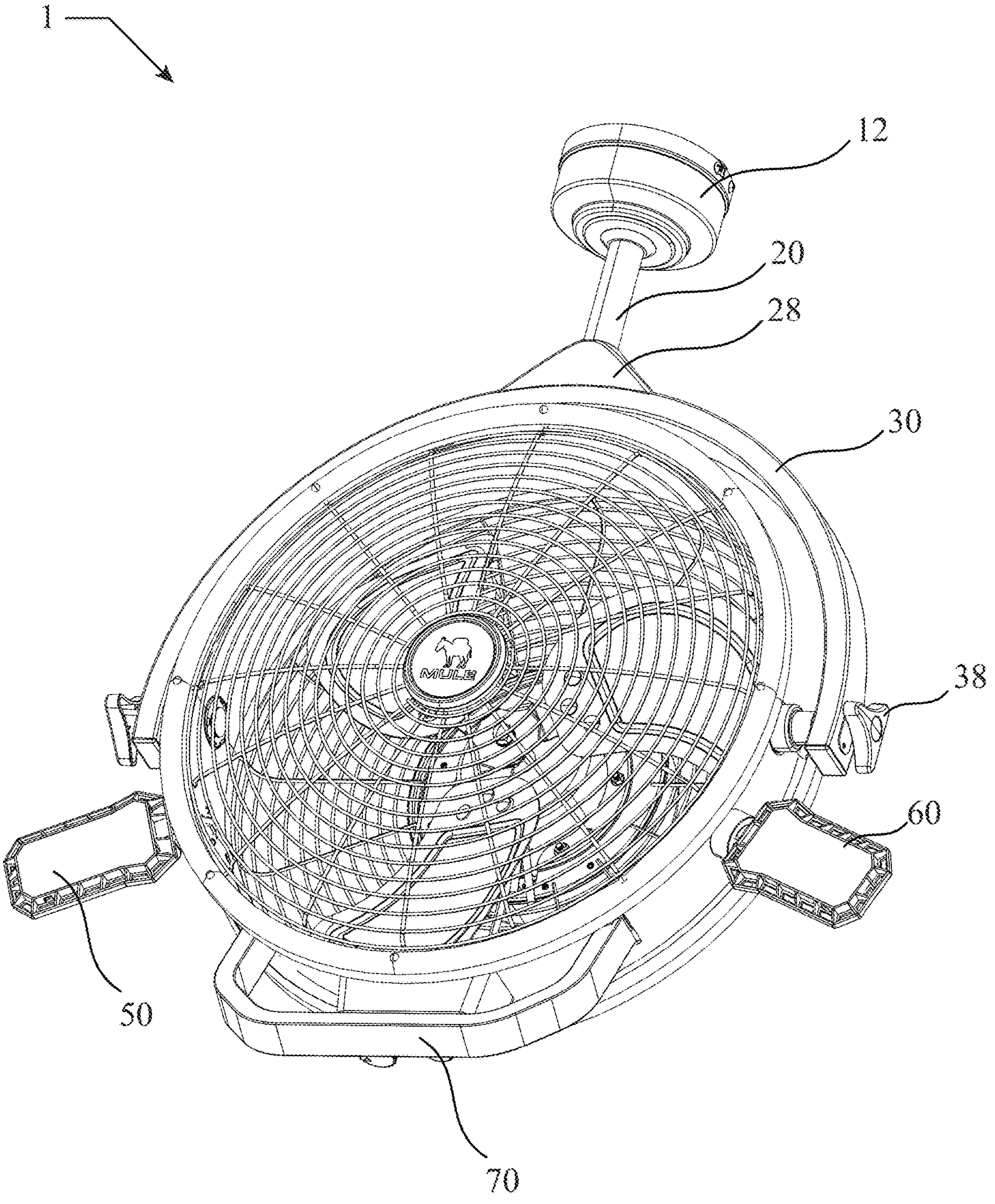
FIG. 2 is a lower front right perspective view of the garage fan with adjustable lights and ceiling mount of FIG. 1.
Figure 3:
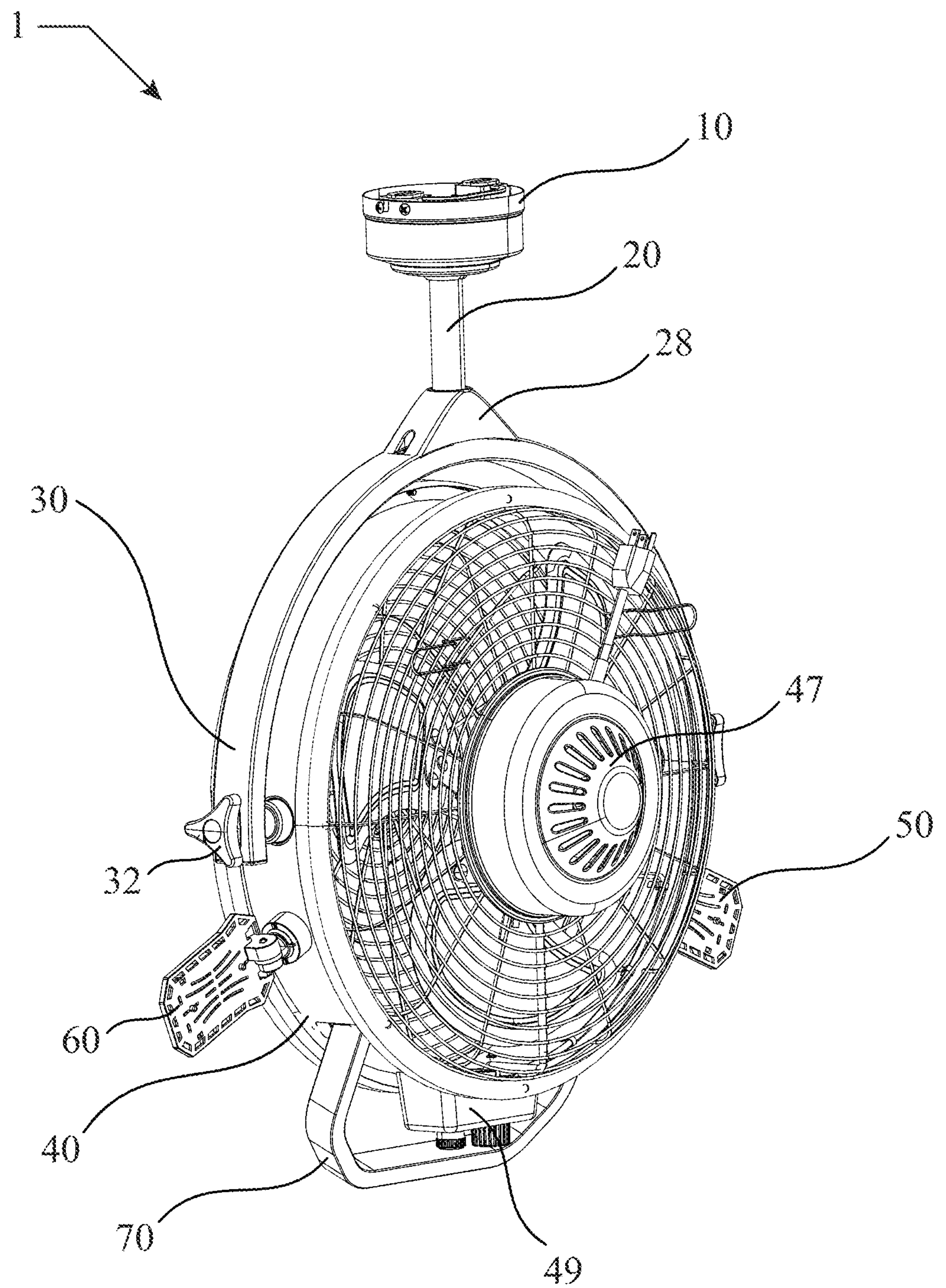
FIG. 3 is an upper front left perspective view of the garage fan with adjustable lights and ceiling mount of FIG. 1.
Figure 4:
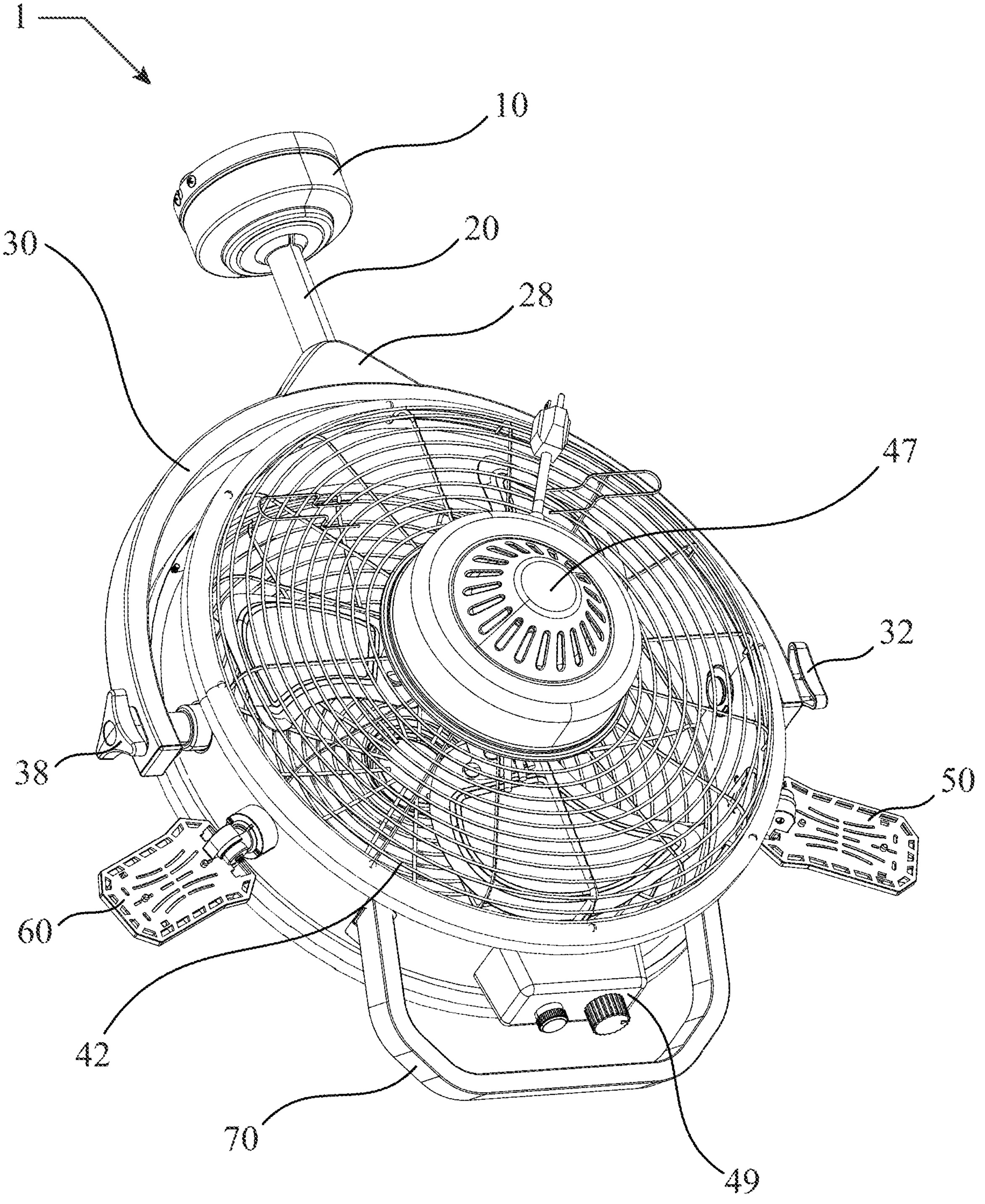
FIG. 4 is a lower front left perspective view of the garage fan o with adjustable lights and ceiling mount of FIG. 1.

FIG. 1 is an upper front right perspective view of the garage fan with adjustable lights and ceiling mount 1. FIG. 2 is a lower front right perspective view of the garage fan with adjustable lights and ceiling mount 1 of FIG. 1. FIG. 3 is an upper front left perspective view of the garage fan with adjustable lights and ceiling mount 1 of FIG. 1. FIG. 4 is a lower front left perspective view of the garage fan o with adjustable lights and ceiling mount 1 of FIG. 1.

Figure 5:
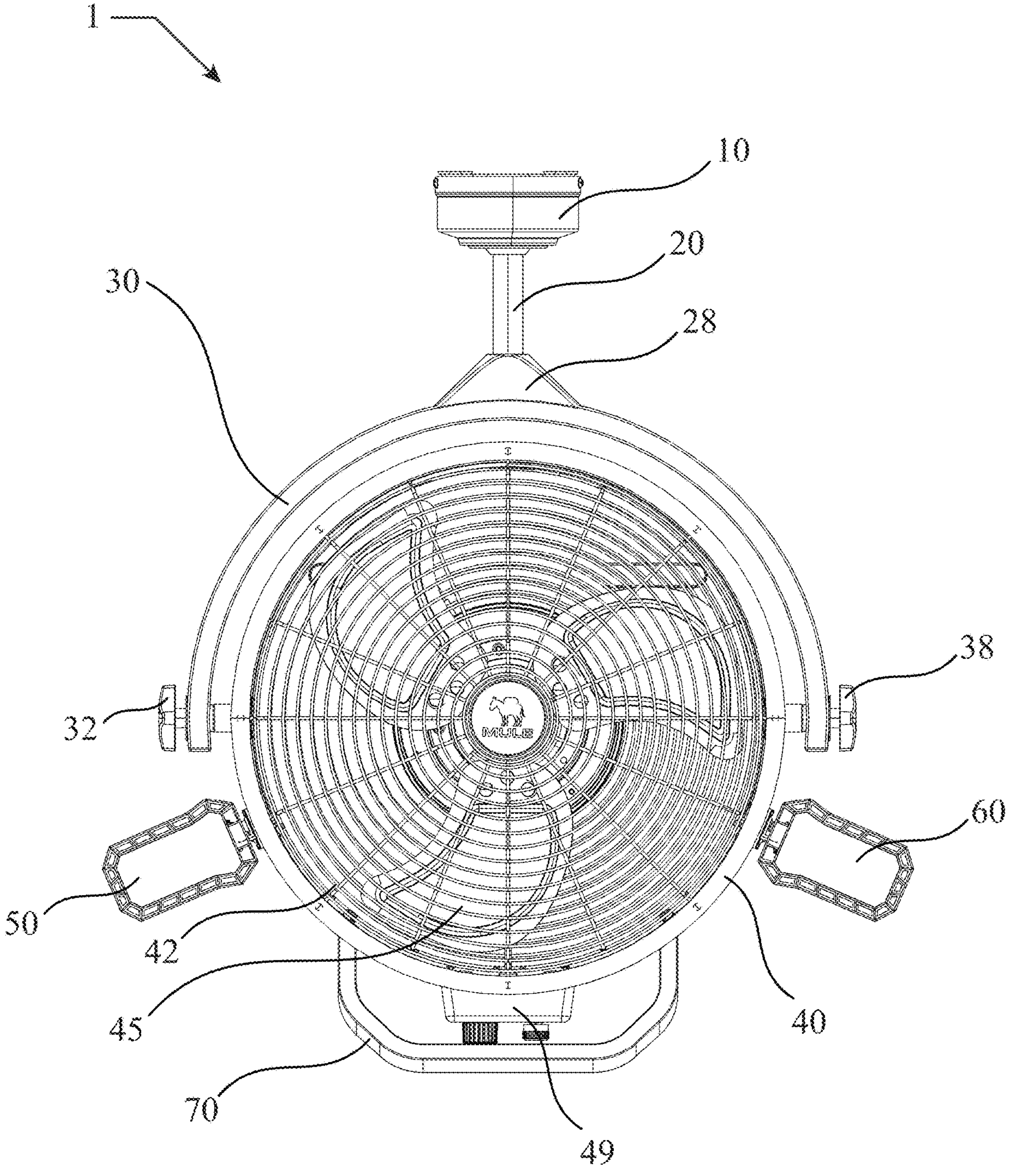
FIG. 5 is a front perspective view of the garage fan with adjustable lights and ceiling mount of FIG. 1.
Figure 6:
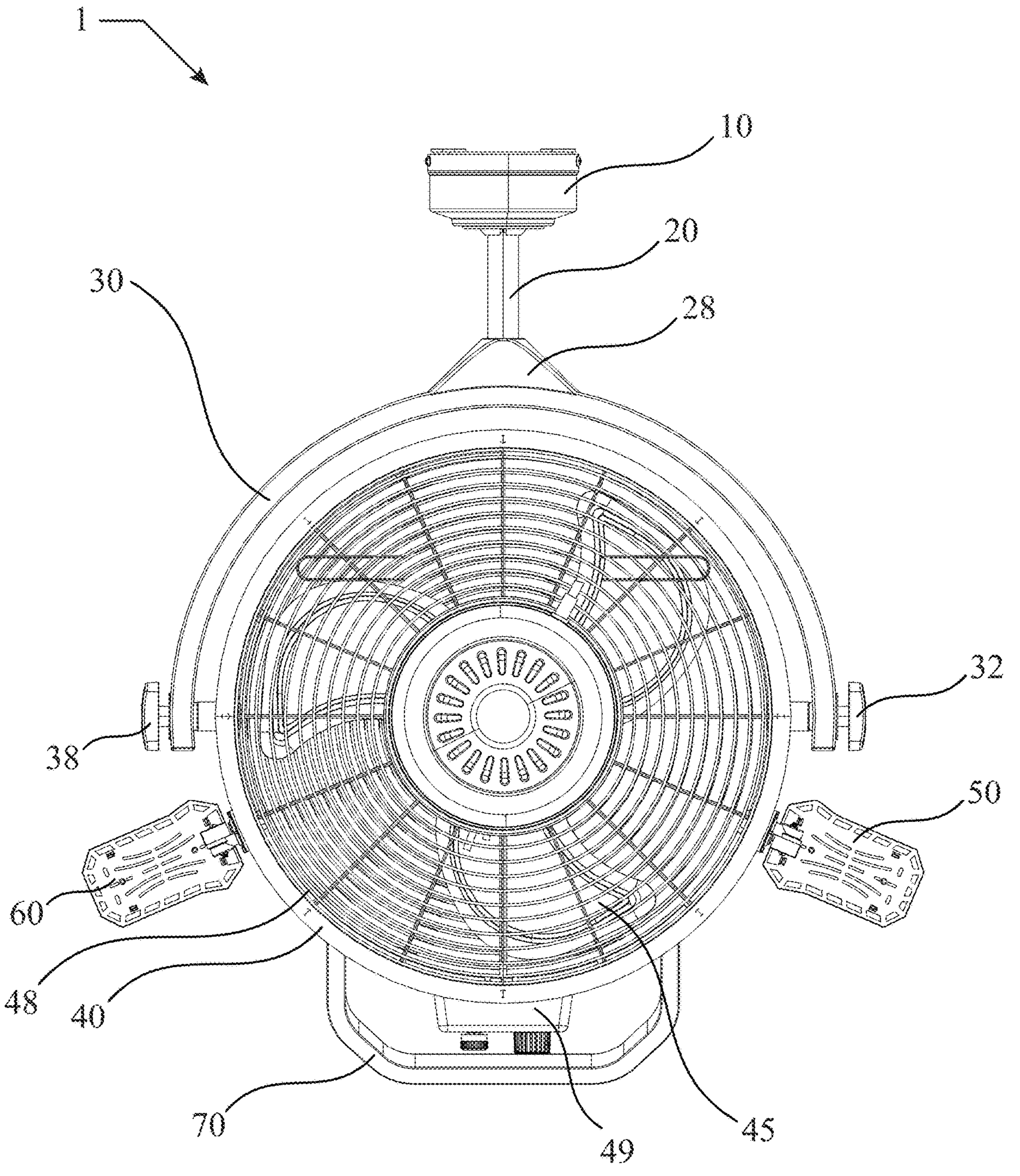
FIG. 6 is a rear perspective view of the garage fan with adjustable lights and ceiling mount of FIG. 1.

FIG. 5 is a front perspective view of the garage fan with adjustable lights and ceiling mount 1 of FIG. 1. FIG. 6 is a rear perspective view of the garage fan with adjustable lights and ceiling mount 1 of FIG. 1.

Figure 7:
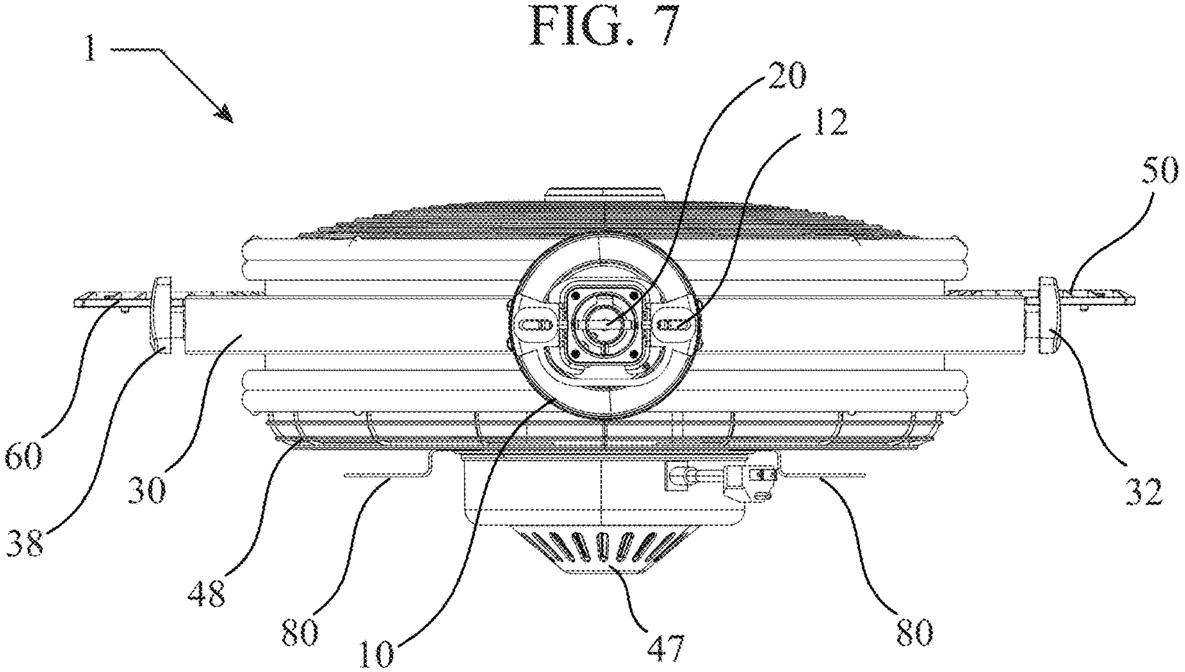
FIG. 7 is a top perspective view of the garage fan with adjustable lights and ceiling mount of FIG. 1.
Figure 8:
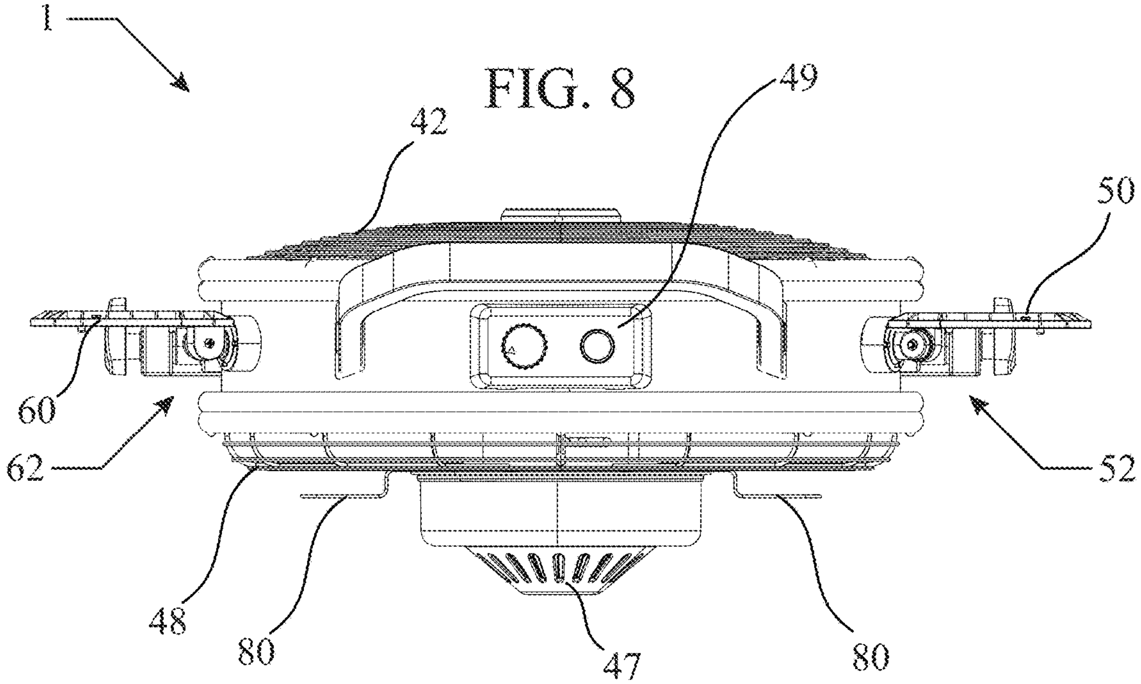
FIG. 8 is a bottom perspective view of the garage fan with adjustable lights and ceiling mount of FIG. 1.

FIG. 7 is a top perspective view of the garage fan with adjustable lights and ceiling mount 1 of FIG. 1. FIG. 8 is a bottom perspective view of the garage fan with adjustable lights and ceiling mount 1 of FIG. 1.

Figure 9:
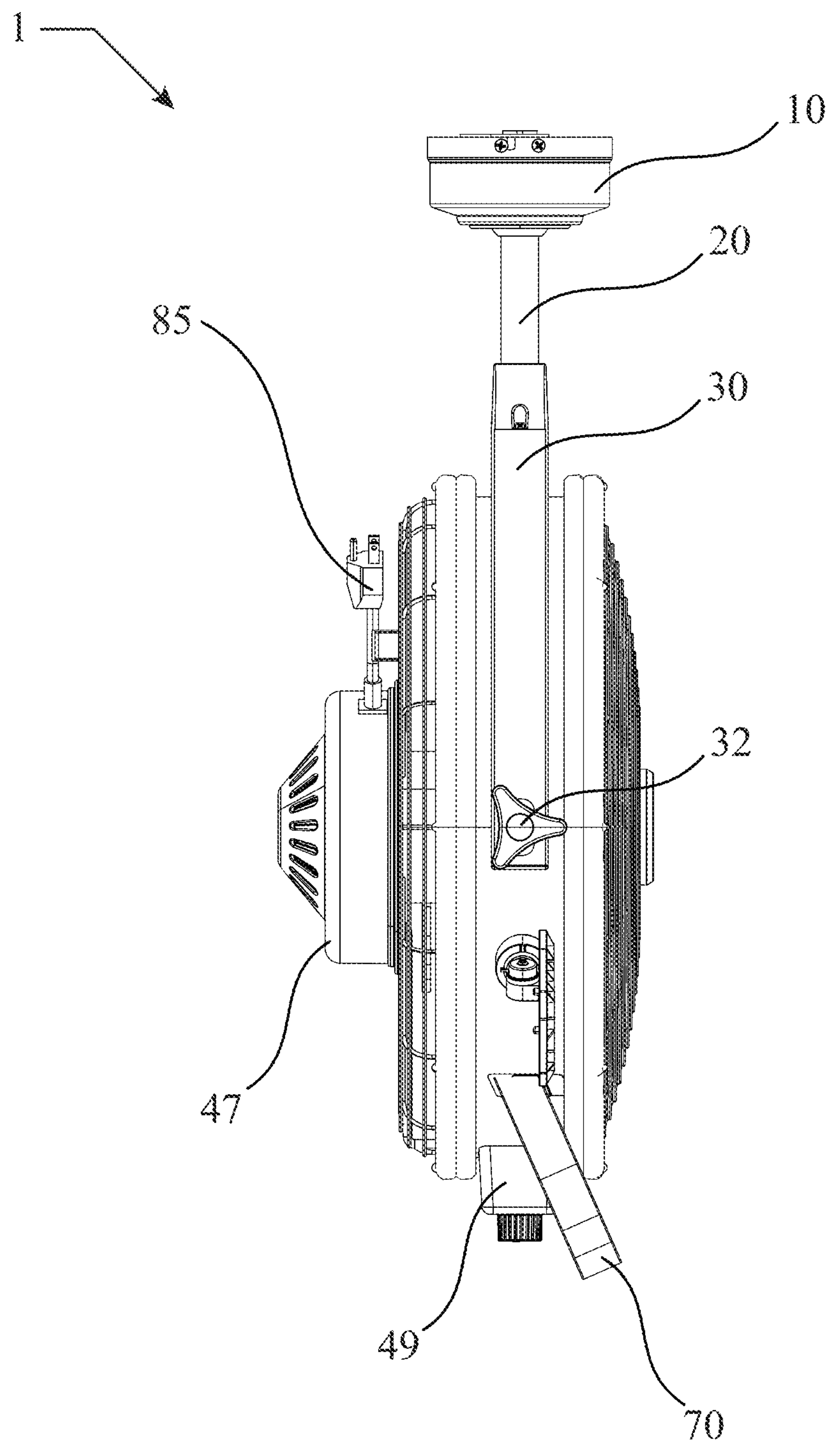
FIG. 9 is a left side perspective view of the garage fan with adjustable lights and ceiling mount of FIG. 1.

FIG. 9 is a left side perspective view of the garage fan with adjustable lights and ceiling mount 1 of FIG. 1. FIG. 10 is a right side perspective view of the garage fan with adjustable lights and ceiling mount 1 of FIG. 1.

Figure 11:
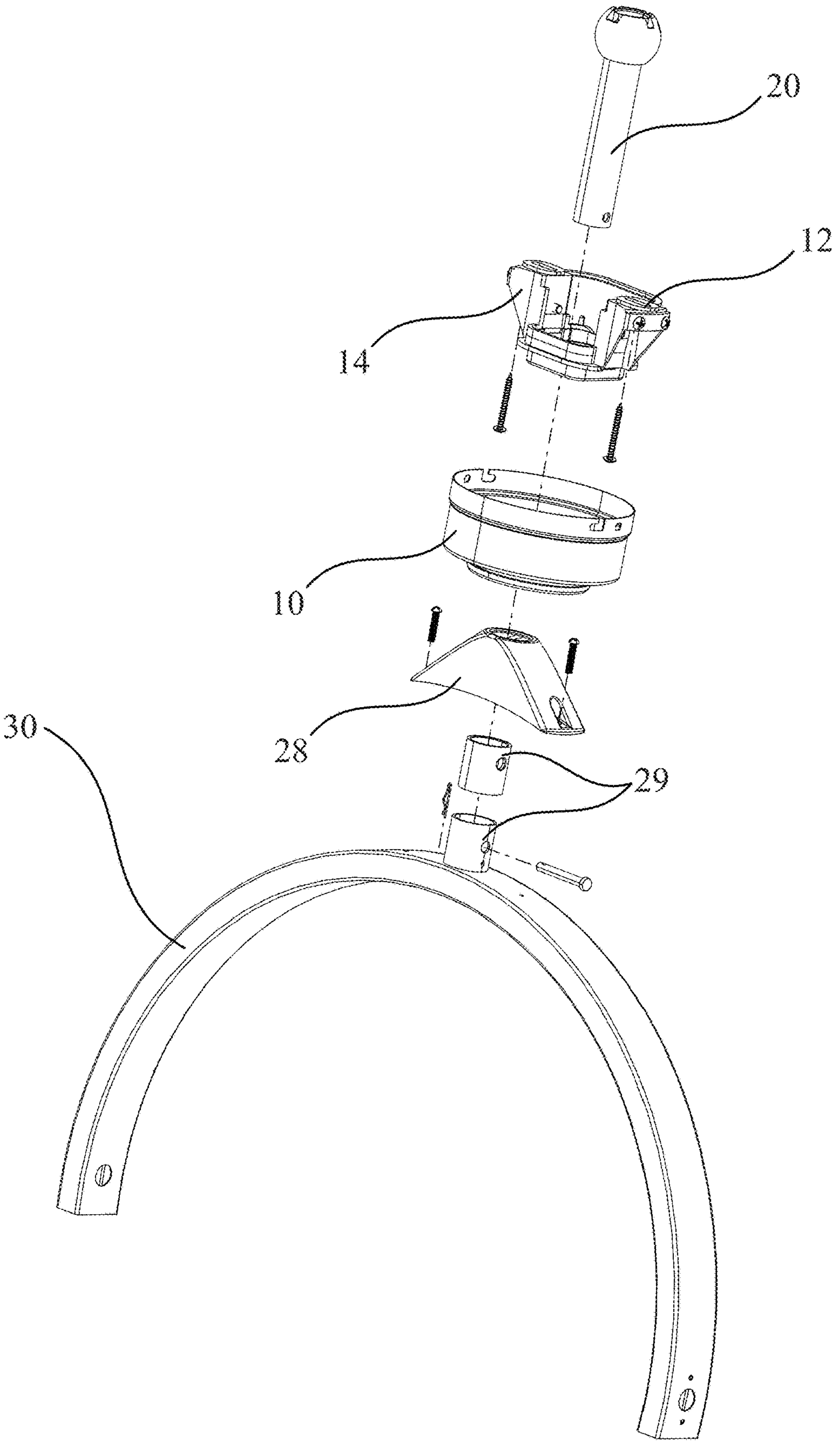
FIG. 11 is an exploded perspective view of the ceiling mount of the garage fan with adjustable lights and ceiling mount of FIG. 1.

FIG. 11 is an exploded perspective view of the ceiling mount of the garage fan with adjustable lights and ceiling mount 1 of FIG. 1.

FIG. 20 is an exploded view of all the parts of the garage fan with adjustable lights and ceiling mount 1 of FIG. 1.

Referring to FIGS. 1-11 and 20, the garage fan with adjustable lights and ceiling mount 1, can include a ceiling canopy 10, vertical support post 20 with internal canopy insert 14 with internal mount flanges 12 that mounts to a ceiling in a garage similar to the self balancing hanger bracket described and shown in U.S. Pat. No. 11,054,085 to Byrne et al., which is assigned to the same assignee as the subject patent application, and which is incorporated by reference in its' entirety.

Referring to FIG. 11, and FIG. 20, the vertical post 20 is attached through internal canopy insert 14 inside of canopy 10 to a lower extending C bracket 30 by a lower bracket 28 with concentric cylinders 29, so that the lower extending C bracket 30 can rotate in a horizontal plane relative to the ceiling canopy 10.

Referring to FIGS. 1-7 and 20, a left pivot adjustment knob 32 can be rotatably attached through a left through-hole in a lower left end of the lower extending C bracket 30, and into a left side of the ring shaped fan housing 40. Ring shaped fan housing 40 can include a front grill 42, rear grill 48 and main blades 45 that rotate from a fan motor 47.

A right pivot adjustment knob 38 can be rotatably attached through a right through-hole in a lower right end of the lower extending C bracket 30 and into a right side of the ring shaped fan housing 40.

Adjustable Lights 50, 60.

Referring to FIGS. 1-11 and 20, each of the adjustable light paddles 50, 60 can have a rectangular configuration of approximately 5 inches in length by approximately 3 inches in width with a thickness of approximately 0.5 inches. An outer decorative plastic frame having perimeter of generally rectangular cut-outs is about a generally rectangular solid portion. On one side of each paddle 50, 60 can be an array of light emitting diodes (LEDs), that can emit bright white light of approximately 4000 k/approximately 1200 lumens, which would be effective work lights for most activities needed to be done in a garage.

FIG. 18A is a front perspective view of an adjustable light 60 of the garage fan 1 of FIG. 1. FIG. 18B is a rear perspective view of an adjustable light 60 of the garage fan 1 of FIG. 1. Adjustable light 50 is identical to adjustable light 60, but faces in an opposite direction. FIG. 19 is an exploded view of the adjustable light 50 of FIGS. 18A-18B.

Left paddle rotate and pivot connections 52 can include horizontal axis rotation parts 54 of a vertical axle rotatably attached to a base of the left light paddle 50 held in place by a screw, and vertical rotation parts 56 of a side facing spindle member extending inward from the bottom of the vertical axle which can rotate within a ring shaped housing that can be fastened to an outer side of the ring shaped fan housing 40. Right paddle 60 can include similar rotate and pivot connections 62, with horizontal axis rotation parts 64 and vertical rotation parts 66.

Figure 12:
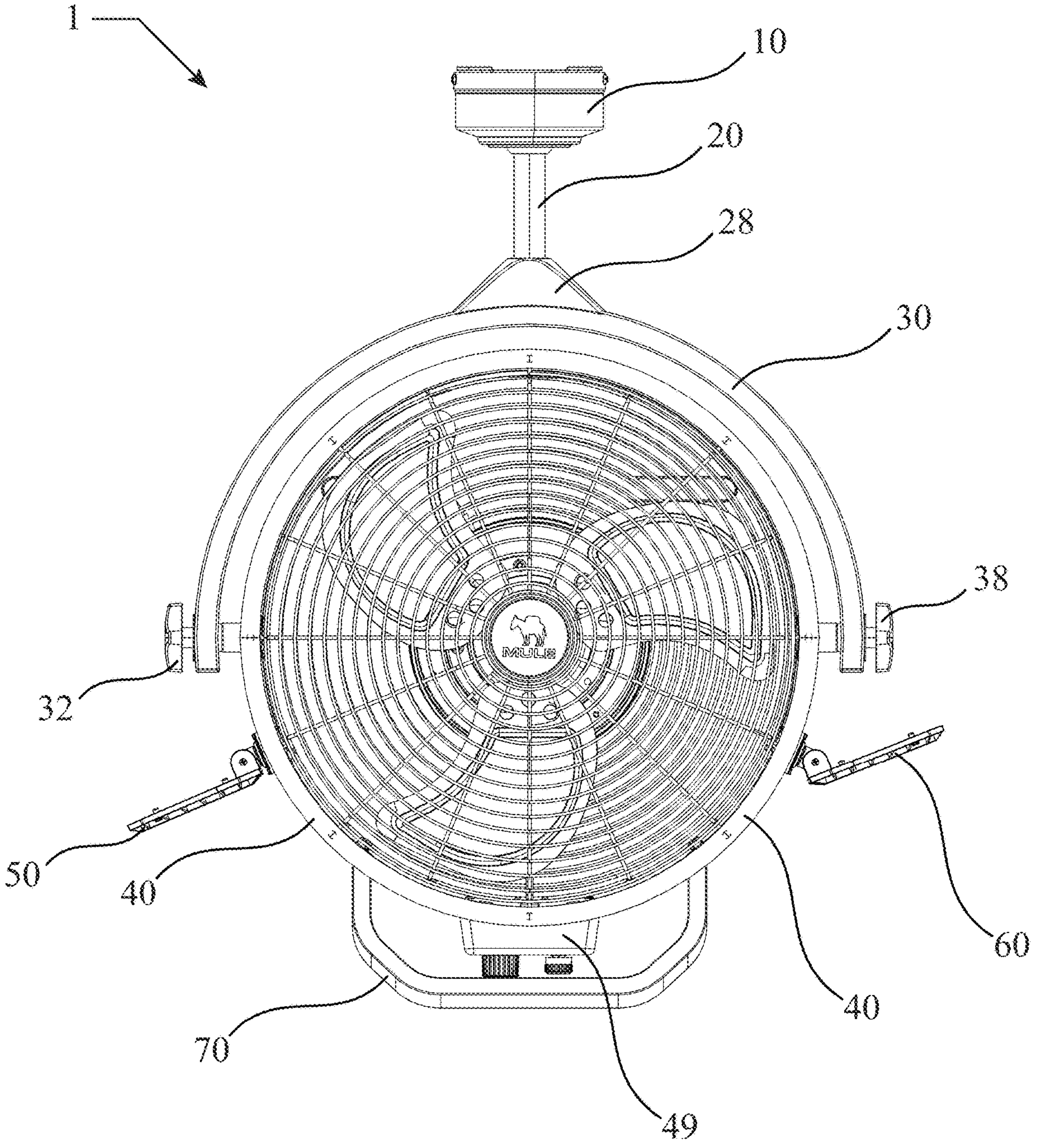
FIG. 12 is another front perspective view of the garage fan with adjustable lights and ceiling mount of FIG. 1, with the fan lights adjusted to face downward.

FIG. 12 is another front perspective view of the garage fan with adjustable lights and ceiling mount of FIG. 1, with the fan lights 50, 60 adjusted to face downward.

Figure 13:
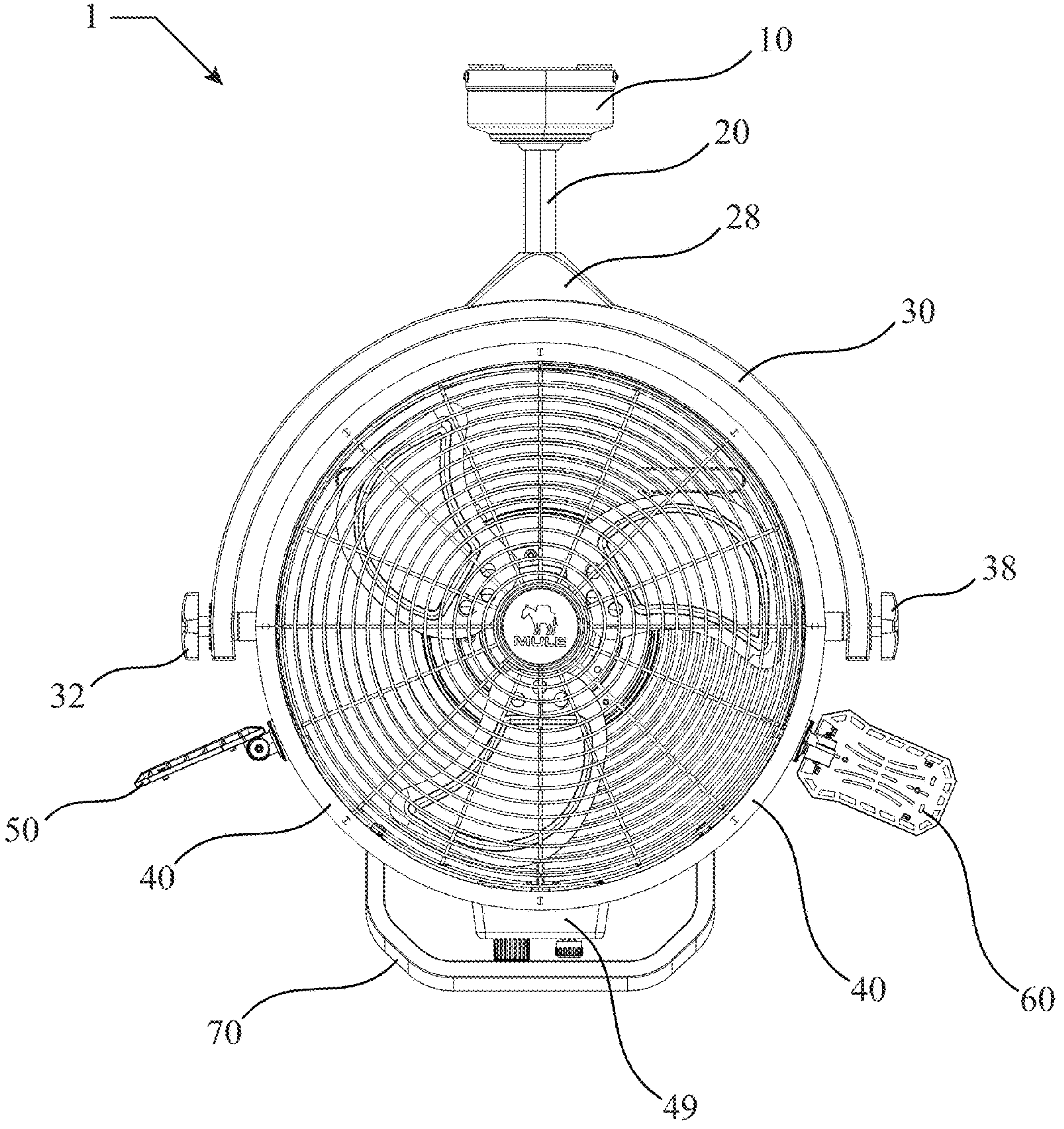
FIG. 13 is another front perspective view of the garage fan with adjustable lights and ceiling mount of FIG. 1 with a light adjusted downward and other light adjusted rearward.

FIG. 13 is another front perspective view of the garage fan with adjustable lights and ceiling mount 1 of FIG. 1 with a light 50 adjusted downward and other light 60 adjusted rearward.

Figure 14:
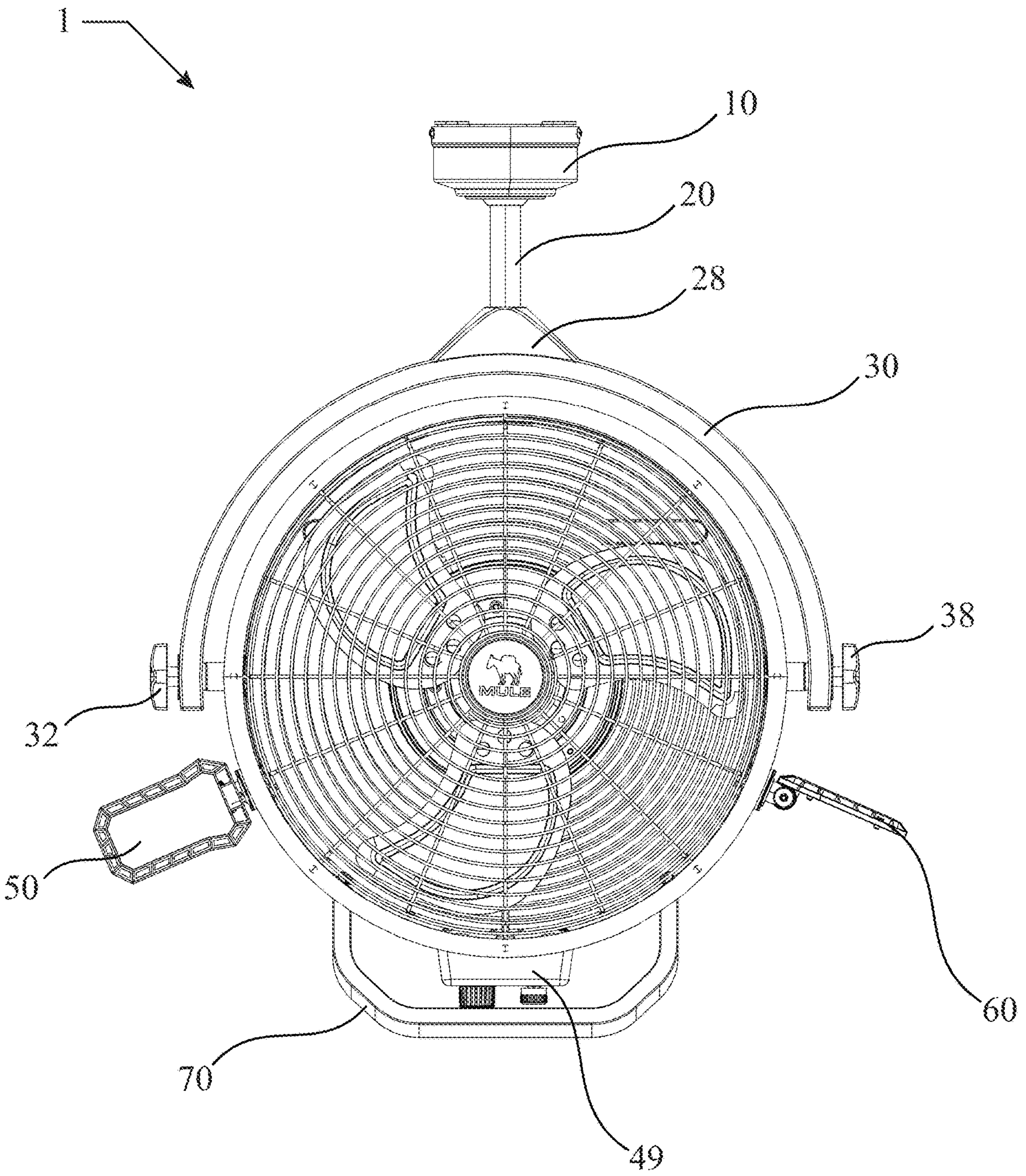
FIG. 14 is a rear view of the garage fan with adjustable lights and ceiling mount. of FIG. 13.

FIG. 14 is a rear view of the garage fan with adjustable and ceiling mount. 1 of FIG. 13.

The left rotatable knob 32 and the right rotatable knob 38 can be loosened by rotating knobs 38, 32 counter-clockwise. Next, the user can grab handle 70 and move the handle in a forward or backward direction, which will move the ring shaped fan housing 40 to a selected orientation. After the fan housing 40 is moved to the selected orientation, the left rotatable knob 38 and the right rotatable knob can each be tightened by rotating the knobs 38, 32 clockwise until they are in locked positions.

Figure 15:
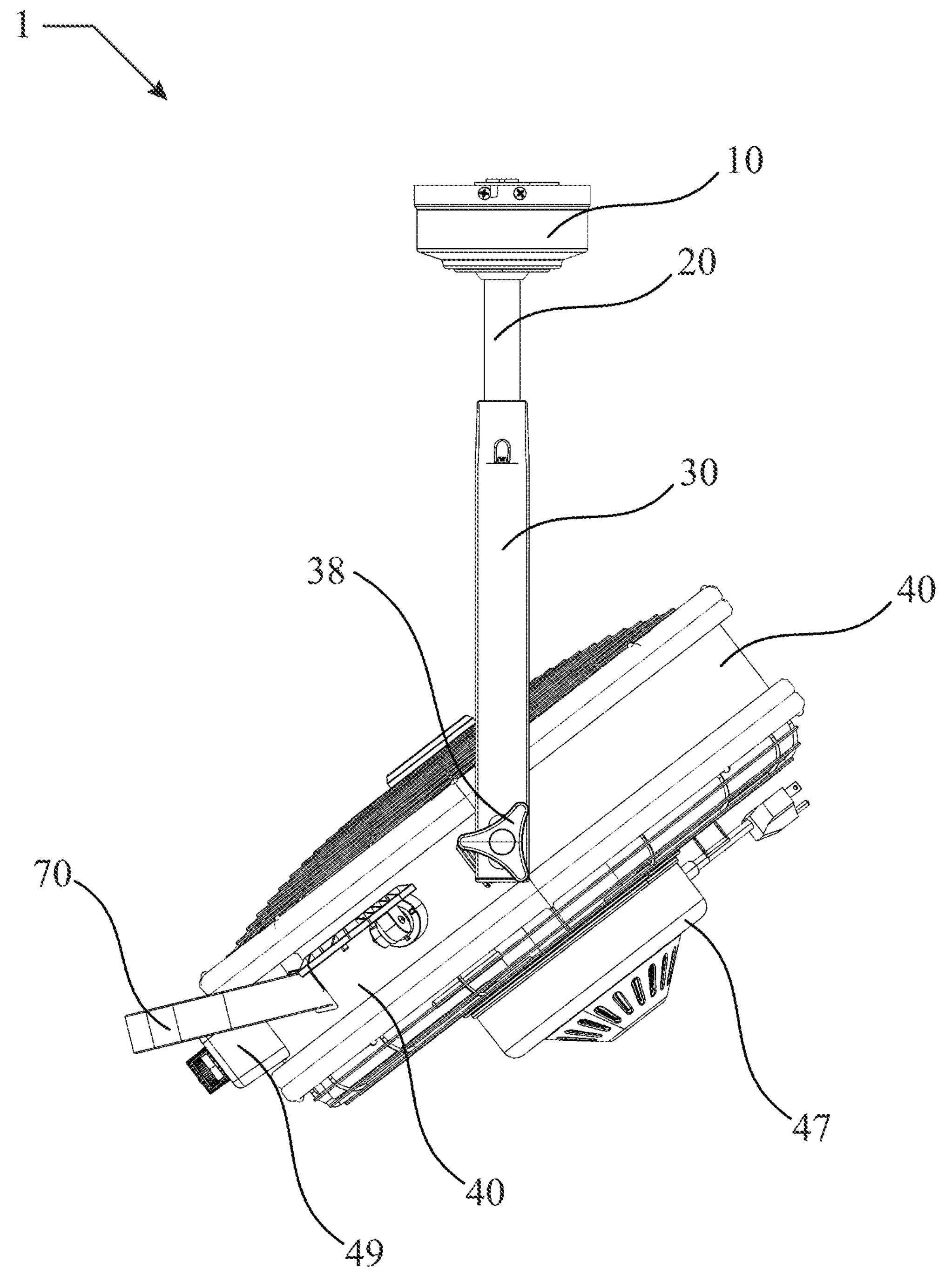
FIG. 15 is a right side view of the garage fan with adjustable lights and ceiling mount of FIG. 10 with the fan pivoted upward.

FIG. 15 is a right side view of the garage fan with adjustable lights and ceiling mount of FIG. 10 with the fan 40 pivoted clockwise by moving handle 70 upward in order to pivot fan housing 40 clockwise to a selected orientation.

Figure 16:
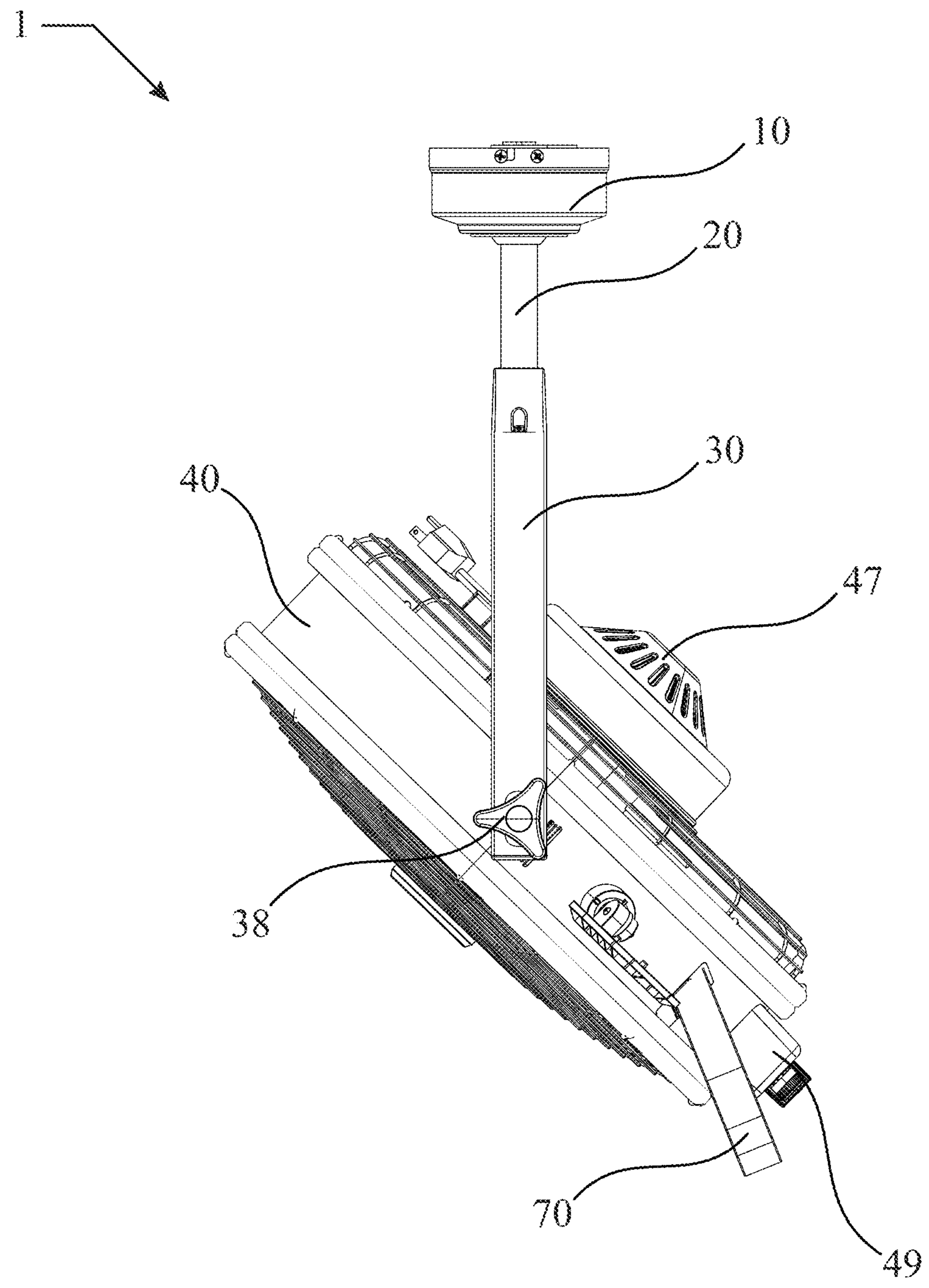
FIG. 16 is a right side view of the garage fan with adjustable lights and ceiling mount of FIG. 10 with the fan pivoted downward.

FIG. 16 is a right side view of the garage fan with adjustable lights and ceiling mount of FIG. 10 with the fan 40 pivoted downward after moving the handle 70 in a counter-clockwise direction.

Figure 17:
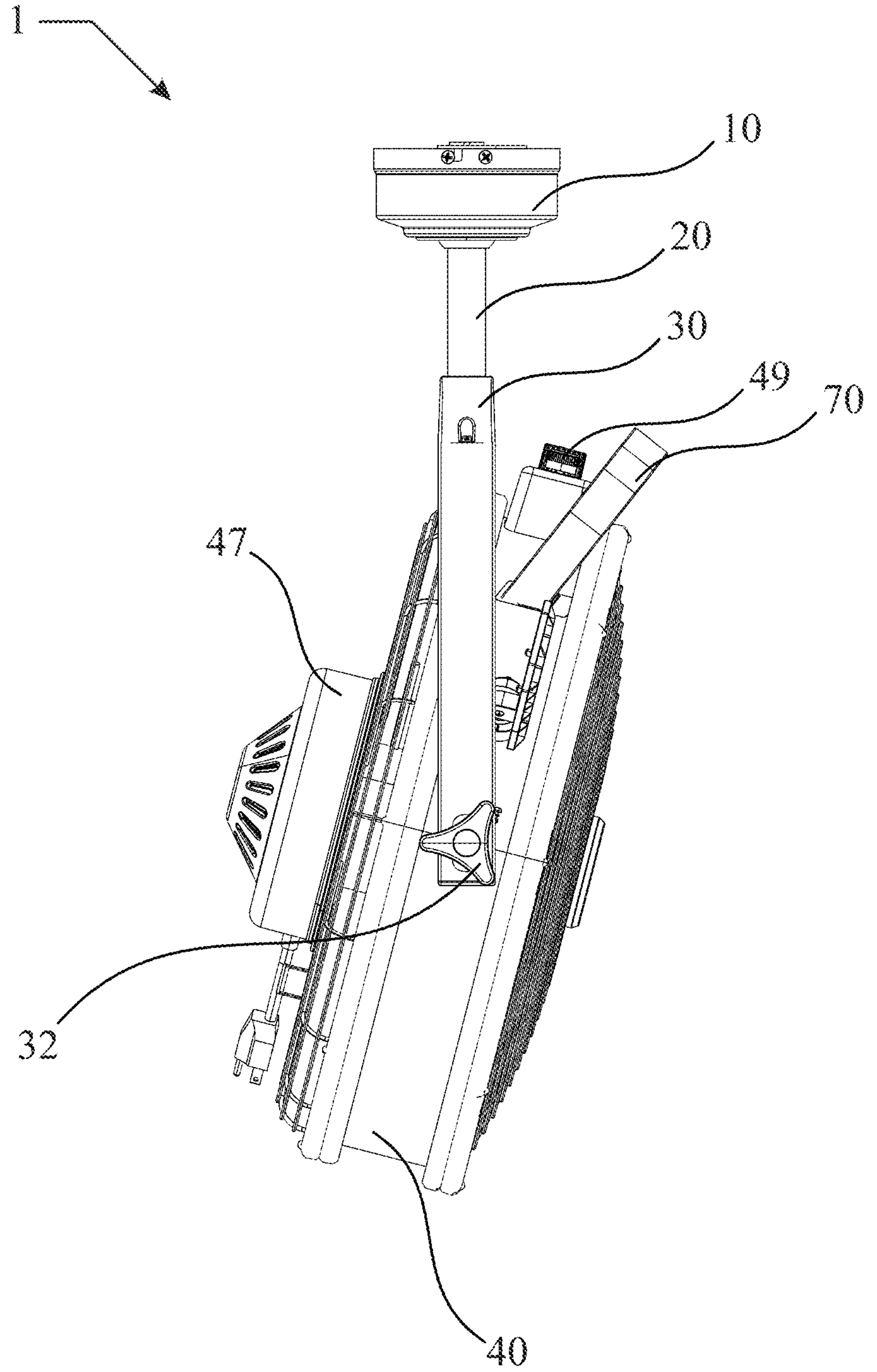
FIG. 17 is a right side view of the garage fan with adjustable lights and ceiling mount.

FIG. 17 is a right side view of the garage fan with adjustable lights and ceiling mount. of FIG. 10 with the fan rotated 40 approximately 90 degrees, with the handle 70 substantially above the fan housing 40.

FIG. 18A is a front perspective view of an adjustable light of the garage fan of FIG. 1.

Referring to FIGS. 15-17, the user can loosen the left pivot adjustment knob 32 and right pivot adjustment knob 38 (by rotating the respective knobs counter-clockwise). Next, the user can push up or pull down the U shaped handle 70 to a desired fan pivoted position, followed by tightening down (rotating clockwise) both left pivot adjustment knob 32 and right pivot adjustment knob 38 to locked positions.

FIG. 18A is a front perspective view of an adjustable light of the garage fan 1 of FIG. 1. FIG. 18B is a rear perspective view of an adjustable light of the garage fan 1 of FIG. 1.

FIG. 19 is an exploded view of the adjustable light 50 of FIGS. 18A-18B.

FIG. 20 is an exploded view of all the parts of the garage fan with adjustable lights and ceiling mount 1 of FIG. 1.

Referring to FIGS. 1-20, fan controls 49 can include a pair of rotatable knobs. One rotatable knob can turn on and off the light emitting diodes (LEDs)) on both the left and right paddles 50, 60, and adjust the white light brightness up to approximately 4000 k/approximately 1200 lumens. The second rotatable knob can adjust the fan speed to three settings of low, medium and high rotation speed. Thus, the user can control the brightness from both the light emitting diodes (LEDs), and the rotating fan blades 45.

The novel ceiling mounted garage fan with adjustable lights, has a motor 47 for rotating the fan blades 45, and the light emitting diodes (LEDs)) on both the left and right paddles 50, 60 can be provided with electric power by being plugged into an existing ceiling outlet by a cord having a plug 85 (FIGS. 9-10). Opposite facing cord tabs 80 (FIGS. 7-8) can be used for safely wrapping any extra cord length.

Wall Mount Garage Fan with Adjustable Lights

FIG. 21 is an upper front right perspective view of the garage fan with adjustable lights and wall mount 100. FIG. 22 is a front right perspective view of the garage fan with adjustable lights and wall mount 100 of FIG. 21. FIG. 23 is an upper rear perspective view of the garage fan with adjustable lights and wall mount 100 of FIG. 22. FIG. 24 is a lower rear perspective view of the garage fan with adjustable lights and wall mount 100 of FIG. 22. FIG. 25 is a front perspective view of the garage fan with adjustable lights and wall mount 100 of FIG. 21. FIG. 26 is a rear perspective view of the garage fan with adjustable lights and wall mount 100 of FIG. 25.

FIG. 27 is a top perspective view of the garage fan with adjustable lights and wall mount 100 of FIG. 21. FIG. 28 is a bottom perspective view of the garage fan with adjustable lights and wall mount 100 of FIG. 21. FIG. 29 is a left side perspective view of the garage fan with adjustable lights and wall mount 100 of FIG. 21. FIG. 30 is a right side perspective view of the garage fan with adjustable lights and wall mount 100 of FIG. 21.

FIG. 31 is an exploded perspective view of the wall mount of the garage fan with adjustable lights and wall mount 100 of FIG. 21.

FIG. 36 is an exploded perspective view of the garage fan with adjustable lights and wall mount 100 of FIG. 21.

Referring to FIGS. 21-31 and 36, the wall mount version of the garage fan 100 can include a wall mount 110 with a wall support plate to be placed directly against a wall, and a support bracket 112 with middle plate 114 therebetween. Horizontal fasteners, such as screws, which can fasten the wall mount to a wall stud.

On an exterior side of the wall mount 110 can be two parallel flanges 120.

A protruding end 128 with horizontal through-hole, on an apex portion of a side facing C bracket 30 can be inserted between the parallel flanges 120, and a pivot rod 125 with upper threaded opening can be inserted through through-holes in the parallel flanges 120 and protruding end 128 and held place by screw/bolt with washers and additional mounting screws 127. A locking knob 126 can lock the position of the side facing C bracket. The pivot rod 125 allows for the side facing C bracket 130 to pivot to the left and right along a horizontal plane. A rotatable locking knob 126 can lock the position of the side facing C bracket.

Referring to FIGS. 21-31 and 36, a left pivot adjustment knob 132 can be rotatably attached through a left through-hole in a left end of the side extending C bracket 130, and into a left side of the ring shaped fan housing 140. A right pivot adjustment knob 138 can be rotatably attached through a right through-hole in a right end of the side extending C bracket 130 and into a right side of the ring shaped fan housing 140. The left pivot adjustment knob 132 and right pivot adjustment knob 138 can function and operate similarly to the previously described left pivot adjustment knob 32 and right pivot adjustment knob 38.

Ring shaped fan housing 140 can include a front grill 142, rear grill 148 and main blades 145 that rotate from a fan motor 147.

Adjustable Lights 150, 160.

Referring to FIGS. 21-31 and 36, each of the adjustable light paddles 150, 160 can have a rectangular configuration of approximately 5 inches in length by approximately 3 inches in width with a thickness of approximately 0.5 inches. An outer decorative plastic frame having perimeter of generally rectangular cut-outs is about a generally rectangular solid portion. On one side of each paddle 150, 160 can be an array of light emitting diodes (LEDs), that can emit bright white light of approximately 4000 k/approximately 1200 lumens, which would be effective work lights for most activities needed to be done in a garage.

Left paddle rotate and pivot connections 152 can include horizontal axis rotation parts 54 (previously shown) of a vertical axle rotatably attached to a base of the left light paddle 150 held in place by a screw, and vertical rotation parts 56 (previously shown) of a side facing spindle member extending inward from the bottom of the vertical axle which can rotate within a ring shaped housing that can be fastened to an outer side of the ring shaped fan housing 140. Right paddle 160 can include similar rotate and pivot connections 162, with horizontal axis rotation parts 64 (previously shown) and vertical rotation parts 66 (previously shown).

Referring to FIGS. 21-31 and 36, the left rotatable knob 138 and the right rotatable knob 132 can be loosened by rotating knobs 138, 132 counter-clockwise. Next, the user can pivot the ring shaped fan housing 140 to a selected orientation. After the fan housing 140 is moved to the selected orientation, the left rotatable knob 132 and the right rotatable knob 138 can each be tightened by rotating the knobs 138, 132 clockwise until they are in locked positions.

FIG. 32 is another right side perspective view of the garage fan with adjustable lights and wall mount 100 of FIG. 30 with the ring shaped fan housing 140 pivoted downward.

FIG. 33 is another right side perspective view of the garage fan with adjustable lights and wall mount 100 of FIG. 30 with the ring shaped fan housing 140 pivoted upward.

FIG. 34 is another a top perspective view of the garage fan with adjustable lights and wall mount 100 of FIG. 27 with the ring shaped fan housing 140 pivoted to the left relative to the wall mount 110.

FIG. 35 is another a top perspective view of the garage fan with adjustable lights and wall mount 100 of FIG. 27 with the ring shaped fan housing 140 pivoted to the right relative to the wall mount 110.

Fan controls 149 can include a pair of rotatable knobs. One rotatable knob can turn on and off the light emitting diodes (LEDs)) on both the left and right paddles 50, 60, and adjust the white light brightness up to approximately 4000 k/approximately 1200 lumens. The second rotatable knob can adjust the fan speed to three settings of low, medium and high rotation speed. Thus, the user can control the brightness from both the light emitting diodes (LEDs), and the rotating fan blades 45.

Ceiling Mount Garage Fan with No Adjustable Lights

FIG. 37 is a front right perspective view of the garage fan with ceiling mount 200 and no adjustable lights. FIG. 38 is a lower front right perspective view of the garage fan with ceiling mount 200 and no adjustable lights of FIG. 37. FIG. 39 is a front left perspective view of the garage fan with ceiling mount 200 and no adjustable lights of FIG. 37. FIG. 40 is a lower front left perspective view of the garage fan with ceiling mount 200 and no adjustable lights of FIG. 37.

FIG. 41 is a front view of the garage fan with ceiling mount 200 and no adjustable lights of FIG. 37. FIG. 42 is a rear view of the garage fan with ceiling mount 200 and no adjustable lights of FIG. 37. FIG. 43 is a top view of the garage fan with ceiling mount 200 and no adjustable lights of FIG. 37. FIG. 44 is a bottom view of the garage fan with ceiling mount 200 and no adjustable lights of FIG. 37.

FIG. 45 is a left side view of the garage fan with ceiling mount 200 and no adjustable lights of FIG. 37. FIG. 46 is a right side view of the garage fan with ceiling mount 200 and no adjustable lights of FIG. 37.

FIG. 47 is an exploded view of the ceiling mount of the garage fan with ceiling mount 200 and no adjustable lights of FIG. 37.

FIG. 48 is another right side view of the garage fan with ceiling mount 200 and no adjustable lights of FIG. 46 with the fan pivoted upward. FIG. 49 is another right side view of the garage fan with ceiling mount 200 and no adjustable lights of FIG. 46 with the fan pivoted downward. FIG. 50 is another left side view of the garage fan with ceiling mount 200 and no adjustable lights of FIG. 45 with fan pivoted downward.

Referring to FIGS. 37-41, the garage fan with ceiling mount 200 has the same components and operates similarly as the garage fan with ceiling mount 1 of FIGS. 1-20, without the adjustable lights 50, 60.

Fan control 249 can include a pair of rotatable knobs. One rotatable knob can turn on and off the fan. The second rotatable knob can adjust the fan speed to three settings of low, medium and high rotation speed.

While the invention references controls underneath the fan housing, the invention can work with remote control transmitters and receivers. Remote transmitters and receivers to operate the fan and lights can include, but is not limited to those shown and described in U.S. Pat. No. 11,486,404 to Mathis et al.; U.S. Pat. No. 9,589,461 to Byrne et al.; and U.S. Pat. No. 9,508,251 to Byrne et al., which are all assigned to the same assignee as in the subject patent application.

The term "approximately" " approximate" can be +/−10% of the amount referenced. Additionally, preferred amounts and ranges can include the amounts and ranges referenced without the prefix of being approximately.

Although specific advantages have been enumerated above, various embodiments may include some, none, or all of the enumerated advantages.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A ceiling mounted garage fan with adjustable lights, comprising:
- a canopy mount for mounting the garage fan with the adjustable lights to a ceiling surface;
- a down rod having an upper end attached to the canopy mount, and a lower end;
- a lower facing C bracket having an apex attached to the lower end of the down rod;
- a ring shaped housing for a fan having a front side for emitting air therefrom, and a rear side;
- a left locking member for attaching a lower left end of the C bracket to a left side of the ring shaped housing;
- a right locking member for attaching a lower right end of the C bracket to a right side of the ring shaped housing;
- a handle extending below the ring shaped housing, which allows the ring shaped housing to pivot upward or downward by moving the handle in different directions, wherein the left locking member and the right locking member are loosened to allow the handle to move the ring shaped housing to a selected orientation, and the left locking member and the right locking member are tightened after the ring shaped housing has been moved to the selected orientation; and
- adjustable lights on a left side and a right side of the ring shaped housing that are each separately adjustable to selected light aiming positions, wherein the adjustable lights include:
- a left paddle with a plurality light emitting diodes (LEDs) located on one side of the left paddle member; and
- a right paddle with another plurality of light emitting diodes (LEDs) on one side of the right paddle member.

2. The ceiling mounted garage fan with adjustable lights of claim 1, further comprising:

a left horizontal rotatable axis member for rotatably mounting the left paddle along a rotatable horizontal axis to the left side of the ring shaped housing;

a left vertical rotatable axis member for rotatably mounting the left paddle along a rotatable vertical axis to the left side of the ring shaped housing;

a right horizontal rotatable axis member for rotatably mounting the right paddle along a rotatable horizontal axis to the right side of the ring shaped housing; and a right vertical rotatable axis member for rotatably mounting the right paddle along a rotatable vertical axis to the right side of the ring shaped housing.

3. The ceiling mounted garage fan with adjustable lights of claim 2, wherein the handle includes a U shaped handle extending below the ring shaped housing.

4. The ceiling mounted garage fan with adjustable lights of claim 1, wherein the handle includes a U shaped handle extending below the ring shaped housing.

5. A method or providing a garage fan with adjustable lights, comprising the steps of:

providing a surface mount for mounting the garage fan to a surface selected from a ceiling surface and a wall surface;

providing a C bracket attached to the surface mount;

providing a ring shaped housing for a fan having a front side for emitting air therefrom, and a rear side, the ring shaped housing attached within the C bracket;

providing a left rotatable knob for attaching a left end of the C bracket to a left side of the ring shaped housing;

providing a right rotatable knob for attaching a right end of the C bracket to a right side of the ring shaped housing; and the ring shaped housing has been moved to a selected orientation; and providing adjustable paddle lights with light emitting diodes (LEDs) to a left side and a right side of the ring shaped housing that are adjustable to selected light aiming positions.

6. The method of claim 5, wherein the step of providing adjustable paddle lights, further comprises the steps of:

providing a left paddle with a plurality light emitting diodes (LEDs) located on one side of the left paddle; and providing a right paddle with another plurality of light emitting diodes (LEDs) on one side of the right paddle;

providing a left horizontal rotatable axis member for rotatably mounting the left paddle along a rotatable horizontal axis to the left side of the ring shaped housing;

providing a left vertical rotatable axis member for rotatably mounting the left paddle along a rotatable vertical axis to the left side of the ring shaped housing;

providing a right horizontal rotatable axis member for rotatably mounting the right paddle along a rotatable horizontal axis to the right side of the ring shaped housing; and providing a right vertical rotatable axis member for rotatably mounting the right paddle along a rotatable vertical axis to the right side of the ring shaped housing.

7. A garage fan with adjustable lights, comprising:

a surface mount for mounting the garage fan to a surface selected from a ceiling surface and a wall surface;

a C bracket attached to the surface mount;

a ring shaped housing for a fan having a front side for emitting air therefrom, and a rear side, the ring shaped housing attached within the C bracket;

a left rotatable knob for attaching a left end of the C bracket to a left side of the ring shaped housing;

a right rotatable knob for attaching a right end of the C bracket to a right side of the ring shaped housing, wherein the left rotatable knob and the right rotatable knob allow for the ring shaped housing to be moved to a selected orientation; and adjustable paddle lights with light emitting diodes (LEDs) mounted to a left side and a right side of the ring shaped housing that are adjustable to selected light aiming positions.

* * * * *